US012211348B2

(12) United States Patent
Bulzacki et al.

(10) Patent No.: US 12,211,348 B2

(45) **Date of Patent: *Jan. 28, 2025**

(54) PROGRESSIVE BETTING SYSTEMS

(71) Applicant: ARB LABS INC., Toronto (CA)

(72) Inventors: Adrian Bulzacki, Mississauga (CA); Vlad Cazan, Thornhill (CA); Russell Brooke Dunn, Henderson, NV (US)

(73) Assignee: ARB LABS INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/516,197

(22) Filed: Nov. 21, 2023

(65) Prior Publication Data

US 2024/0087414 A1 Mar. 14, 2024

Related U.S. Application Data

(63) Continuation of application No. 17/745,759, filed on May 16, 2022, now Pat. No. 11,823,532, which is a continuation of application No. 16/753,494, filed as application No. PCT/CA2018/051248 on Oct. 3, 2018, now Pat. No. 11,335,166.

(60) Provisional application No. 62/567,457, filed on Oct. 3, 2017.

(51) Int. Cl.
*G07F 17/32* (2006.01)

(52) U.S. Cl.
CPC ........ *G07F 17/3258* (2013.01); *G07F 17/322* (2013.01); *G07F 17/3223* (2013.01); *G07F 17/3241* (2013.01)

(58) Field of Classification Search
CPC ............... G07F 17/3258; G07F 17/322; G07F 17/3223; G07F 17/3241; G07F 17/3225; G07F 17/3246; A63F 2003/00164
See application file for complete search history.

(56) References Cited

U.S. PATENT DOCUMENTS 11,335,166 B2 5/2022 Bulzacki et al.

OTHER PUBLICATIONS

United States Patent & Trademark Office (USPTO), Non Final Rejection issued to U.S. Appl. No. 17/745,759, Feb. 14, 2023.

*Primary Examiner* — Kevin Y Kim
(74) *Attorney, Agent, or Firm* — Norton Rose Fulbright Canada LLP

(57) ABSTRACT

Embodiments described herein relate to systems and methods for monitoring progressive game activities at a plurality of gaming tables. For example, embodiments described herein relate to systems and methods for monitoring that a bet for playing a progressive game was made, the amount of the bet, the position of the bet, the identification of the player who made the bet and the identification of the gaming table at which the bet was made. A progressive jackpot metric may be computed based on the data captured at the gaming table for increasing or decreasing one or more progressive jackpots. Visual elements corresponding to the one or more progressive jackpots may be rendered on a jackpot interface display.

20 Claims, 24 Drawing Sheets

600

602

| Bet identification (604) | Time stamp (606) | Player ID data (608) | Table ID data (610) | Bet quantity (612) | Bet position (614) | Game element (616) |
|---|---|---|---|---|---|---|
| Bet 1 | Time stamp 1 | Player ID data 1 | Table ID data 1 | Bet quantity 1 | Bet position 1 | Game element 1 |
| Bet 2 | Time stamp 2 | Player ID data 2 | Table ID data 2 | Bet quantity 2 | Bet position 2 | Game element 2 |
| Bet 3 | Time stamp 3 | Player ID data 3 | Table ID data 3 | Bet quantity 3 | Bet position 3 | Game element 3 |
| ... | ... | ... | ... | ... | ... | ... |

FIG. 6

700

702

| Progressive Jackpot identification (704) | Winning Game Element (706) | Reference Position (707) | Bet Multiplier (708) | Jackpot Amount (710) | Minimum Amount (712) | Maximum Amount (714) | Percentage Allocation (716) |
|---|---|---|---|---|---|---|---|
| Jackpot 1 | Royal Flush | Position 1 | 500 | $1,421,532 | $10,000 | $20,000,000 | 15% |
| Jackpot 2 | Straight Flush | Position 2 | 100 | $873,234 | $1,000 | $15,000,000 | 15% |
| Jackpot 3 | 4-Kings | Position 3 | 10 | $9,123,514 | $100 | $10,000,000 | 10% |
| Jackpot 4 | Full House | Position 4 | 5 | $2,234,764 | $100 | $4,000,000 | 5% |
| Jackpot 5 | Flush | Position 5 | 3 | $543,892 | $100 | $1,000,000 | 4% |
| Non-jackpot | One Pair | Position 6 | 2 | $10,000,000 | N/A | N/A | 43% |
| House Advantage | N/A | … | N/A | $5,000,000 | N/A | N/A | 7% |
| Reset pot | N/A | … | N/A | $2,000,000 | N/A | N/A | 1% |
| … | … | … | … | … | … | … | … |
| Total | … | … | … | … | … | … | … |
| … | … | … | … | | … | … | … |

FIG. 7

PROGRESSIVE BETTING SYSTEMS

CROSS REFERENCE TO RELATED APPLICATIONS

This application is a Continuation of application Ser. No. 17/745,759 filed on May 16, 2022, which is a Continuation of application Ser. No. 16/753,494 (now patent Ser. No. 11/335,166), which has a 371 filing date of Apr. 3, 2020, which is a 371 US National Stage Application of PCT Application No. PCT/CA2018/051248 filed on Oct. 3, 2018, which is a non-provisional of, and claims all benefit, including priority to, U.S. Application No. 62/567,457, entitled "PROGRESSIVE BETTING SYSTEMS", filed 3 Oct. 2017, incorporated herein by reference.

FIELD

Embodiments generally relate to the field of monitoring activities at gaming tables in casinos and other gaming establishments, and in particular, to monitoring game activities including betting activities at a plurality of gaming tables for a progressive game system using an image capturing component in relation to progressive jackpots.

BACKGROUND

Casinos and gaming establishments may offer a variety of games to customers. Games involve various game activities, such as card play and betting, for example. A card game may be played at a gaming table by players, including a dealer and one or more customers. It may be desirable for casinos or gaming establishments to monitor betting activities for security and management purposes. Other games include slot machines, pull-tab machines, or video poker machines.

Gaming establishments are diverse in layouts, lighting, and security measures, among others. For example, betting markers, such as chips, may have varying designs and markings that not only distinguish between chip types (e.g., chip values), but also different series of chips having the same values (e.g., to reduce the risk counterfeiting and/or to enable tracking).

SUMMARY

A computer system is described in some embodiments that is provided for addressing technical challenges arising from optical recognition (e.g., image data capture) of physical betting markers (e.g., chips) in relation to progressive jackpots. Progressive jackpots provide increased challenges due to an increased level of activity and coordination required as between monitoring systems situated at or covering different tables (e.g., where a progressive jackpot is based on monitored activities of a plurality of tables, each of which may be operating different game types) where potentially heterogeneous physical betting markers may be utilized. During a duration of game play, there may be different physical bet activities, lock-in events (e.g., sensor detects card taken out of dealer shoe), which are tracked by the computer system to update game states on a game monitoring server. In some embodiments, the rendering of user interfaces is controlled in relation to the tracked game states and events, for example, generating visual elements whose visual properties are dynamically modified in response to changes in game states and events, or current game states and events. Monitoring systems, in accordance with various embodiments, generate position data based on images tracked of physical betting markers on gaming surfaces, and apply object recognition mechanisms to the images to determine bet amounts, which are used for determination of progressive jackpot metrics. Game events are tracked accordingly, for example, where progressive jackpot amounts are decremented in response to jackpots being won.

In a further embodiment, the system interoperates with profile management systems to update and collect player identification data, which are used for associated progressive jackpot metrics. Data structures storing player profiles can be updated to include additional fields storing the progressive jackpot metrics.

The imaging component, in an example embodiment, resides or is coupled to a chip tray to generate images of the betting area from a perspective in accordance with locations on or in proximity to the chip tray, responsive to activation and deactivation events. Different cameras can be utilized having specific positioning and separation to provide depth perspectives, and may be configured for capturing different image types (e.g., ultraviolet radiation, infrared, visible light). Overlapping views can be utilized, for example, to establish parallax for depth perception, and offset angles can be utilized to improve coverage of the betting areas, especially useful in view of potential obstructions (e.g., player hands, drinks on table, shadows).

In accordance with an aspect, there is provided a system for monitoring progressive game activities at a plurality of gaming tables comprising. a plurality of table monitoring subsystems for the plurality of gaming tables. Each table monitoring subsystem comprises an imaging component positioned to capture image data of one or more chips positioned in at least one betting area on a gaming surface of a respective gaming table to generate a compressed set of image data of the one or more chips free of the background image data. Each table monitoring subsystem comprises one or more sensors responsive to activation events and deactivation events to trigger capture of the image data by the imaging component. The system comprises a progressive game monitoring server for collecting, processing and aggregating the compressed image data from the table monitoring subsystems and configured to generate aggregated betting data for the plurality of gaming tables, the aggregated betting data identifying betting amounts for the at least one betting area, and compute a progressive jackpot metric for increasing or decreasing one or more progressive jackpots of a progressive game based on the aggregated betting data. The system comprises a jackpot interface display for rendering visual elements of one or more progressive jackpot meters from the monitoring data from the progressive game monitoring server for provision to or display on end user systems, the jackpot interface device for receiving control commands from the progressive game monitoring server to control displaying the one or more progressive jackpots.

In some embodiments, the progressive game monitoring server is configured to generate position data of the one or more chips on the gaming surface based on the compressed image data, and to compute the progressive jackpot metric for increasing or decreasing one of the one or more progressive jackpots based on the position data of the one or more chips.

In some embodiments, the system comprises a system log-in to generate player identification data corresponding to one or more players at the plurality of gaming tables.

In some embodiments, the system comprises a card reader unit having an opening and a channel to receive a card, and a contact image sensor and an optical flow sensor mounted to the channel to capture image data corresponding to the card.

In some embodiments, the card reader unit capturing image data corresponding to the card triggers capture of the image data by the imaging component.

In some embodiments, the progressive game monitoring server is configured to collect the player identification data and associate the progressive jackpot metric with the player identification data.

In some embodiments, the aggregated betting data generated by the progressive game monitoring server identifies a first betting amount at a first betting area, and a second betting amount at a second betting area, the first betting amount different from the second betting amount.

In some embodiments, the image data comprises a time stamp, and the progressive game server is configured to determine a winner of the progressive game based on the time stamp of the image data; dynamically compute a prize amount for the winner based on the one or more progressive jackpot amounts; and reset or decrease the one or more progressive based on the prize amount.

In some embodiments, the progressive game monitoring server is configured to generate a display enhancement indicative of a size of the one or more progressive jackpots, and to send a control command to the jackpot interface device to display the display enhancement on the jackpot interface device.

In some embodiments, the system comprises an interface engine adapted to provision an interface providing real or near-real-time betting data to a dealer, the real or near-real-time betting data based on the betting data extracted by the game monitoring server from the captured image data, the betting data including one or more estimated values the one or more chips in one or more betting areas of the gaming surface.

In some embodiments, the progressive game monitoring server is configured to pre-process the captured image data to filter out at least a portion of background image data.

In some embodiments, the progressive game monitoring server is configured to detect a lock-in event to trigger the computation of the progressive jackpot metric.

In some embodiments, the table monitoring subsystem comprises a first imaging component configured to be positioned or supported on a first surface of a chip tray, and a second imaging component configured to be positioned or supported on a second surface of a chip tray. The first imaging component and the second imaging component are configured to capture image data corresponding to one or more chips positioned in the at least one betting area on the gaming surface of the respective gaming table when the chip tray is affixed to the gaming table. The table monitoring subsystem comprises the one or more sensors responsive to activation events and deactivation events to trigger capture of the image data by the first imaging component and the second imaging component. The table monitoring subsystem comprises a communication link and a processor configured for transmitting the captured image data or a compressed set of the captured image data to generate bet data for the gaming table, the bet data including betting amounts and position of the bet for the at least one betting area.

In some embodiments, each of the first imaging component and the second imaging component comprises a plurality of cameras selected from the group consisting of a red-green-blue camera, an infrared camera, an auxiliary camera, a high resolution camera, and an ultraviolet camera.

In some embodiments, each of the first imaging component and the second imaging component comprises an emitter configured to emit light detectable by at least one of the plurality of cameras.

In some embodiments, each of the first imaging component and the second imaging component comprises an infrared radiation emitter, an infrared radiation sensitive camera, and a visible light-sensitive camera, and the table monitoring subsystem further comprises a port to transmit captured at least visible information and captured at least infrared radiation from the at least two cameras to the processor.

In some embodiments, the infrared sensitive camera comprises a camera sensitive to infrared radiation with a cut-off filter lens between the infrared sensitive camera at the at least one betting area on the gaming table.

In some embodiments, the infrared radiation sensitive camera and the visible light-sensitive camera have sufficient horizontal separation such that collected image data from the combination of the infrared radiation sensitive camera and the visible light-sensitive camera enables display of a visible image with depth perspective on a display screen.

In some embodiments, the system comprises a processor in communication with the port and a visual display device having a display surface facing away from the betting areas, the processor configured to convert captured at least visible information and captured at least infrared radiation from the at least two cameras into image data for display on the display device.

In some embodiments, the first imaging component comprises a third camera that is sensitive to ultraviolet radiation.

In some embodiments, the table monitoring subsystem comprises multiple imaging components that are secured to a single support, the support having a visible radiation emitter positioned to emit radiation at an angle approximately perpendicular to a forward surface of the support.

In some embodiments, at least two of the multiple imaging components are symmetrically disposed on the single support.

In some embodiments, with respect to a nominal line centered on the support, at least two of the multiple imaging components are angled outwardly from the nominal line with capture ranges of the cameras in each of the at least two multiple components overlapping on the nominal line.

In some embodiments, the table monitoring subsystem comprises four imaging components, wherein fields of focus for all cameras in adjacent imaging components overlap at areas on the gaming surface of the gaming table corresponding to the betting areas.

In some embodiments, the first imaging component comprises a first camera and a second camera, the first camera having a first field of view, the second camera having a second field of view, the first imaging component comprising a first bet recognition module and a second bet recognition module connected at an angle, the first camera housed within the first bet recognition module and the second camera housed within the second bet recognition module so that the first field of view overlaps with the second field of view based on the angle.

In some embodiments, the first imaging component and the second imaging component are joined together by a third imaging component interposed therebetween, the third imaging component configured to capture image data corresponding to the one or more chips positioned in at least one betting area on the gaming surface of the respective gaming table.

In some embodiments, the imaging components are positioned to capture the image data at an offset angle and at an altitude relative to a plane of the gaming surface of the respective gaming table; and wherein the offset angle permits the imaging components to capture the image data from sidewalls of the one or more chips.

In some embodiments, the offset angle is an angle selected from the group of angles consisting of about −5 degrees, about −4 degrees, about −3 degrees, about −2 degrees, about −1 degrees, about 0 degrees, about 1 degrees, about 2 degrees, about 3 degrees, about 4 degrees, and about 5 degrees; and the altitude is an altitude selected from the group of altitudes consisting of about 0.2 cm, about 0.3 cm, about 0.4 cm, about 0.5 cm, about 0.6 cm, about 0.7 cm, about 0.8 cm, about 0.9 cm, and about 1.0 cm.

In some embodiments, the system comprises an illumination strip to provide a reference illumination and a restrictor configured to restrict a beam angle of the reference illumination.

In some embodiments, the system comprises an illumination strip adapted to provide a reference illumination on the one or more chips, the illumination strip positioned at a substantially horizontal angle to provide illumination on the sidewalls of the one or more chips; the substantially horizontal angle selected such that the presence of shadows on the one or more chips is reduced.

In some embodiments, the illumination strip is controllable by the processor and configured to provide the reference illumination in accordance with control signals received from the processor, wherein the control signals, when processed by the illumination strip, cause the illumination strip to change an intensity of the reference illumination based at least on ambient lighting conditions, the control signals adapted to implement a feedback loop wherein the reference illumination on the one or more chips is substantially constant despite changes to the ambient lighting conditions.

In accordance with another aspect, there is provided a method for monitoring progressive game activities at a plurality of gaming tables comprising: detecting an activation or deactivation event; capturing, in response to the detecting activation events and deactivation events, image data of one or more chips positioned in at least one betting area on a gaming surface of a gaming table; pre-processing the captured image data to filter out at least a portion of background image data and generate a compressed set of image data of the one or more chips free of the background image data; collecting, processing and aggregating the compressed image data to: generate aggregated betting data for the plurality of gaming tables, the aggregated betting data identifying betting amounts for the at least one betting area; and compute a progressive jackpot metric for increasing or decreasing one or more progressive jackpots of a progressive game based on the aggregated betting data; and displaying the one or more progressive jackpots.

BRIEF DESCRIPTION OF DRAWINGS

FIG. 6 illustrates a schematic of a database table of the system of FIG. 1 having data corresponding to bets made by a player at a gaming table;

FIG. 7 illustrates a schematic of a database table of the system of FIG. 1 having configuration and parameter data of a progressive game;

DETAILED DESCRIPTION

Figure 1A:
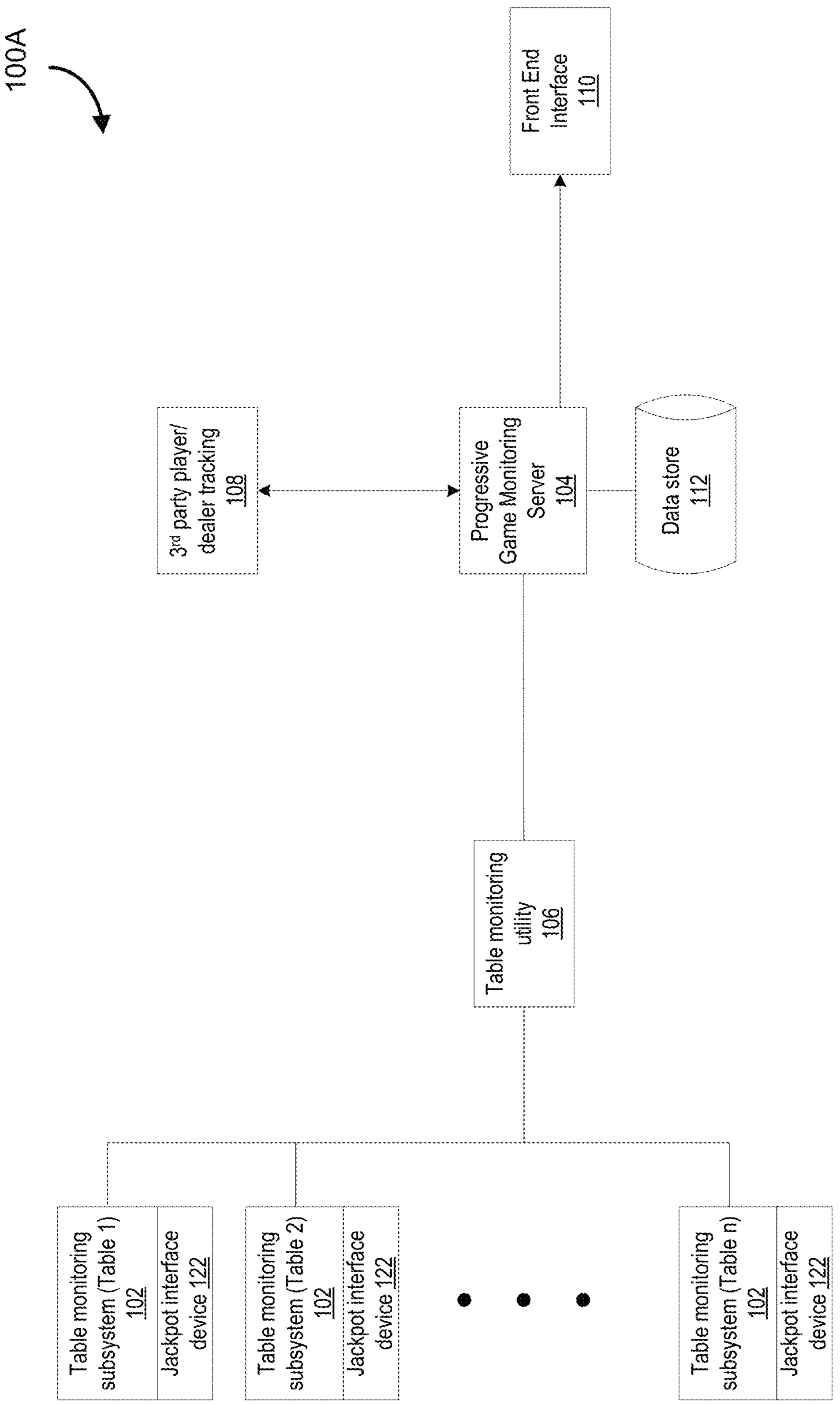
FIGS. 1A, 1B, and 1C illustrate block diagrams of a system for monitoring progressive game activities at a plurality of gaming tables according to some embodiments.

A progressive game system can include logic for calculating and updating a progressive jackpot that increases each time a bet is made for playing a progressive game. When the progressive game is won, such as by achieving a particular result while playing a base game, a progressive prize can be dynamically calculated for one or more winners and awarded. The progressive jackpot is reset to a predetermined value, and resumes increasing as more bets are made for playing the progressive game. Bets made from gaming machines, such as slot machines, pull-tab machines, or video poker machines, may also contribute to the same progressive jackpot, which may increase the size of the progressive jackpot to a large value.

The size of the progressive jackpot, and the relative ease with which to play a progressive game, may appeal to a customer at a gaming establishment. Accordingly, gaming establishments may offer a progressive game system with their gaming machines to encourage customers to play the base game offered at the gaming machines.

Progressive game systems may be applied to games played at a gaming table that use physical game elements and betting markers, such as poker cards and poker chips. For example, card game activities may generally include dealing card hands, betting, playing card hands, and so on. Card game activities may not be simply limited to those games with "cards", other types of games involving physical markers may also be included (e.g., Pai Gow tiles, mah-jong tiles), dice, etc.

It can be difficult to accurately track bets that have different sizes or that use different denominations of betting markers. As such, existing progressive games may limit each customer to make bets of the same value using the same denomination of betting markers, as manual recordation of bets by a dealer, pit boss, or casino manager for a progressive game at a gaming table that have different values or use different denominations of betting markers may be unduly cumbersome, time-consuming, and inaccurate. Embodiments described herein are not limited to managing one jackpot, and can manage multiple jackpots. Embodiments described herein can monitor gaming activities across different tables and for different bet amounts to compute the progressive game. The rate at which the value of the progressive jackpot increases may also be limited.

Embodiments described herein relate to a system for monitoring progressive game activities at a plurality of gaming tables. The base game played at the plurality of gaming tables may be the same base game or different base games. The plurality of gaming tables may be at the same geographical location or different geographical locations. The system can include a table monitoring subsystem for capturing image data to identify that a bet to play a progressive game has been made, and to compute an amount of the bet. A bet made at a first betting area of the gaming table may have a different amount and use different denomination of betting markers than a bet made at a second betting area of the gaming table, or may have the same amount or use the same denominations of betting markers. Similarly, a bet made at a first gaming table may have a different amount and use different denomination of betting markers than a bet made at a second gaming table, or may have the same amount or use the same denominations of betting markers. The system can detect a lock-in event. The system may increase one or more of a plurality of progressive jackpots based on a percentage of the bet. The system may determine that a player has won one or more of the progressive jackpot, and may decrease size the progressive jackpot accordingly. The size of one or more of the jackpot may be displayed on a display. The winner of the progressive jackpot may be awarded a progressive prize, the size of which may vary based on the amount of the bet. The system can monitor and collect bet data as described in U.S. patent application Ser. No. 15/309,102 and PCT Application No. PCT/CA2016/050442, and U.S. Patent Application No. 62/519,637, the entire contents of which are hereby incorporated by reference.

As an example embodiment, the system can be configured to read and identify a bet event and compute a bet size or amount for the bet. If the system determines the bet to be a fixed amount then the system can continue to monitor bet activities and lock-in events, which may be an indication that the bets are done being made. If the system determines the bet to be a varied amount then the system can allocate the bet amount for variable input into the progressive jackpot calculation. The variable input can be based on the percentage of the total to different meters (e.g. interface displays for the jackpot) or the percentage of the total to the house. The system can monitor betting activities using imaging components as described herein.

The system can be configured to detect a "Lock In" event, which may indicate that betting is complete and bets are done being made.

For example, the system may comprise a hand count device for counting the number of hands played at a particular gaming table. For example, when the game played at the gaming table is a card game that may use poker cards, the hand count device may count the number of card hands played at the particular gaming table. A player may have multiple card hands over multiple games, with different bets associated with hands. A hand count device may count the number of hands played at a gaming table, where the hands may be played by various players. The hand count device may determine a player hand count may be over a time period. The hand count device may associate hand count data with a particular gaming table, dealer, customers, geographic location, subset of gaming tables, game type, and so on. Each hand count device may transmit hand count data from a sensor array to hand count utility for provision to progressive game monitoring server.

The hand count device may capture hand event data, which may be processed by the progressive game monitoring server to generate hand count data, such as hand start event data and hand stop event data. Hand start event data indicates the start of a new hand. Hand stop event data indicates the end of a hand. Together with timestamps these values may be used to compute hand duration and other data values. The sensors may be positioned on the gaming table to detect card hand activities and trigger hand start events and hand stop events. The sensors may provide event data defining various card play events to other system components. The sensors may deliver real time data regarding card play activity, including hand start event data and hand stop event data.

The sensors of the hand count device may be configured with particular timing or threshold value for when the sensor would be set off to transmit event data used to count card hands. An example trigger for hand start event data may be sensor activation for a threshold value, for example two, three or four seconds. An example trigger for hand stop event data may be sensor deactivation for a threshold value.

The hand count device may be configured with one or more sensors to generate game event data for provision to the progressive game monitoring server device. The hand event data may include hand start data and hand stop data. The hand event data may be used to determine a hand count for a particular gaming table for a particular period of time. The hand event data (e.g., hand start data and hand stop data) may be processed and transformed by progressive game monitoring server to generate hand count data. The hand count device may be configured with one or more sensor threshold values to trigger hand start and hand stop event data for the hand count. For example, if the sensor array is uncovered for X milliseconds (e.g., 2000 milliseconds) it will assume the hand has been finished and generate a hand stop event. To start the hand, if any sensor (or a particular portion) of the array is receiving reflected light above a threshold for two seconds the hand start event may be triggered.

Hand count device may include sensors, such as, for example, laser sensors with optical emitters and receivers. Laser sensors, instead of other types such as ambient light sensors, may be advantageous to reduce the effect of lighting in the environment, to not require special table top felt material, to waterproof the device, and so on. Ambient light sensors may not work well if a part of the table is not well lit, as those types of sensors are looking for darkness for object detection. Hand count device may use optical receiver and emitter sensors that look for light for object detection. Additional types of sensors include radio frequency and optics. The sensors may be organized to form a sensor array. Hand count device may further include an infrared receiver and infrared emitter or transmitter for electronic data exchange. The sensors are particularly configured and positioned relative to the play area and bet area on the gaming table. For example, a sensor array may be positioned proximate to the card play area and bet area. The device may be configured to provide a particular distance between sensor and card play area or bet area, such as a one centimeter distance, for example.

The sensors of hand count device may be positioned on the gaming table to detect card hand activities and trigger hand start events and hand stop events.

The data from the hand count device may be used to determine a hand count (e.g., the number of hands played by various players) for a particular gaming table for a particular period of time.

The data from the hand count device may be used as a record of a financial transaction between the gaming establishment and the player playing a game at the gaming table. For example, when the hand count device captures data corresponding to the start of a hand, this may indicate that a bet made by the player has become property of the gaming establishment. If a player wins a game, then the player may receive a prize or a payout (e.g. the size of the prize or payout may be 2 to 1) for the bet made by the player and paid to the gaming establishment to participate in a round of play of the game.

Further details on the hand count device and monitoring the number of hands played by various players is described in U.S. patent application Ser. No. 15/309,102 and PCT Application No. PCT/CA2016/050442, patent application Ser. No. 15/518,874 and PCT Application No. PCT/CA2015/000539, the entire contents of which is hereby incorporated by reference.

As another example, the betting may be complete and the bets may be locked in when a card is taken out of a card shoe, as detected by a sensor on the card shoe and the data corresponding to the card taken out of the card shoe is processed. The card shoe may be a smart dealer shoe. Accordingly, a trigger from a smart dealer shoe may be a "Lock In" event. As another example, the dealer may perform a gesture to the players at the gaming table to indicate that betting may be complete and that the bets are locked in. As another example, the dealer may press a button or virtual button rendered on a display of a table monitoring subsystem and may send a control command to the progressive game monitoring server indicating that the betting is complete and that the bets are locked in.

After the betting is complete and the bets are locked in, the system for monitoring progressive game activities at a plurality of gaming tables is configured to tracked whether the dealer or player is handling the chips that have been used as bets.

The lock-in event may be identified by lights and signals. Examples include a hand count (HC) light, or a blink on the diffuser LEDs, or onscreen for dealer.

The system can be configured to generated and control a meter as a visual element on an interface display that dynamically moves in response to the progressive jackpot. Example increment meter(s) logic includes:

Jackpot A X % Wager Multiplier (Royal Flush) (100/500/1000 to/for 1)
Jackpot B X % Wager Multiplier (Straight Flush)
Jackpot C X % Wager Multiplier (Four Kings)
Jackpot D X % Wager Multiplier (Full House)
Jackpot E X % Wager Multiplier (Flush)
Jackpot F X % Wager Multiplier (Straight) (5 to 1) (Take from Tray)
Jackpot G X % Wager Multiplier (Three of a Kind) (3 to 1) (Take from Tray)
(Reset) Reaches Reset—Stop
Reaches Reset—Continue
Winner—Decrement Meter (Non Jackpot)
Yes—Take Amount From Meter A, B, C, D, E, F, G . . . ProRate
No—Take From Tray?
Jackpot—Take from Meter Reset
Rest $<Needed, then Deficit & Reset Meter
Rest $>Needed, then Reset Meter Embodiments can include a system that determines a winner using the betting activity data and generates a decrement meter for updating the progressive jackpot. The following provides an example operation:

Yes—Take Amount From Meter A, B, C, D, E, F, G . . . ProRate
No—Take From Tray
Jackpot—Take from Meter Reset
Rest $<Needed, then Deficit and Reset Meter
Rest $>Needed, then Reset Meter Embodiments can include different meters for different, independent progressive jackpots and player tracking data subsets for those jackpots. The tracking data can be linked to a jackpot identifier.

Embodiments described herein relate to systems and methods for playing a progressive jackpot game at a gaming table of a gaming establishment. The progressive jackpot system has a table monitoring subsystem at the tables playing the progressive game. Each table monitoring subsystem may have an imaging component for capturing image data of bets, which may be the same or different values or be made using betting markers of the same or different denominations, made for playing the progressive jackpot game. The progressive game monitoring server may process the image data captured by the imaging component to determine the position of the betting markers relative to the gaming table to determine if the bet was made for playing the progressive jackpot game, and to determine the value of the bet. A progressive game server may increase a size of one or more jackpots using the bet made for playing the progressive jackpot game. The progressive game server may display the size of one or more jackpots on a display interface. The progressive game server may determine a winner of the progressive game and associate a progressive prize to the winner. The size of the progressive prize may be based on the value of the bet made for playing the progressive game.

The games played at different gaming tables may be different, but the outcomes associated with winning a progressive jackpot while playing the different games at the different gaming tables may be the same. For example, at a first gaming table, a Let It Ride poker game may be played. At a second gaming table, a Mississippi Stud poker game may be played. Both types of poker games use one deck of cards. Accordingly, the odds of getting poker hands, such as a royal flush, a straight flush, four of a kind, a full house, a flush, one pair, and so on, are the same for both poker games. A system for monitoring progressive game activities at a plurality of gaming tables may monitor progressive game activities at these first and second gaming tables.

In an aspect, embodiments may include at least a device for monitoring table activities at a gaming table, such gaming activity including but not limited to placement of wagers, side bets, ante wagers, play wagers, and additional wagers. The device may identify the players at the gaming table, and may identify the gaming table upon which the device is used.

The imaging components of the device may be positioned to image a gaming surface of the gaming table on which a chip tray is affixed to the gaming table. The device may be retrofit to a gaming table by physical attachment of the device into or onto a gaming table, also adding a processor and visual display system as needed.

The data, including bet data, the number and value of chips in the chip tray, the position of the bet on the gaming surface, the player identification data, table identification data, may be used by casino operators and third parties for data analytics, security, customer promotions, casino management, monitoring activities for progressive games, managing a progressive game, and so on. Games may not be necessarily limited to card games, and may include dice games, event betting, other table games, among others. The data may be used to monitor bets made by players during the course of a progressive game, to increase or decrease the size of one or more progressive jackpots, and to award a player who won a progressive game from the one or more jackpots.

In accordance with an aspect of embodiments described herein, table monitoring devices may be used to retrofit gaming tables. The monitoring devices may be integrated with the gaming tables to provide a smooth working area in a manner that does not catch on cards or chips. The monitoring device may not require changing of a gaming table top as it may be integrate with the structure of existing gaming tables. An example of a monitoring device is a table monitoring subsystem, as described herein.

A system for monitoring progressive game activities at a plurality of gaming tables includes table monitoring subsystems for the plurality of gaming tables. Each table monitoring subsystem has an imaging component positioned on a respective gaming table or proximate thereto to capture image data of one or more chips positioned in at least one betting area on a gaming surface of the respective gaming table and, in response, pre-process the captured image data to filter out at least a portion of background image data and generate a compressed set of image data of the one or more chips free of the background image data. Each table monitoring subsystem can have one or more sensors responsive to activation events and deactivation events to trigger capture of the image data by the imaging component.

Tracking bet activities and the transfer of chips that are on-going at a gaming facility is a non-trivial task that has myriad financial consequences. Accurate bet tracking and chip transfers may be important as it may be used to more closely monitor the revenues and outflows of the gaming facility, identify patterns (e.g., theft, collusion), and provide an enhanced gaming experience. For example, tracked bet information, in the form of betting records, may be used to determine compensation levels for loyal players (e.g., the accurate provisioning of "comps" in relation to overall casino returns), rebates, etc., or track dealer and/or game performance. As another example, by tracking the amount of chips in a chip tray, casino operators can be alerted to when trays need to be refilled with chips, or if chips have been incorrectly removed from the trays. A system for monitoring progressive game activities with accurate bet tracking and chip transfers may be allow bets having different amounts or bets using different denominations of betting markers to be used when playing a progressive game. For example, a first player at a first gaming table may make a bet to play a progressive game, the bet having a first amount and using three different denominations of chips, and a second player at a second gaming table may make a bet to play the same progressive game, the bet having a second amount that is different than the first amount, and using certain denominations of chips, some of which may be the same as those of the bet made by the first player, while others may be different from those of the bet made by the first player. A system for monitoring progressive game activities with accurate bet tracking and chip transfers having one or more than one progressive jackpot, and may increase or decrease the value of one or more jackpots based on the data received from the table monitoring subsystem corresponding to the bets made by players playing the progressive game.

Bets are often performed in conjunction with games (e.g., baccarat, poker, craps, roulette, progressive game) or events (e.g., horse racing, professional sports, political outcomes). When playing a game at a gaming table having a gaming surface, bets may be placed on a particular betting area of the gaming surface to indicate that a player is betting on a particular outcome of the game or event. Placement of a bet on different betting areas may indicate that a player is betting on different outcomes of the game or event. Chips are often transferred after the games or events are over (e.g. after a player wins a game, chips are transferred from a dealer to the player; after a winner has been determined upon conclusion of an event, chips are transferred to the winner). Traditionally, some bets are placed with the aid of specially configured markers (e.g., chips). These bet markers may have various colours, markings, and/or patterns on them, and are often distinguished from one another so that it is easy to track the value of each of the markers (e.g., denominations, characteristics). Some of the markers are designed with a particular facility in mind, and accordingly, may vary from facility to facility. For example, facilities may include casinos, gaming halls, among others.

Betting markers, such as chips, may have varying designs and markings that not only distinguish between chip types (e.g., chip values, denominations), but also different series of chips having the same values (e.g., to reduce the risk counterfeiting and/or to enable tracking). For example, such variations may be purposefully and periodically introduced such that counterfeiters may have a harder time successfully copying chip designs.

Accordingly, a flexible implementation may be preferable so that a diverse range of conditions and chips can be used with the system. For example, in some embodiments, a system is provided that is configured for interoperation with a diverse range of chip types, and also to flexibly adapt in view of modifications to chip designs and markings. In such embodiments, the system is not "hard coded" to associate specific colours, markings, and/or patterns with chip values, but rather, applies machine-learning to dynamically associate and create linkages as new chip types are introduced into the system. Interoperability may be further beneficial where a single system can be provisioned to different gaming facilities having different needs and environments, and the system may, in some embodiments, adapt flexibly in response to such differences (e.g., by modifying characteristics of a reference illumination on the chips, adapting defined feature recognition linkages, adapting imaging characteristics, image data processing steps, etc.).

The bet markers, such as chips, when used for betting, are often provided in physical form and placed individually or in "stacks" that are provided in specific betting areas on tables so that a dealer can see that a player has made a bet on a particular outcome and/or during a betting round. A game or event may include multiple betting rounds, where a player is able to make a particular bet in conjunction with a phase and/or a round in the game or event. The betting may result in a win, loss, push, or other outcome, and the player may be paid chips equivalent to an amount of winnings. A system for monitoring progressive game activities with accurate bet tracking and chip transfers may be allow for progressive games where the winnings are a function of the amount bet. For example, the amount of winnings is the amount of the bet multiplied by a multiplier. A system for monitoring progressive game activities with accurate bet tracking and chip transfers may be allow the odds of winning the progressive game to be based on the amount of the bet. For example, a first bet of a certain amount may have certain odds to win the progressive game, and a second bet that is twice as large as the first bet may have twice the odds to win the progressive game.

At a gaming table, the bet markers, such as chips, of a facility (e.g. casino, gaming hall, etc.) are overseen by a dealer, pit boss, or an employee of the facility and are often provided in physical form and placed channels provided in a chip tray on the gaming table. Upon conclusion of a game or event, the transfer of chips is determined based on the result of the game or event. For example, the game or event may result in a win for a player, so the player may be paid chips equivalent to an amount of winnings, in part, from the facility's chips that are in the chip tray. As another example, the game or event may result in a loss for the player, so the chips used by the player to make bets during the game or event are lost to the casino, and are placed in the channels of the chip tray.

The ability to track bets, chip transfers, bet placements, player identification, and table identification, in real or near-real time may be of commercial and financial importance to a gaming facility. Inaccurate tracking of such data may lead to increased management overhead and/or an inability to accurately track betting, winnings, and losses, which may, for example, lead to missed opportunities to enhance player experience, or missed malicious behavior trends. For example, analyzing betting patterns and chip transfers may indicate that some players are "gaming the system" by placing suspicious bets (e.g., due to card counting, hole carding), or may indicate particularly profitable bets for the gaming facility (e.g., Blackjack insurance bets). The bet tracking and chip transfer information may be utilized in conjunction with other types of backend systems, such as a hand counting system, a security management system, a player compensation system (e.g., for calculating when complimentary items/bonuses are provided), etc. Bet recognition and chip transfer information may also be used in gaming training systems, where players can be informed that their betting was not efficient or suboptimal based on computer-based simulation and calculation of odds (e.g., for Texas Hold-em poker, efficient betting may be determined based on mathematical odds and table positioning, especially for structured betting games and/or pot-limit and limit games, and may also be influenced by the presence of rule modifications). Accurate bet tracking and chip transfers in real or near-real time may allow gaming establishments to provide progressive games with more complexity, such as the ability to accept bets of different sizes and using different denominations of bet markers, a plurality of progressive jackpots, and payouts that vary with the bets. This may promote excitement for the player playing the progressive game, and may encourage more bets or bets of greater size to be made when playing the progressive game, which may benefit the profitability of the gaming establishment.

In some embodiments, bet tracking information, chip transfer information, player identification data, or table identification data, may be collected using machine-vision capable sensors that may be present on a gaming table or surface, or other type of gaming machine. These machine-vision capable sensors monitor betting areas and the chip tray to determine the types of chips placed on the betting areas of the gaming surface of the gaming table, and estimate the value of bets, tracking betting as betting progresses from round to round and from game to game, and estimating the winnings and losses for the players and the gaming facility. As many gaming facilities have invested significantly into their existing chips, tables, chip trays, technologies, and/or layouts, some embodiments described herein are designed for flexibility and interoperation with a variety of existing technologies and architectures. Machine vision is not limited to imaging in the visual spectrum, but may also include, in various embodiments, imaging in other frequency spectra, RADAR, SONAR, etc. Machine vision may include image processing techniques, such as filtering, registration, stitching, thresholding, pixel counting, segmentation, edge detection, optical character recognition, among others.

Accordingly, a table monitoring subsystem may benefit from being able to be retrofit into existing tables and/or layouts, and interface with other table and/or gaming facility management systems (e.g., to communicate information regarding betting activities). Machine-learning techniques (e.g., random forests) may be utilized and refined such that visual features representative of different chip values are readily identified, despite variations between different facilities, lighting conditions and chip types. For example, such a system may not necessarily need to have hard-coded reference libraries of what chips should look like for each value, and instead, may be flexibly provisioned during the calibration process to build a reference library using real-world images of chips to train a base set of features. Accordingly, in some embodiments, the system may be utilized without a priori knowledge of the markers present on the various betting markers, such as chips. This may be useful where a system may need to account for introduced variations in chip design, which, for security reasons, are not distributed ahead of introduction.

A potential challenge with tracking bets and chip transfers is that there are a diversity of betting markers, objects on a gaming surface, lighting conditions that may lead to complexities in relation to accurately determining what bet markers are present, and further, what value should be attributed to a chip. Bets may be placed off-center by players, chips may not be uniformly stacked in a betting area or in a channel of a chip tray, chips may be obscuring one another, players or dealers may obscure chips using their hands, players may be deliberately modifying their bets (e.g., surreptitiously adding to a bet after cards have been dealt to obtain a higher payout), dealers may be deliberately taking chips from the chip tray, etc. Table monitoring, such as bet recognition, tracking chip transfers, bet placement recognition, player identification and table identification, also is preferably conducted with minimal disruption to the operations of the gaming facility or player experience.

There may also be limitations on the amount of available computing resources, and given that many gaming tables operate with a high volume of games per hour, there is limited time available for processing (especially where table monitoring data, such as bet data, chip transfer data, bet position data, player identification data, and table identification data, is being tracked in real or near-real time). Gaming facilities may have computational resources available at different locations, and these locations may need to communicate with one another over limited bandwidth connections. For example, there may be some computing components provided at or near a gaming table such that pre-processing may be conducted on sensory data, so that a compressed and/or extracted set of data may be passed to a backend for more computationally intensive analysis. In some embodiments, the backend may revert computed information back to the computing components provided at or near a gaming table so that a dealer or a pit-boss, or other gaming facility employee may use an interface to monitor betting activities (e.g., to determine “comp” amounts, track suspicious betting patterns, identify miscalculated payouts, winners of a progressive game).

Table monitoring subsystems may utilize sensors positioned at a variety of different locations to obtain information. For example, the table monitoring subsystem may utilize cameras housed in one or more bet recognition modules of the table monitoring subsystem. As another example, the table monitoring subsystem may utilize cameras directed towards the chip tray or sensors mounted to the channels of the chip tray. As another example, table monitoring subsystem may utilize overhead cameras, such as existing security cameras to calibrate the imaging components of the bet recognition modules. As another example, the table monitoring subsystem may utilize sensors embedded in the gaming table to identify placement of objects on the gaming table or track hand positioning and gestures of players and dealers. As another example, the table monitoring subsystem may have a log-in system, such as a card reader unit or a key pad for receiving player identification or table identification.

FIG. 1A illustrates a block diagram of a system 100A for monitoring progressive game activities at a plurality of gaming tables according to some embodiments. The system 100A may be configured such that sensors and/or imaging components are utilized to track betting activities and transfers of chips, bet positions, player identification data and table identification data, generating image and sensory data that is sent to a backend for processing. The betting activities and bet positions may be provided in the form of chips being placed in betting areas of the gaming surface of the gaming table. The chip transfers may be provided in the form of chips being placed in or removed from channels of a chip tray. Player identification data and table identification data may be provided in the form of passcodes or identification cards input or detected at a log-in system. The sensors and/or imaging components may include machine-vision sensors, including cameras, adapted for capturing images of the betting areas.

As depicted, the system 100A includes table monitoring subsystems 102 (1 to N) integrated with gaming tables (1 to N). The table monitoring subsystems 102 may include various sensors and imaging components, among other physical hardware devices. The table monitoring subsystems 102 and the associated gaming tables may be playing a same or different base game, be at the same or different physical location, or be associated with the same or different gaming establishment.

Each table monitoring subsystem 102 has an imaging component for capturing image data for the gaming table surface. The gaming table surface has defined betting areas, and the imaging component captures image data for the betting areas. A transceiver transmits the captured image data over a network and receives calibration data for calibrating the table monitoring subsystem 102 for the betting areas. Table monitoring subsystem 102 may also include a sensor component and a scale component, in some embodiments. The sensor component or scale component may detect that a betting marker has been positioned on a particular betting area of the gaming surface of the gaming table. The image data may, for example, focus on a particular region of interest or regions of interest that are within the field of view of the sensor component.

In some embodiments, each table monitoring subsystem 102 has an imaging component for capturing image data for the chip tray. The chip tray has one or more channels, and the imaging component captures image data for the channels. A transceiver transmits the captured image data of the chip tray over a network and receives calibration data for calibrating the table monitoring subsystem 102 for the channels of the chip tray.

In some embodiments, the table monitoring subsystem 102 comprises a first imaging component configured to be positioned or supported on a first surface of a chip tray, and a second imaging component configured to be positioned or supported on a second surface of a chip tray. The first imaging component and the second imaging component may be configured to capture image data corresponding to betting markers, such as poker chips, positioned in one or more betting areas on the gaming surface of the gaming table. The table monitoring subsystem 102 may comprise one or more sensors responsive to activation events and deactivation events to trigger capture of the image data by the first imaging component and the second imaging component. The table monitoring subsystem 102 may comprise a communication link and a processor configured for transmitting the captured image data or a compressed set of the captured image data to generate bet data for the gaming table, the bet data including betting amounts and position of the bet for the at least one betting area.

The table monitoring subsystem 102 may comprise sensors, such as time of flight sensor or optic sensors for triggering capture of the image data or capturing the image data.

Each of the first imaging component and the second imaging component of the table monitoring subsystem 102 may comprise a plurality of cameras selected from the group consisting of a red-green-blue camera, an infrared camera, an auxiliary camera, a high resolution camera, and an ultraviolet camera. Each of the first imaging component and the second imaging component comprises an emitter configured to emit light detectable by at least one of the plurality of cameras.

In some embodiments, each of the first imaging component and the second imaging component of the table monitoring subsystem 102 comprises an infrared radiation emitter, an infrared radiation sensitive camera, and a visible light-sensitive camera, and the table monitoring subsystem 102 further comprises a port to transmit captured at least visible information and captured at least infrared radiation from the at least two cameras to the processor.

Where the imaging component of the table monitoring subsystem 102 comprises an infrared sensitive camera, the infrared sensitive camera may comprise a camera sensitive to infrared radiation with a cut-off filter lens between the infrared sensitive camera at the at least one betting area on the gaming table.

In some embodiments, the table monitoring subsystem 102 may comprise infrared radiation sensitive camera and the visible light-sensitive camera. The infrared radiation sensitive camera and the visible light-sensitive camera may be sufficiently separated, such as horizontally separated, such that collected image data from the combination of the infrared radiation sensitive camera and the visible light-sensitive camera enables display of a visible image with depth perspective on a display screen.

In some embodiments, the table monitoring subsystem 102 may comprise a processor in communication with the port and a visual display device having a display surface facing away from the betting areas. The processor may be configured to convert captured at least visible information and captured at least infrared radiation from the cameras into image data for display on the display device.

In some embodiments, the imaging component of the table monitoring subsystem 102 comprises a third camera that is sensitive to ultraviolet radiation.

In some embodiments, the table monitoring subsystem 102 may comprise multiple imaging components. The multiple imaging components may be secured to a single support. The support may have a visible radiation emitter positioned to emit radiation at an angle approximately perpendicular to a forward surface of the support.

Where the table monitoring subsystem 102 comprises multiple imaging components, at least two of the multiple imaging components may be symmetrically disposed on the single support. With respect to a nominal line centered on the support, at least two of the multiple imaging components may be angled outwardly from the nominal line with capture ranges of the cameras in each of the at least two multiple components overlapping on the nominal line.

In some embodiments, the table monitoring subsystem 102 may comprise four imaging components. The fields of focus for all cameras in adjacent imaging components may overlap at areas on the gaming surface of the gaming table that correspond to the betting areas.

The first imaging component of the table monitoring subsystem 102 may comprise a first camera and a second camera. The first imaging component may comprise a first bet recognition module and a second bet recognition module connected at an angle, where the first camera is housed within the first bet recognition module and the second camera is housed within the second bet recognition module. The first camera may have a first field of view, and the second camera may have a second field of view. The first field of view of the first camera may overlap with the second field of view of the second camera based on the angle defined between the first and second bet recognition modules.

In some embodiments, the first imaging component and the second imaging component of the table monitoring subsystem 102 may be joined together by a third imaging component interposed therebetween. The third imaging component may be configured to capture image data corresponding to the one or more chips positioned in at least one betting area on the gaming surface of the gaming table.

The imaging components of the table monitoring subsystem 102 may be positioned to capture the image data at an offset angle and at an altitude relative to a plane of the gaming surface of the respective gaming table. This may permit the imaging components to capture the image data from sidewalls of the one or more chips. For example, the offset angle is an angle selected from the group of angles consisting of about −5 degrees, about −4 degrees, about −3 degrees, about −2 degrees, about −1 degrees, about 0 degrees, about 1 degrees, about 2 degrees, about 3 degrees, about 4 degrees, and about 5 degrees; and the altitude is an altitude selected from the group of altitudes consisting of about 0.2 cm, about 0.3 cm, about 0.4 cm, about 0.5 cm, about 0.6 cm, about 0.7 cm, about 0.8 cm, about 0.9 cm, and about 1.0 cm.

To provide light or illumination for reflecting off the betting markers, so that the image of the betting markers may be capture, the table monitoring subsystem 102 may comprise an illumination strip to provide a reference illumination and a restrictor configured to restrict a beam angle of the reference illumination. The illumination strip may be positioned at a substantially horizontal angle to provide illumination on the sidewalls of the one or more chips. The substantially horizontal angle may be selected such that the presence of shadows on the one or more chips is reduced.

The illumination strip may be controllable by the processor of the table monitoring subsystem 102 or the progressive game monitoring server and configured to provide the reference illumination in accordance with control signals received from the processor or the progressive game monitoring server. The control signals, when processed by the illumination strip, cause the illumination strip to change an intensity of the reference illumination based at least on ambient lighting conditions. The control signals may be adapted to implement a feedback loop wherein the reference illumination on the one or more chips is substantially constant despite changes to the ambient lighting conditions.

Further details on the hardware components and physical configurations of the table monitoring subsystem 102 are described in U.S. patent application Ser. No. 15/309,102 and PCT Application No. PCT/CA2016/050442, and U.S. Patent Application No. 62/519,637, the entire contents of which are hereby incorporated by reference.

Each table monitoring subsystem 102 may comprise a log-in system to capture player identification data and table identification data. The log-in system, which may include a card reader or a key pad, may be present on a gaming table or surface, or other type of gaming machine. The log-in system may be present on the table monitoring subsystems 102. A player may input a player code, such as by swiping a player identification card or inputting a password into the key pad, into the log-in system to identify that the player is at a particular gaming table.

In some embodiments, the table monitoring subsystem 102 may capture image data corresponding to player identification information to identify a player at a gaming table. For example, the table monitoring subsystem 102 may capture image data corresponding to the player's face, finger print, a player identification card, or a code on a token associated with the player. A dealer, pit boss, or casino manager may input a table code, such as by swiping a key card or inputting a password into the key pad, into the log-in system to identify the table. In some embodiments, the table monitoring subsystems 102 may capture image data of a code printed on a gaming table, which may be table identification data identifying the gaming table upon which the table monitoring subsystem is being used.

In some embodiments, the table monitoring subsystems 102 comprise hardware electronic circuitry that is coupled directly in or indirectly to a gaming surface. In some embodiments, the table monitoring subsystem 102 is integrated into the gaming surface. The table monitoring subsystem 102 may be provided as a retrofit for existing gaming surfaces (e.g., screwed in, integrally formed with a chip tray that is mounted to the gaming table).

The table monitoring subsystem 102 may further include illuminating components or other peripheral components utilized to increase the accuracy of the bet recognition and chip transfers. For example, an illumination strip may be provided that provides direct illumination to chip stacks in betting areas or chips in the chip tray such that the imaging component is more able to obtain consistent imagery, which may aid in processing and/or pre-processing of image data. Another peripheral component may include the use of pressure sensitive sensors at the betting area and/or in the chip tray to denote when there are chips present in the betting area or in a channel of the chip tray, and in some embodiments, the weight of the chips (e.g., which can be used to infer how many chips, which can be cross-checked against the image data).

The table monitoring subsystem 102 may have one or more processors and computational capabilities directly built into the table monitoring subsystem 102. In some embodiments, these computational capabilities may be limited in nature, but may provide for image pre-processing features that may be used to improve the efficiency (e.g., file-size, relevancy, redundancy, load balancing) of images and data ultimately provided to a backend for downstream processing. The table monitoring subsystem 102 may also include some storage features for maintaining past data and records. Some implementations provide for a very limited window of processing time (e.g., fast betting rounds or game resolution), and the pre-processing aids in speeding up computation so that it may be conducted in a feasible manner in view of resource constraints.

In some embodiments, the table monitoring subsystem 102 contains multiple physical processors, each of the physical processors associated with a corresponding imaging component or and adapted to track a particular bet area or a particular channel of a chip tray. One or more physical processors may be associated with the log-in system and adapted to track player identification data and table identification data. In such an embodiment, the system has increased redundancy as the failure of a processor may not result in a failure of the entirety of bet recognition capabilities, and the system may also provide for load balancing across each of the physical processors, improving the efficiency of computations. Each imaging component or sensor, or the log-in system, may be tracked, for example, using an individual processing thread.

In some embodiments, during the initial installation of the table monitoring subsystem 102 to a gaming table, the gaming table having a table identification, such as a serial number, the table identification may be input into the table monitoring subsystem 102 or may be associated with the table monitoring subsystem 102 to generate table identification data.

The system 100A includes a progressive game monitoring server 104 with a processor coupled to a data store 112. In some embodiments, the progressive game monitoring server 104 may reside on, near or proximate the gaming surface or gaming table. For example, the progressive game monitoring server 104 may include a computing system that is provided as part of a dealer terminal, a computer that is physically present at a gaming station, etc. In some embodiments, the progressive game monitoring server 104 may reside in a server room not located at the gaming establishments where the gaming tables are located.

The progressive game monitoring server 104 may be configured to collect, process, and aggregate the data from the table monitoring subsystems 102 and to generate aggregated betting data for the plurality of gaming tables, the aggregated betting data identifying betting amounts for the at least one betting area. The progressive game monitoring server 104 may be configured to compute a progressive jackpot metric for increasing or decreasing one or more progressive jackpots of a progressive game based on the aggregated betting data.

The progressive game monitoring server 104 is configured to receive data from the table monitoring subsystems 102 to manage one or more progressive jackpots of a progressive game. Based on the data from the table monitoring subsystems 102, such as data corresponding to bet data from one or more players and data corresponding to the betting markers and position of the betting markers on the table, the progressive game monitoring server 104 may compute a progressive jackpot metric for increasing one or more progressive jackpots. The progressive game monitoring server 104 may be further configured to process data corresponding to the outcome of a game, such as image data corresponding to one or more poker cards, and may determine that a player has won a progressive game. Accordingly, the progressive game monitoring server 104 may compute a progressive jackpot metric to decrease one or more progressive jackpots. Using player identification data corresponding to the player who won the progressive game, the progressive game monitoring server 104 may associate the progressive jackpot metric with the winner of the progressive game. The progressive game monitoring server 104 is configured to send control commands to a jackpot interface device to display one or more progressive jackpots.

The progressive game monitoring server 104 processes the data received from the table monitoring subsystems 102, including the image data corresponding to the bets made and the transfer of chips, the chips in the chip tray, the position of the bet on the gaming surface of the gaming table, the player identification data, and table identification data, over the network to detect, for each betting area, a number of chips and a final bet value for the chips, and for the chip tray, a number of chips in the channels and the value of the chips in the channels, the bet position, and the players playing at the gaming tables. The progressive game monitoring server 104 may also process other data including sensor data and scale data, as described herein.

The progressive game monitoring server 104 is configured to aggregate data received from the table monitoring subsystems 102 (e.g. the number and amount of bets placed on the gaming table, the number of chips placed in or removed from the chip tray, the position of the bets, the players at the gaming table) and transmit commands and data to table monitoring subsystems 102 and other connected devices. The progressive game monitoring server 104 processes and transforms the data from various table monitoring subsystems 102 to compute table monitoring data, including bet data, bet position, winnings and losses for the gaming facilities and players, the particular gaming table that the players are playing at, and to conduct other statistical analysis. Based on the aggregated data, the progressive game monitoring server 104 may be configured to compute a progressive jackpot metric for increasing or decreasing one or more progressive jackpots of a progressive game.

As depicted in FIG. 1A, the system 100A comprises one progressive game monitoring server 104. In some embodiments, the system 100A comprises one progressive game monitoring server 104. The plurality of progressive game monitoring servers 104 may collect, process, and aggregate portions of data from the table monitoring subsystems 102, the portions of data defining all the data from the table monitoring subsystems 102.

The progressive game monitoring server 104 may connect to the table monitoring subsystems 102 via a table monitoring utility 106. The table monitoring utility 106 aggregates data received from multiple table monitoring subsystems 102, including the image data corresponding to the bets made and the transfer of chips, the chips in the chip tray, data corresponding to the position of the chips on the gaming surface, the player identification data, and table identification data for provision to the progressive game monitoring server 104 in a tiered manner. In some example embodiments, progressive game monitoring server 104 may connect to multiple table monitoring utilities 106.

Each table monitoring subsystem 102 may be linked to a particular gaming table and monitor table activities at the gaming table. A gaming table may be retrofit to integrate with table monitoring subsystem 102. Table monitoring subsystem 102 may include one or more imaging components as described herein. In some embodiments, table monitoring subsystem 102 may also include sensors or scales to detect chips. Table monitoring subsystem 102 may include one or more log-in systems to receive log-in information from a player or a gaming establishment employee to generate player identification data or table identification data.

Table monitoring utility 106 connects table monitoring subsystem 102 to the progressive game monitoring server 104. Table monitoring utility 106 may act as a hub and aggregate, pre-process, normalize or otherwise transform table activity data, including image data of the gaming tables and the chip tray. In some embodiments, table monitoring utility 106 may relay data. Table monitoring utility 106 may be linked to a group of gaming tables, or a location, for example.

Table monitoring utility 106, for example, may be a backend server cluster or data center that has a larger set of available computing resources relative to the progressive game monitoring server 104. The table monitoring utility 106 may be configured to provide image data in the form of extracted and/or compressed information, and may also receive accompanying metadata tracked by the table monitoring subsystem 102, such as timestamps, clock synchronization information, dealer ID, player ID, image characteristics (e.g., aperture, shutter speed, white balance), tracked lighting conditions, reference illumination settings, among others.

This accompanying metadata, for example, may be used to provide characteristics that are utilized in a feedback loop when bet outcomes are tracked. For example, the type of image characteristics or reference illumination characteristics of the table monitoring utility 106 may be dynamically modified responsive to the confidence and/or accuracy of image processing performed by the table monitoring utility 106. In some embodiments, the table monitoring utility 106 extracts from the image data a three-dimensional representation of the betting or chip transferring and may be used to track not only betting values but also chip positioning, orientation, among others. This information may, for example, be used to track patterns of betting, winnings, and losses, and relate the patterns to hand outcomes, the provisioning of complimentary items, player profile characteristics, etc.

As depicted in FIG. 1A, the system 100A comprises one table monitoring utility 106. In some embodiments, the system 100A comprises more than one table monitoring utility 106. For example, one or more table monitoring subsystems 102 that are in the same geographical location may be in data communication with one table monitoring utility 106 associated with the geographical location. As another example, one or more table monitoring subsystems 102 that are playing the same base game may be in data communication with one table monitoring utility 106 associated with the base game. As another example, one or more table monitoring subsystems 102 that are associated with the same gaming establishment may be in data communication with one table monitoring utility 106 associated with the gaming establishment.

Figure 2:
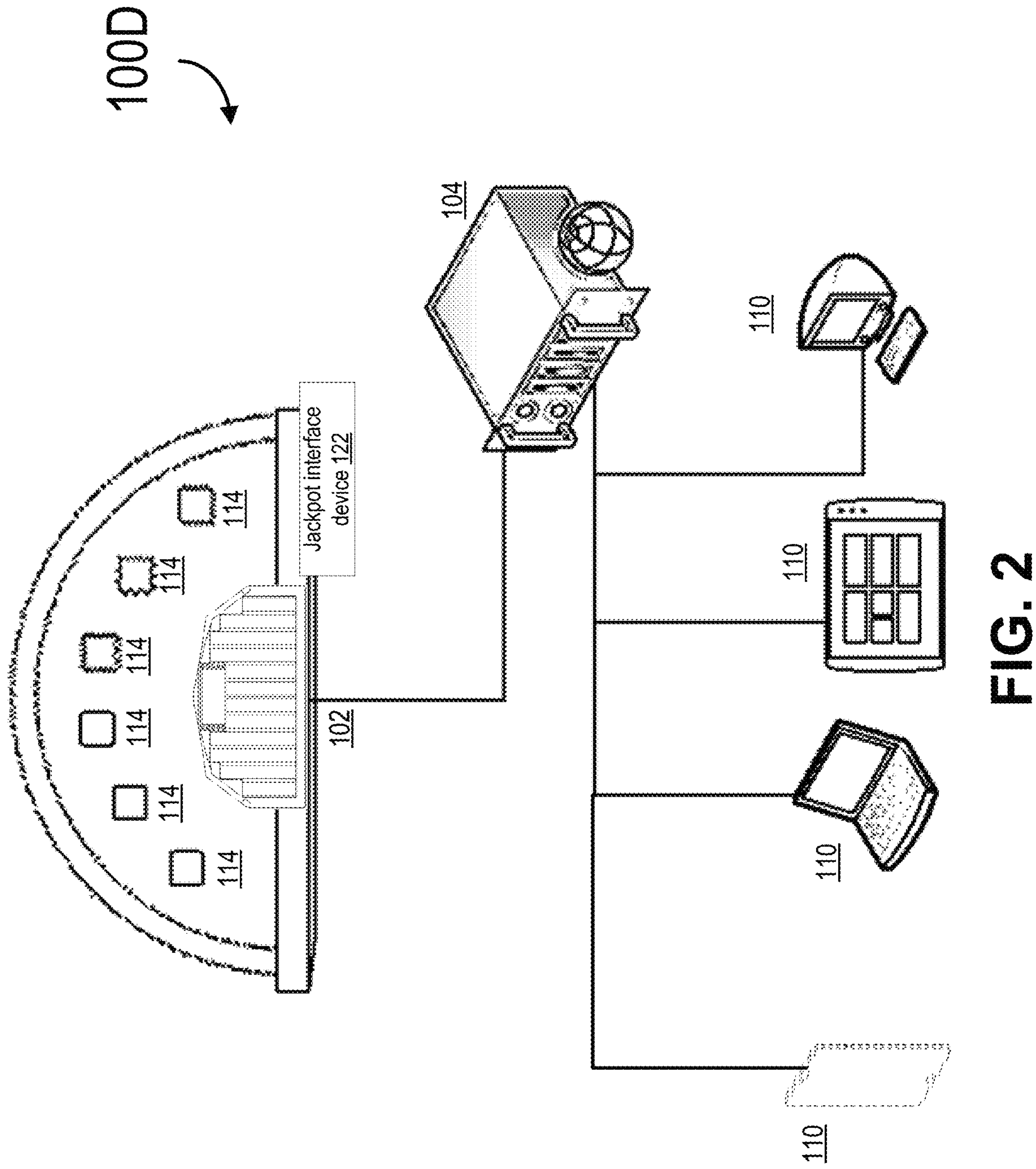
FIG. 2 illustrates a block diagram of another system for monitoring progressive game activities at a plurality of gaming tables according to some embodiments.

The system 100A may also include a front end interface 110 to transmit data received from the table monitoring subsystems 102, and receive progressive game event requests or progressive game event configurations from different interfaces to configure system 100A. As shown in FIG. 2, front end interface 110 may reside on different types of devices, such as a computer, a personal digital assistant, a laptop, or a smart phone. Front end interface 110 may provide different reporting services and graphical renderings of table monitoring data for client devices. Graphical renderings of table monitoring data, including bet data and chip transfer data, bet position data, player identification data and table identification data, may be used, for example, by various parties and/or stakeholders in analyzing betting trends and monitoring activities at a gaming table. Gaming facilities may track the aggregate amounts of bets, winnings, and losses, by account, by player identification, demographic, dealer, game type, bet type, gaming table, size of one or more progressive jackpots, increase or decrease of one or more progressive jackpots, etc. Dealers may utilize betting information and chip transfer information on a suitable interface to verify and/or validate betting and chip transfers that are occurring at a table. Pit bosses may use the betting information and chip transfer information to more accurately determine when complementary items should be dispensed and provided, etc. The gaming establishment may use the data from the system 100A to provide a progressive game with a plurality of jackpots and accurately monitor the size of the plurality of jackpots, Front end interface 110 may provide an interface to progressive game monitoring server 104 for end user devices and third-party systems 108. Front end interface 110 may generate, assemble and transmit interface screens as web-based configuration for cross-platform access. An example implementation may utilize Socket.io for fast data access and real-time data updates.

Front end interface 110 may assemble and generate a computing interface (e.g., a web-based interface). A user can use the computing interface to subscribe for real time event data feeds for particular gaming tables, via front end interface 110. The interface 110 may include a first webpage as a main dashboard where a user can see all the live gaming tables and bet data and chip transfer data, bet position data, player identification data, and table identification data, in real time, or near real time. For example, the main dashboard page may display bet data, winnings, losses, tips given to a dealer, hand count data, player count data, dealer information, surveillance video image, the size of the one or more progressive jackpots, rate of increase or decrease of the progressive jackpots, and so on. Bet data and chip transfer data may include, for example, total average and hourly average bets per hand, player, or dealer, per hour bet data for each gaming table in real time, total average and hourly chips received in or taken out of a chip tray per hand, player, or dealer, per hour chip transfer data for each gaming table in real time, and so on. Bet position data, table identification data, and table identification data may include per hour progressive game betting for each gaming table in real time, total average and hourly chips bet on per progressive jackpot, player, or dealer, the number of times a particular progressive jackpot was bet on, the size of each bet for a particular progressive jackpot, the increase or decrease of one or more particular progressive jackpots per hour, the average progressive jackpot size when the progressive jackpot is won, and so on.

The display may be updated in real-time.

The front end interface 110 may include a management page where management users can perform management related functions. For example, the front end interface 110 may enable management users to assign dealers to inactive gaming tables or close live gaming tables. An on and off state of a gaming table may send a notification to all instances of the interface 110. If a user is on the monitor management page when a new gaming table is opened, the user may see the live gaming table updated on their display screen in real-time. The management page may also shows surveillance images of each gaming table, and other collected data. The surveillance images may be used or triggered upon detection of particular patterns of table monitoring data, such as bet data, at a gaming table, for example. As another example, the front end interface 110 may enable management users to configure the progressive game, such as the number of progressive jackpots, the game outcome for winning the progressive jackpot, a multiplier for computing the progressive game metric for decreasing the one or more progressive jackpots, the minimum amount or maximum amount of each progressive jackpot, a percentage of each bet for a progressive game to be allocated to each progressive jackpot for computing the progressive game metric for increasing the one or more progressive jackpots, and so on.

Front end interface 110 may include a historical data webpage, which may display historical bet data of a selected gaming table. It may allow the user to browse the historical bet data by providing a date range selecting control. The bet data and chip transfer data, bet position data, player identification data, and table identification data, may be organized hourly, daily, monthly, and so on depending on the range the user chooses. The bet data and chip transfer data, bet position data, player identification data, and table identification data and a theoretical earning coefficient may be used to estimate the net earnings of the gaming table over the selected date period.

A server and client model may be structured based on receiving and manipulating various sorts of table monitoring data, such as betting data, chip transfer data, bet position data, player identification data, table identification data, dealer data, and so on. The interface 110 may be expanded to process other types of table monitoring data (e.g. the bet data, the chip transfer data, bet position data, player identification data, table identification data, etc.) such as average bets per hands on a table. Table monitoring data can be displayed on the monitor or management page in an additional graph, for example. The date range selection tool may be used for analyzing the added data along with the table monitoring data. Similarly, the main dashboard may show real-time statistics of the bet data, chip transfer data, bet position data, player identification data, table identification data, and additional table monitoring data.

In some embodiments, the table monitoring utility 106 may receive activation/deactivation signals obtained from the table monitoring subsystems 102 or various external devices, such as an external card shoe, a hand counting system, a player account registration system, a pit boss/employee manual triggering system, etc. These external devices may be adapted to transmit signals representative of when a game event has occurred or has terminated. For example, a specially configured dealer shoe may be operated to transmit signals when the dealer shoe is shaken, repositioned, activated, etc., or a hand counting system may be interoperating with the table monitoring utility 106 to indicate that a new round of betting has occurred, etc. In some embodiments, betting may be triggered based on the particular game being played in view of pre-defined logical rules establishing when betting rounds occur, when optional betting is possible (e.g., side-bets, insurance bets, progressive bets), etc.

The system 100A may also integrate with one or more third party systems 108 for data exchange. For example, a third party system 108 may collect dealer monitoring data which may be integrated with the table monitoring data generated by progressive game monitoring server 104. As another example, a third party system 108 may collect player monitoring data which may be integrated with the table monitoring data generated by progressive game monitoring server 104.

The system 100A for monitoring progressive game activities at a plurality of gaming tables may comprise a jackpot interface device 122 for displaying the one or more progressive jackpots from the progressive game monitoring server 104 for provision to or display on end user systems, the jackpot interface device 122 for receiving control commands from the progressive game monitoring server 104 to control displaying the one or more progressive jackpots. As depicted in FIG. 1A, each table monitoring subsystem 102 may have a corresponding jackpot interface device 122, which may be mounted to the table monitoring subsystem 102, mounted to the gaming table associated with the table monitoring subsystem 102, or mounted proximate to the gaming table associated with the table monitoring subsystem 102. In some embodiments, the system 100A may have one or more jackpot interface devices 122 for displaying the one or more progressive jackpots from the progressive game monitoring server 104, which may not be associated with each table monitoring system 102, but located at a centrally located area, such as an area of a gaming establishment with high customer traffic.

Figure 1B:
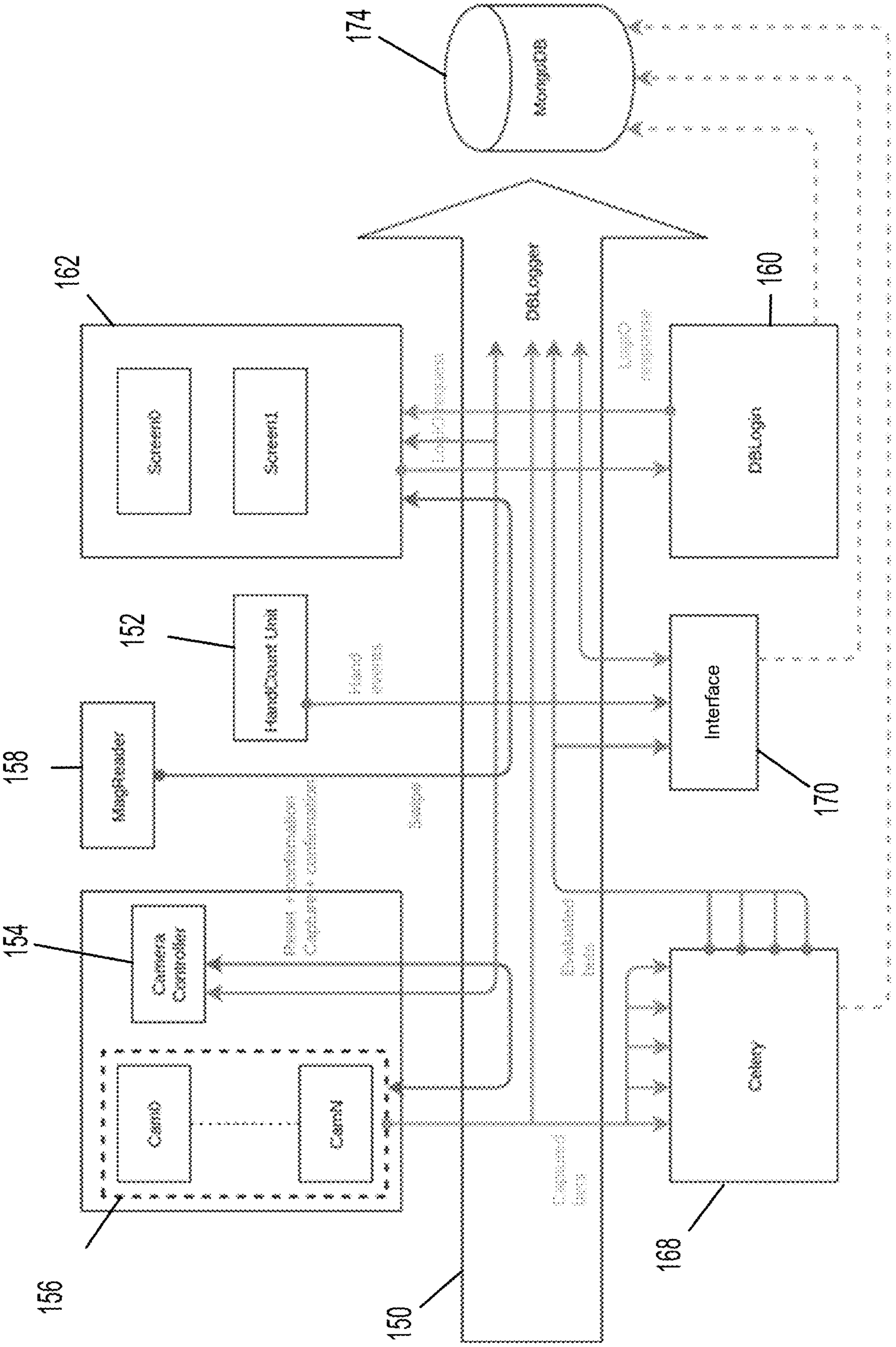
Figure 1C:
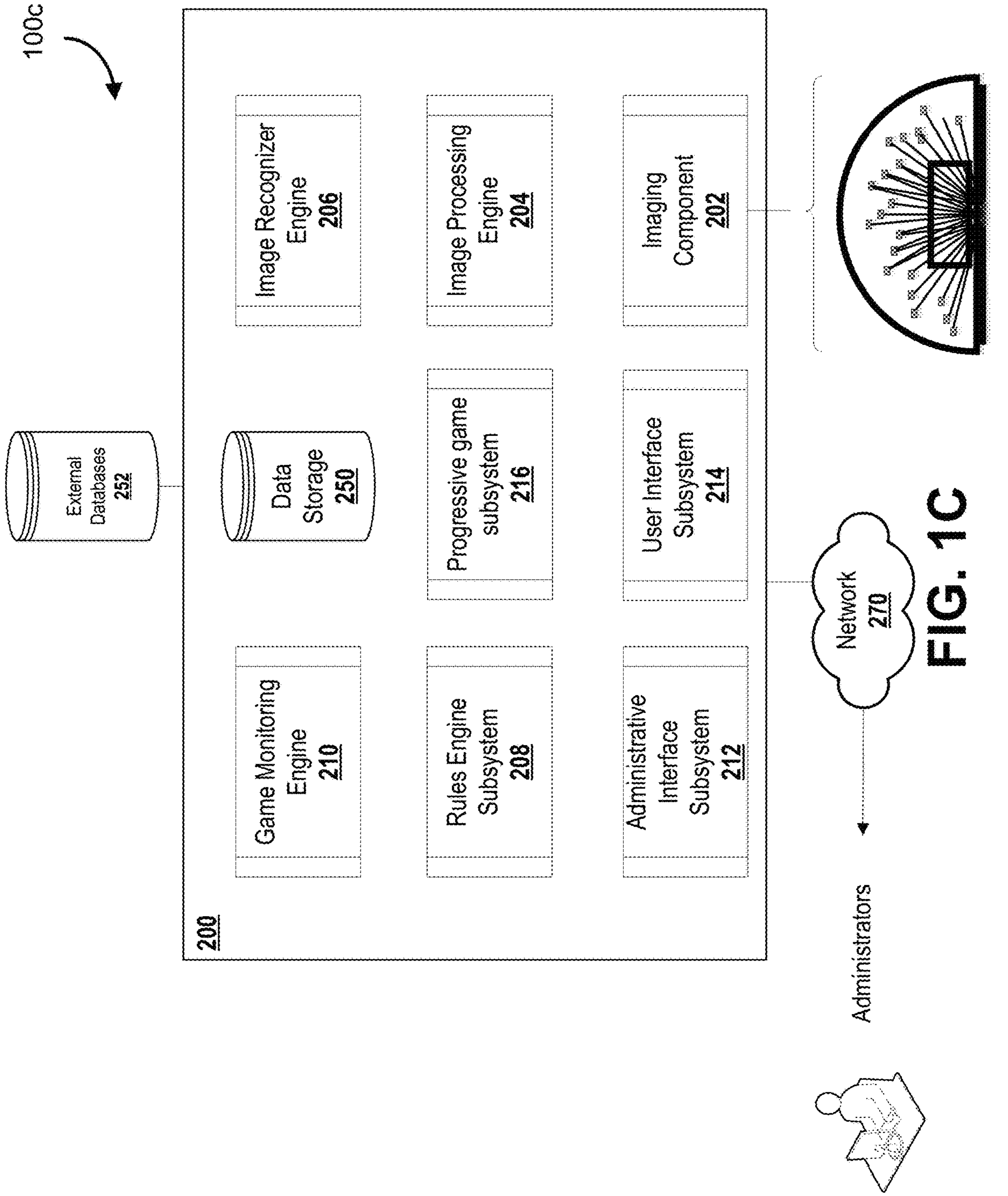

FIG. 1B is an example block schematic of a system 100*b* for monitoring progressive game activities at a plurality of gaming tables, according to some embodiments. The components shown may reside in different platforms or devices. FIG. 1C is an example block schematic 100*c* illustrative of some components of a system 200 for monitoring progressive game activities at a plurality of gaming tables, according to some embodiments.

In some embodiments, the system 100*b* has a distributed backend system, with some components as data producers, and other components as data consumers. The data produced resides in a data queue 150, and is withdrawn from the data queue 150 to be processed. The order in which the data is processed is based on a priority scheme. In some examples, the data queue 150 is RabbitMQ™. In this manner, the system 100*b* may generate and process data asynchronously.

In some embodiments, the system 100*b* comprises a HandCount Unit 152, which detects hand events, triggering events, activation events, deactivation events, or bet position, to trigger a Camera Controller 154 to send a control command for a Camera Set 156 to capture image data, which is transmitted back to the Camera Controller 154. The trigger events trigger Camera Controller 154 to send a control command to the Camera Set 156. The trigger events can include detection that one or more chips are placed in a bet area on a gaming table, or placement or removal of chips from a chip tray, which may be detected by a sensor component or a scale component. The HandCount Unit 152 may determine a position or approximate position of the bet based on detection of the placement or removal of chips in a bet area on a gaming table. The HandCount Unit 152 may also log the hand events, trigger events, activation events, deactivation events, or bet position data, and may transmit the logs to a MongoDB database 174 for storage. The hand events, trigger events, activation events, deactivation events, or bet position may be transmitted to the Screen Set 162 to be displayed at one or more of the screens. The HandCount Unit 152 may also transmit the detected hand events, triggering events, activation events, or deactivation events.

The Camera Controller 154 sends control commands to the Camera Set 156 for the Camera Set 156 to capture image data, and receives the image data captured by the Camera Set 156 and transmitted from the Camera Set 156. In some embodiments, the Camera Controller 154 may pre-process the image data to ensure that the image data does not correspond to obstructed objects, such as chips obscured by a dealer's hands. The Camera Controller 154 may determine that the image data corresponds to obstructed objects, and may send a reset control command to the Camera Set 156 to re-capture the image data. The Camera Controller 154 may determine that the image data corresponds to an unobscured object, and may send a control command to the Camera Set 156 to transmit the captured image data to the Classifier Set 168. In some embodiments, the Camera Controller 154 may determine that the image data corresponds to chips being placed on a betting area of a gaming surface of a gaming table indicative of making a bet for playing a progressive game. As depicted in FIG. 1B, the Camera Set 156 may transmit the image data to the MongoDB database 174 for storage.

In some embodiments, the Camera Set 156 may comprise an imaging component 202 as depicted in FIG. 1C, including one or more sensors to detect and/or obtain image data representative of chips in a betting areas, chips in a chip tray, or the area upon which the chips are placed. The imaging components 202 may be, for example, cameras, sensors, and may collect image data in the form of video, pictures, histogram data, in various formats. The image data may have particular characteristics tracked in the form of associated metadata, such as shutter speeds, camera positions, imaging spectra, reference illumination characteristics, etc. In some embodiments, the imaging components may provide an initial pre-processing to perform preliminary feature recognition, optical character recognition, etc. For example, the gaming surface may have visual indicators which may be tracked as reference markers by the imaging components (e.g., optical position markers indicative of betting areas where bets may be placed).

In some embodiments, the system 100*b* comprises a Mag Reader 158 for monitoring swiping of a magnetic card for a player or dealer to log into the system 100*b*. When a player or dealer is logged in, the Mag Reader 158 generates a signal that is sent to the DBLogin 160 and the Interface 170. Data corresponding to the person or dealer logging into the system 100*b* may be transmitted to the Screen Set 162 to be displayed.

In some embodiments, the Mag Reader 158 may be an external component to the table monitoring subsystems 102 or bet recognition modules of the table monitoring subsystems 102. The Mag Reader 158 may be mounted to a gaming table to the left or right side of a dealer. The Mag Reader 158 may be ergonomically positioned and oriented such that the dealer does not need to move to the Mag Reader 158. The Mag Reader 158 may be mounted at a 45° angle, so the deader may swipe a card away from them when swiping the card through the Mag Reader 158. The dealer may swipe the card horizontally or vertically relative to the gaming table. In some embodiments, the Mag Reader 158 may be a component of the table monitoring subsystem and/or bet recognition modules. Where a bet recognition module comprises the Mag Reader 158, one or more Mag Reader 158 may be positioned on the two outermost sides of the bet recognition module. The dealer may swipe the card vertically towards themselves when the Mag Reader 158 is a component of the bet recognition module. An identification card for a dealer and/or a player may be swiped through the Mag Reader 158 for the dealer and/or player to log into the system. An indication of the dealer and/or player logging into the system may be rendered on a screen of the table monitoring subsystem or the bet recognition module, such as one or more screens of the Screen Set 162. The dealer may toggle the table monitoring subsystem or bet recognition, for example, by pressing one or more buttons on the table monitoring subsystem or bet recognition or pressing one or more buttons rendered on the display, to be in a log-in mode, such that the system may expect data corresponding to identification of a dealer and/or player is being input into the system.

The signal from the MagReader 158 may be similar to a signal coming from a keyboard. When a card is swiped through the MagReader 158, it generates a signal based on the magnetic strip of the card, wherein the digital contents of the signal may be a data string that may include ASCII characters as containers for data, which may be a players card number, their first name, birthdays or staff identification (for example: ";0000023462?", where ";" and "?" are the containers, and the dealer number is "23462").

In some embodiments, the MagReader 158 may comprise an input device, such as a keypad or a keyboard, for a player or dealer to input a log-in code to log into the system 100*b*.

The DBLogin 160 receives log-in and log-out information of a player or dealer from the Mag Reader 158 and the Screen Set 162 to request logging in or logging out of the system 100*b*. The DBLogin 160 may compare the received log-in and log-out information with approved log-in and log-out information, which may be stored in MongoDB database 174 and retrieved by the DBLogin 160. The DBLogin 160 may determine that the received log-in and log-out information matches approved log-in and log-out information, and may transmit a response signal to the Screen Set 162 and allow the player or dealer corresponding to the received log-in and log-out information to log into or log out of the system 100*b*.

In some embodiments, the system 100*b* comprises a Screen Set 162, a set of screens for displaying real time table monitoring data, based on data transmitted from the Camera Controller 154, Mag Reader 158, and DBLogin 160. The Screen Set 162 is also configured to capture input from the player or the dealer for logging in or logging out of the system 100*b*. The Screen Set 162 transmits a signal corresponding to the player or dealer's log in or log out request to the DBLogin 160, and receives a signal corresponding to an approval or disapproval response for the player or dealer to log into or out of the system 100*b*.

In some embodiments, the system 100*b* has a BetDataPort 164 for processing live table monitoring data from the classifier. The BetDataPort 164 receives and processes data from the Classifier Set 168, and the processed data is transmitted to one or more screens of the Screen Set 162, Interface 170, MongoDB database 174, and a real time monitor of the Interface 170.

In some embodiments, the system 100*b* comprises a Monitor 166, an interface for monitoring all input and output activity. The Monitor 166 receives data from the BetDataPort 164 and the LogIOPort 160. The Monitor 166 may be a systems monitor on the progressive game monitoring server 104 or on the gaming table that processes the data received from the BetDataPort 164 and the LogIOPort 160 to confirm that data is being transmitted and the components of the system 100*b* are operational.

In some embodiments, the system 100*b* comprises a Classifier Set 168 to identify chip denomination and number of chips and bet position. This data is generated by self-learning, labeling and training live chip data of the system 100B. The Classifier Set 168 processes the data captured from the Camera Set 156 and generates a signal corresponding to the chip denomination and number of chips and bet position. The Classifier Set 168 transmits this signal to the Interface 170, and to the MongoDB database 174 for storage.

In some embodiments, the Classifier Set 168 comprise an image processing engine 204, as depicted in FIG. 1C. The image processing engine 204 may be configured to receive the images and to extract features from the images. In some embodiments, the image processing engine 204 segments and/or pre-processes the raw image data to remove noise, artifacts, and/or background/foreground imagery. For example, the image processing engine 204 may be configured to visually identify the pixels and/or regions of interest (e.g., by using a combination of depth data and similarity/size information) regarding the chips and bet position. Specific stacks of chips, such as chips stacked on a betting area or in a channel of a chip tray, may be identified, along with their constituent chips. The chips may have "bounding boxes" drawn over them, indicative of the pixels to be used for analysis. Similarly, in some embodiments, "bounding boxes" are drawn over entire stacks of chips. The image processing engine 204 may extract features from the bounding boxes and, for example, create a compressed transform representative of a subset of the image information. For example, in some embodiments, various vertical, horizontal, or diagonal lines of information may be drawn through a determined stack of chips, and samples may be obtained through tracking the image pixels proximate to and/or around a determined centroid for each of the chips.

In some embodiments, to account for variations in markings (e.g., vertical stripes), the pixels (e.g., horizontal pixels) estimated to comprise a particular chip are blurred and/or have other effects performed on them prior to extraction such that the centroid and its surrounding pixels are representative of the chip as a whole.

The image processing engine 204 may also extract out a particular height of the chips, and this information may be utilized to determine the general size and/or makeup of the stack of chips. For example, knowledge of the chip stack, distance, and height of specific chips may permit for the segmentation of pixel information on a per-chip basis.

In some embodiments, the image processing engine 204 may be configured to receive the images and to extract features from the images corresponding to the position of the gaming surface of the gaming table upon which the chips were placed.

In some embodiments, the Classifier Set 168 comprises an image recognizer engine 206, as depicted in FIG. 1C. The image recognizer engine 206 may obtain the extracted and compressed information from the image processing engine 204, applying recognition techniques to determine the actual chip value for each chip in the relevant region of interest. As the image recognizer engine 206 receives a set of features, the image recognizer engine 206 may be configured to utilize a classifier to determine how well the feature set corresponds to various reference templates. In some embodiments, the classifier provides both an estimated value and a confidence score (e.g., a margin of error indicative of the level of distinction between potential chip value candidates). Where the chip value cannot be reliably ascertained through the reference templates, a notification may be provided to either request re-imaging with varied characteristics, or to generate an error value. For example, features may be poorly captured due to changes in ambient lighting and/or environmental shadows, and the notification from the classifier may control a reference lighting source to activate and/or modify illumination to potentially obtain a more useful set of image features.

In some embodiments, the image recognizer engine 206 may dynamically provision computing resources to be used for recognition. For example, if the image recognizer engine 206 identifies that a larger amount of processing will be required in view of a large volume of poor quality image data, it may pre-emptively request additional processing resources in view of a requirement to complete processing within a particular timeframe. Conversely, in some embodiments, where image data is of sufficiently high quality to quickly and accurately conclude that a chip is a particular type of chip, processing resources may be freed up.

In some embodiments, the image recognizer engine 206 may process the image data from the image processing engine 204 corresponding to the position of the gaming surface of the gaming table upon which the chips were placed to determine the bet position of the chips.

In some embodiments, the Classifier Set 168 comprises a rules engine subsystem 208, as depicted in FIG. 1C. A rules engine subsystem 208 may be provided in relation to classification of chip image data/features to chip values. The rules engine subsystem 208 may, for example, include tracked linkages and associations that are used by the classifier to determine a relationship between a particular reference feature set. In some embodiments, the rules engine subsystem 208 includes weighted rules whose weights dynamically vary in view of updated reference feature sets or accuracy feedback information (e.g., indicated false positives, false negatives, true positives, true negatives), among others. The rules engine subsystem 208 may also include logical processing rules that control operation of various characteristics of the classifier, the reference illumination, processing characteristics, etc.

In some embodiments, the Classifier Set 168 may comprise a game monitoring engine 210, as depicted in FIG. 1C. A game monitoring engine 210 may obtain the tracked chip/bet values for each bet and/or for the chips in the chip tray, and bet positions, for example, from a plurality of imaging components 202, processing engines 204, and/or recognizer engines 206, and maintain an inventory of table monitoring data, which may be stored in a data storage 250. The game monitoring engine 210 may be adapted to provide real or near-real-time feedback, and also to perform various analyses (e.g., overnight processing). The game monitoring engine 210 may identify patterns from combining table monitoring data with other data, such as player profile information, demographics, hand counting information, dealer tracking information, etc. Further details on the Classifier Set 168 for determining how well image data captured on the gaming table corresponds to reference templates is described in U.S. patent application Ser. No. 15/309,102 and PCT Application No. PCT/CA2016/050442, and U.S. Patent Application No. 62/519,637, the entire contents of which are hereby incorporated by reference.

In some embodiments, the Classifier Set 168 may comprise a progressive game subsystem 216, as depicted in FIG. 1C. The progressive game subsystem 216 may obtain the tracked chip/bet values for each bet and/or for the chips in the chip tray, and bet positions, for example, from a plurality of imaging components 202, processing engines 204, and/or recognizer engines 206, or obtain said data maintained in the data storage 250 by the game monitoring engine 210 to manage the one or more jackpots of the progressive game. Based on the image data corresponding to the position of the bet, the progressive game subsystem 216 may determine that bet was for playing a progressive game or for playing a particular jackpot of a progressive game. Based on the image data corresponding to the amount of the bet and the bet position, the progressive game subsystem 216 may compute a progressive jackpot metric for increasing one or more progressive jackpots, and may increase the one or more progressive jackpots based on the progressive jackpot metric. Based on the image data corresponding to the outcome of the base game or the progressive game, such as from a card reader, the progressive game subsystem 216 may determine that a player having player identification data has won one or more progressive jackpots of the progressive game. Based on the image data corresponding to the amount of the bet, the progressive game subsystem 216 may compute a progressive jackpot metric for decreasing the one or more progressive jackpots, and may associate said progressive jackpot metric with the player identification data and table identification data. The progressive game subsystem 216 may send control commands to the jackpot interface device 122 for displaying one or more of the progressive jackpots or for displaying display enhancements on the jackpot interface device 122.

In some embodiments, the Classifier Set 168 may process data based on a distributed task queue based on distributed message passing. The Classifier Set 168 may process data asynchronously or synchronously. The Classifier Set 168 may support scheduling or operate in real time. In some examples, the Classifier Set 168 may process data using the Celery™ distributed task queue. As the Camera Set 156 captures data from the gaming table, the Camera Set 156 may deposit the captured image data at the Classifier Set 168. The Camera Set 156 may continue to capture additional data from the gaming table, and later poll the Classifier Set 168 to see if the Classifier Set 168 has processed the captured image data. If the Classifier Set 168 has processed the image data, the image data may be transmitted to the Interface 170 or MongoDB database 174.

The Classifier Set 168 may process the image data captured from the Camera Set 156 to determine the position of the chips on the gaming surface of the gaming table and may determine if the bet is made for playing a progressive game.

In some embodiments, the system 100*b* comprises the Interface 170, an interface comprising real time and batch data. Real time data is populated on demand as the game is being played on the gaming table and batch data is requested from the MongoDB database 174 though a cache. The Interface 170 is configured to receive data from the Hand-Count Unit 152, the Classifier Unit 168, and the MongoDB 174. The Interface 170 processes the data and stores the relevant data in the MongoDB 174.

The Interface 170 is an interface allows for the presentation of processed data based on data captured from the gaming table, such as through a browser accessible at a location in the casino, such as in the pit, on the table signage, or on the display screens of the bet recognition module.

In some embodiments, the Interface 170 may be a data interface, such as in a server room. In some embodiments, the Interface 170 may be a graphical interface, such as a web interface display from the data interface, or an integrated screens display from the data interface.

In some embodiments, the Interface 170 comprises an administrative interface subsystem 212 and a user interface subsystem 214. The administrative interface subsystem 212 may be provided for administrative users to control how the system operates and/or to request particular analyses and/or reports. The user interface subsystem 214 may provide, for example, various graphical interfaces for understanding and/or parsing the tracked bet recognition data. The graphical interfaces may, for example, be configured to generate notifications based on tracked discrepancies, etc. The various components may interoperate through a network 270. The progressive game monitoring server 104 connects to other components in various ways including directly coupled and indirectly coupled via the network. The network (or multiple networks) is capable of carrying data and can involve wired connections, wireless connections, such as the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, or a combination thereof. The network may involve different network communication technologies, standards and protocols, such as, for example, G2S protocols.

In some embodiments, the Interface 170 comprises jackpot interface device 122 for displaying one or more progressive jackpots of the progressive jackpot game.

In some embodiments, the system 100*b* comprises MongoDB database 174. Image data and processed bet data may be stored at the MongoDB database 174. The configuration and parameters of the progressive game system may be stored in MongoDB database 174. The configuration and parameters of the progressive game system may be input and stored in MongoDB database 174 from front end interface 110. For example, the progressive game system may comprise one or more progressive jackpots and one or more pots that may not be associated with the progressive jackpots, such as pots for non-jackpot winnings, a house advantage pot, or a reset pot to refill a progressive jackpot that has recently been won. As another example, the MongoDB database 174 may store reference data corresponding to the winning outcome of a base game or progressive game played at a gaming table for wining a particular progressive jackpot. As another example, the MongoDB database 174 may store reference data corresponding to a multiplier for calculating a progressive jackpot metric for decreasing one or more progressive jackpots. As another example, the MongoDB database 174 may store reference data corresponding to minimum and maximum sizes of the one or more progressive jackpots. As another example, the MongoDB database 174 may store reference data corresponding to a percentage of a bet for calculating a progressive jackpot metric for increasing one or more progressive jackpots.

The system 100*b* may undergo an initial calibration at the point of assembly when the system components as described herein are connected together. Configuration files are unified and stored on one local database, such as MongoDB database 174. If one of the components of the system 100*b* fails, it does not affect the remainder of the system 100*b*. The failed component may be replaced and the system 100*b* may continue to monitor activities at the gaming table.

Serial numbers are used to identify the data being produced by the cameras and sensors described herein.

Aspects of progressive game monitoring server 104 may be implemented by Classifier Set 168, Interface 170, and MongoDB database 174. Aspects of the table monitoring subsystem 102 may be implemented by Hand Count Unit 152, Camera Set 156, Camera Controller 154, Mag Reader 158, and Screen Set 162.

The system 100*b* may be operable as long as its components are in data communication, such as through a network. Accordingly, the system 100*b* has a modular architecture, allowing for components to be installed or uninstalled without disruption to the system 100*b*. For example, a camera configured to capture image data of chips at the gaming table, a camera configured to capture image data of chips in the chip tray, and one or more bet recognition modules may be connected to the system 100*b* and the data produced from them may be processed by the system 100*b* without changes to the architecture.

The data produced by the system 100*b* is a binary data stream, rather than a particular file type. For example, image data captured by the Camera Set 156 is not saved as a JPEG or PNG file. Rather, the image data is transmitted as a binary stream of data. Accordingly, the system 100*b* may process data from a plurality of sources, such as cameras for capturing image data corresponding to chips on the gaming table, cameras for capturing image data corresponding to chips in the chip tray, data from a card reader unit, sensors or scales mounted on the gaming table, data from a log-in system, sensors mounted on the chip tray, infrared sensors, a switch, electromagnetic sensors, and the like, providing greater flexibility with the operating system and architecture.

In some example embodiments, progressive game monitoring server 104 may connect directly to table monitoring subsystems 102. FIG. 2 illustrates a schematic diagram of another system 100D for monitoring table activities at gaming tables according to some embodiments. System 100D may include table monitoring subsystem 102 at gaming table with defined bet areas 114 on the gaming table surface. In this example, table monitoring subsystem 102 directly connects to progressive game monitoring server 104 to provide image data for the gaming table surface, the bet areas 114, and/or the chip tray, bet position data, player identification data, and table identification data. As depicted in FIG. 2, jackpot interface device 122 may be mounted on or proximate to the table monitoring subsystem 102 and the gaming table.

Figure 3:
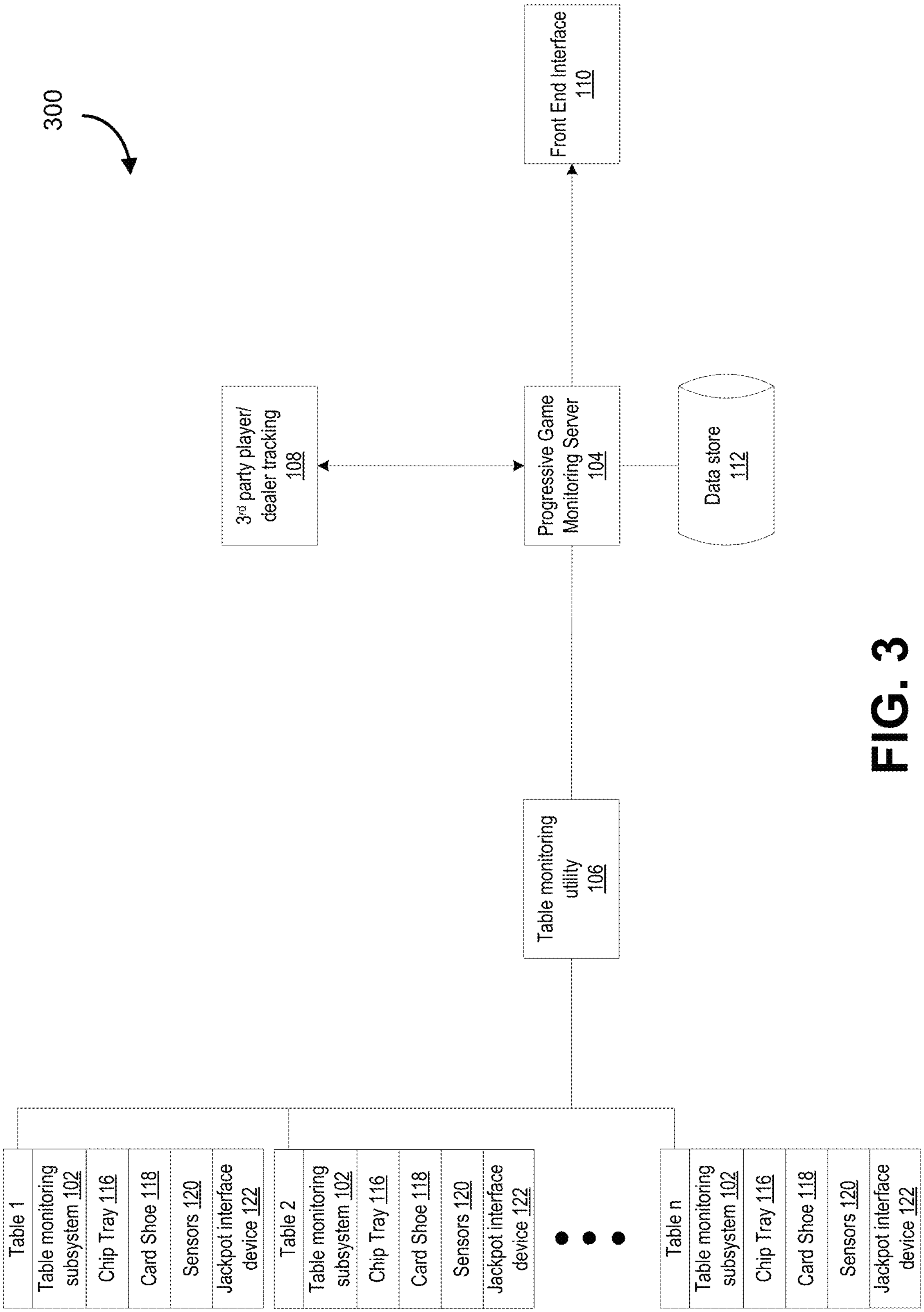
FIG. 3 illustrates a block diagram of another system for monitoring progressive game activities at a plurality of gaming tables according to some embodiments.

FIG. 3 illustrates a block diagram of a system 300 for monitoring progressive game activities at a plurality of gaming tables according to some embodiments involving table monitoring data, such as data corresponding to whether a bet is made, the amount of the bet, the bet position, player identification data, and table identification data. Card game activities may generally include dealing card hands, placing chips at particular betting areas of the gaming surface of the gaming table, playing card hands, winning chips, losing chips, and so on. Each player, including the dealer and customers, may be dealt one or more cards defining a card hand when playing a base game at the gaming table. For a card game, each active player may be associated with a card hand. The card hand may be dynamic and change over rounds of the card game through various plays. A complete card game may result in a final card hand for remaining active players, final bets, determination of winning card hands amongst those active players' hands, and determination of a winning prize based on winning card hands and the final bets. At different rounds or stages of the base game different players make bets by placing chips in bet regions on the gaming table surface. During play of the base game, one or more game events may occur and may result in a win of a progressive jackpot for one of the players participating the base game.

Table monitoring subsystem 102, a chip tray 116, a card shoe 118, sensors 120, and jackpot interface device 122 may be integrated at each gaming table for capturing data, such as image data for chips and cards used during the game, data for bets and monitoring the transfer of chips at the particular gaming table, bet position data, player identification data, and table identification data, and displaying captured data, such as the size of one or more progressive jackpots. Table monitoring subsystem 102, chip tray 116, card shoe 118, and sensors 120 may collect the data and transmit the data to progressive game monitoring server 104 for server 104 to calculate bet data and chip transfers for different hands and players, compute a progressive jackpot metric for increasing or decreasing one or more progressive jackpots, and to display the size of one or more progressive jackpots.

Table monitoring subsystem 102 may determine table monitoring data over a time period, using timestamps, for example. Server 104 may correlate the table monitoring data (e.g. bet data, chip transfer data, data of cards used during a game, bet position data, player identification data, table identification data, etc.) using timestamps or time periods, for example. The information may be stored on data store 112, and presented on front enter interface 110.

Table monitoring subsystem 102 may associate table monitoring data with a particular gaming table, dealer, customers, geographic location, subset of gaming tables, game type, progressive jackpot, and so on. Similarly, chip tray 116, card shoe 118, and sensors 120 may associate data with a particular gaming table, dealer, customers, geographic location, subset of gaming tables, game type, progressive jackpot, and so on. For example, table monitoring data may be associated with a timestamp and gaming table identifier to link data structures for further data analysis, processing and transformation.

Metadata is collected alongside data collected by the table monitoring subsystem 102 and may be associated (e.g., using pointers, labels, metadata tags) with the collected data to indicate additional information, such as checksums (e.g., for redundancy and immutability), timestamps, player information, dealer information, table information, information relating to the size of the progressive jackpots or rate of increase or decrease of the progressive jackpots, hand count information, bet round information, lighting conditions, reference lighting characteristics, confidence score associated with image data, sensors in use, processor in use, etc.

Data collected by the table monitoring subsystems 102, along with other metadata may be encapsulated in the form of information channels that may be use for transmission and/or otherwise encoded. In some embodiments, 10 or more channels of information are provided by the table monitoring subsystem 102, and the channels may include, for example, image data taken with different color balances and parameters, image data from different sensors, metadata, bet position data, player identification data, table identification data, etc.

Each table monitoring subsystem 102 may transmit image data or other table monitoring data to table monitoring utility 106 for provision to progressive game monitoring server 104. Each chip tray 116, card shoe 118, and sensors 120 may transmit table monitoring data from a sensor array to table monitoring utility 106 for provision to progressive game monitoring server 104.

The chip tray 116 and card shoe 118 may include sensors, such as, for example, tray monitoring cameras, laser sensors with optical emitters and receivers, and optic sensors. Laser sensors, instead of other types such as ambient light sensors, may be advantageous to reduce the effect of lighting in the environment, to not require special table top felt material, to waterproof the device, and so on. Ambient light sensors may not work well if a part of the table is not well lit, as those types of sensors are looking for darkness for object detection. The chip tray 116 and card shoe 118 may use optical receiver and emitter sensors that look for light for object detection. Additional types of sensors include radio frequency and optics. The sensors may be organized to form a sensor array. The chip tray 116 and card shoe 118 may further include an infrared receiver and infrared emitter or transmitter for electronic data exchange. The sensors are particularly configured and positioned relative to the play area and bet area on the gaming table. For example, sensors of the chip tray 116 may be positioned proximate to the chip tray 116 and directed towards the channels of the chip tray 116. The device may be configured to provide a particular distance between sensor and chips in the channels, such as a one centimeter distance, for example.

Table monitoring subsystem 102 may retrieve image data captured by the imaging component and may retrieve additional data from sensors and cameras and the log-in system used for monitoring table activities. Table monitoring subsystem 102, a chip tray 116, a card shoe 118, and sensors 120 generate table monitoring data for provision to progressive game monitoring server 104. Table monitoring data may include image data of chips placed on a betting area, image data of chips placed or removed from a chip tray, bet data, the amount of chips won or lost for a game or event, the amount of chips received in a chip tray, the amount of chips removed from a chip tray, the value of cards used in the game, detection of hand movement around the table, data corresponding to the position of bets on the gaming surface of the gaming table, player identification data, table identification data, and hand count data events, such as hand start event data and hand stop event data, and so on. Hand start event data indicates the start of a new hand. Hand stop event data indicates the end of a hand. Table monitoring data may be linked by timestamps. The table monitoring data may be used to compute values of bets, the value of chips in a chip tray, a progressive jackpot metric for increasing or decreasing one or more progressive jackpots, a winner of a progressive jackpot, and other data values. The sensors of table monitoring subsystem 102 may be positioned on the gaming table to detect table monitoring activities and trigger hand start events and hand stop events. The sensors may deliver real-time data regarding card play activity, including hand start event data and hand stop event data. The imaging components may also deliver real-time image data regarding table monitoring activities. The imaging component of table monitoring subsystem 102 may be mounted or integrated into gaming table to capture real-time image data for bet areas and the chip tray on the gaming table surface.

In some embodiments, the clocks of the table monitoring subsystem 102, chip tray 116, card shoe 118, sensors 120, and progressive game monitoring server 104 are synchronized together to ensure that data is readily interpretable regardless of source.

Table monitoring subsystem 102 may be configured with particular trigger events, such as detection of chips or objects in defined bet areas on the gaming table by sensors, or detection of chips or objects placed or removed from a chip tray by sensors. The trigger events may trigger imaging component to capture image data for calculating bet values for the chips and to capture bet position data for determining that a bet was made to play a progressive game and to compute a progressive jackpot metric for increasing or decreasing one or more progressive jackpots. A timing or threshold value may be set off to trigger transmission of table monitoring data used to calculate bet data and count the chips in the chip tray. An example trigger may be sensor activation for a threshold value, for example two, three or four seconds. Another example trigger may be sensor deactivation for a threshold value.

Table monitoring data may include bet data, player count data and chip transfer data, bet position data, player identification data, and table identification data, which may be valuable for casinos for security, management, and data analytics. For example, a casino may determine a link between a game and a dealer, and also a dealer and a customer, through the table monitoring data. A casino may provide real-time compensation to players using the table monitoring data. In addition, a casino may accurately track bets of different sizes and having different denominations of betting markers made for playing a progressive game and to manage the size of one or more progressive jackpots. Accordingly, the systems, devices and methods in accordance with embodiments described herein may provide various levels of granularity and specificity for table monitoring data, using the bet data, player count data and chip transfer data, bet position data, player identification data, and table identification data, and other generated data values for monitoring progressive game activities at a plurality of gaming tables. There may further be third party player tracking and/or dealer tracking data 108 that may be utilized in relation to performing analysis and reporting.

Figure 4:
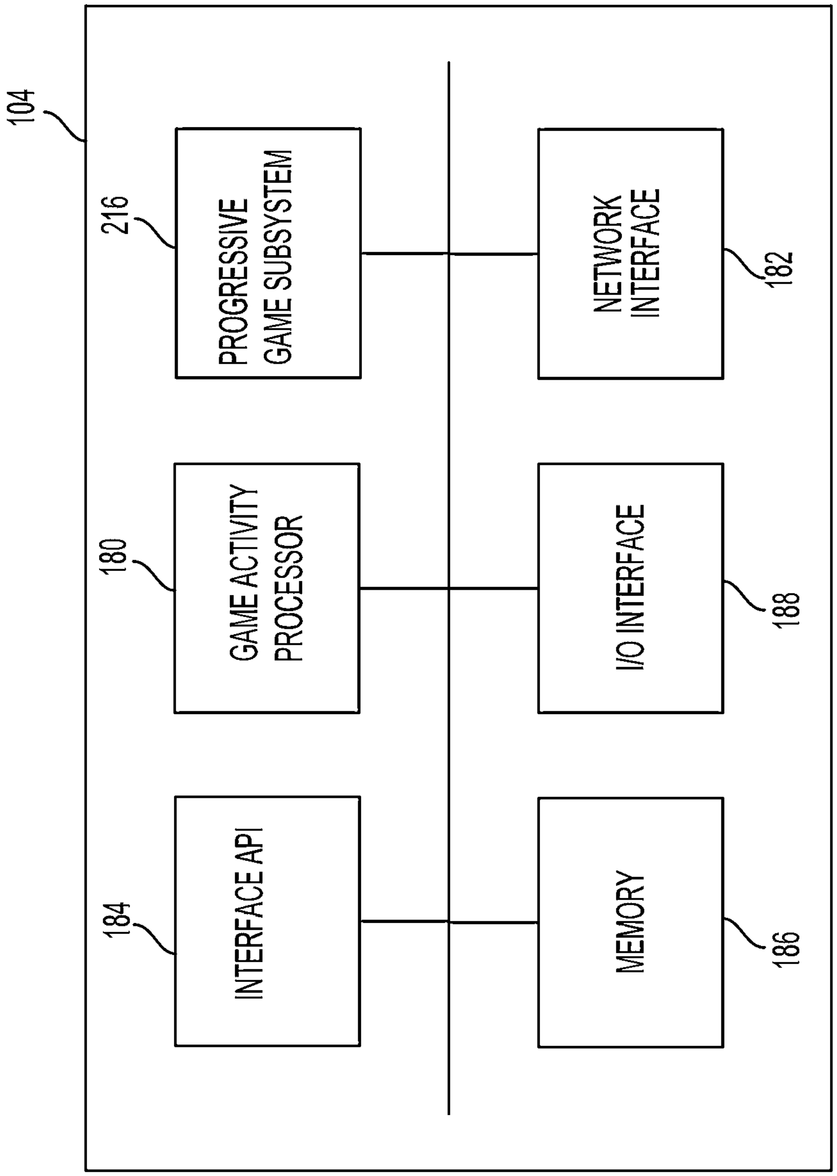
FIG. 4 illustrates a schematic of a progressive game monitoring server according to some embodiments.

FIG. 4 is an illustration of a schematic of a progressive game monitoring server 104 according to some embodiments.

Progressive game monitoring server 104 is configured to collect table monitoring data including bet data and chip transfer data, data corresponding to a bet for a progressive game being made, the size of the bet, the bet position, the player identification, and table identification. The chip transfer data may be used to determine the numbers of chips placed in and removed from a chip tray for a particular gaming table for a particular period of time (e.g. due to winnings and losses of a player or a dealer). Table monitoring data may be associated with a time stamp (e.g., start time, stop time, current time) and table identifier. The table monitoring data may also be associated with a particular player (e.g. dealer, customer) and a player identifier may also be stored in the data structure.

For simplicity, only one progressive game monitoring server 104 is shown but system may include more progressive game monitoring servers 104. The progressive game monitoring server 104 includes at least one processor, a data storage device (including volatile memory or non-volatile memory or other data storage elements or a combination thereof), and at least one communication interface. The computing device components may be connected in various ways including directly coupled, indirectly coupled via a network, and distributed over a wide geographic area and connected via a network (which may be referred to as "cloud computing").

For example, and without limitation, the computing device may be a server, network appliance, set-top box, embedded device, computer expansion module, personal computer, laptop, or computing devices capable of being configured to carry out the methods described herein.

As depicted, progressive game monitoring server 104 includes at least one game activity processor 180, an interface API 184, memory 186, at least one I/O interface 188, at least one network interface 182, and a progressive game subsystem 216.

Game activity processor 180 processes the table monitoring data including image data, bet data, chip transfer data, bet position data, player identification data, table identification data, and so on, as described herein. Each processor 180 may be, for example, a microprocessor or microcontroller, a digital signal processing (DSP) processor, an integrated circuit, a field programmable gate array (FPGA), a reconfigurable processor, a programmable read-only memory (PROM), or any combination thereof.

Memory 186 may include a suitable combination of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 188 enables game activity processor 180 to interconnect with one or more input devices, such as a keyboard, mouse, camera, touch screen and a microphone, or with one or more output devices such as a display screen and a speaker. The I/O interface 188 may enable progressive game monitoring server 104 to send control commands to the jackpot interface device 122 for displaying one or more pots of the progressive game, such as one or more progressive jackpots, or a display enhancement on the jackpot interface device 122.

Each network interface 182 enables game activity processor 180 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Application programming interface (API) 184 is configured to connect with front end interface 110 to provide interface services as described herein.

Game activity processor 180 is operable to register and authenticate user and client devices (using a login, unique identifier, and password for example) prior to providing access to applications, network resources, and data. Game activity processor 180 may serve one user/customer or multiple users/customers.

The progressive game subsystem 216 is configured to manage the one or more progressive jackpots of the progressive game, using the tracked chip/bet values for each bet and/or for the chips in the chip tray, and bet positions, player identification data, and table identification data, for example, from a plurality of imaging components 202, processing engines 204, and/or recognizer engines 206, or obtain said data maintained in the data storage 250 by the game monitoring engine 210, as described herein. The progressive game subsystem 216 may determine that a bet for playing a progressive game was made, may compute a progressive jackpot metric for increasing or decreasing one or more progressive jackpots, may determine that a progressive jackpot has been won, may associate the progressive jackpot metric with the player identification data and table identification data, and may send control commands to the jackpot interface device 122 for displaying one or more progressive jackpots or a display enhancement on the jackpot interface device 122.

Figure 5:
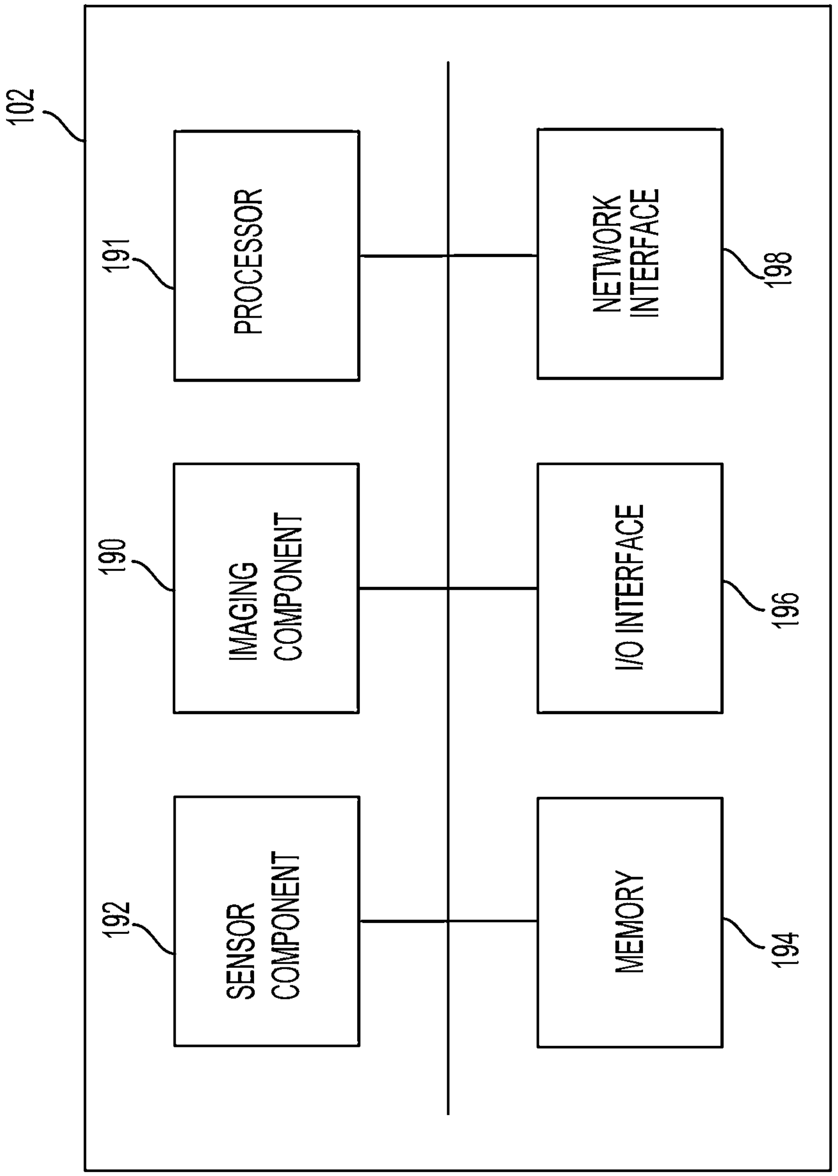
FIG. 5 illustrates a schematic of a table monitoring subsystem according to some embodiments.

FIG. 5 illustrates a schematic of a table monitoring subsystem 102 according to some embodiments.

As depicted, table monitoring subsystem 102 may include an imaging component 190, sensor component 192, processor 191, memory 194, at least one I/O interface 196, and at least one network interface 198.

Imaging component 190 and sensor component 192 may be configured to capture data corresponding to a bet being made for playing a progressive game, the amount of the bet, the position of the bet, the player identification data, and the table identification data.

Processor 191 may be, for example, any type of general-purpose microprocessor or microcontroller, a digital signal processing (DSP) processor, an integrated circuit, a field programmable gate array (FPGA), a reconfigurable processor, a programmable read-only memory (PROM), or any combination thereof.

Memory 194 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 196 enables table monitoring subsystem 102 to interconnect with one or more input devices, such as a keyboard, mouse, camera, touch screen and a microphone, or with one or more output devices such as a display screen and a speaker.

Each network interface 198 enables table monitoring subsystem 102 to communicate with other components, to exchange data with other components, to access and connect to network resources, to serve applications, and perform other computing applications by connecting to a network.

Table monitoring subsystem 102 may also include a scale component. Table monitoring subsystem 102 may monitor chips and cards on the gaming table using scales. A scale may be placed underneath the casino table, or underneath the area on which the chips or cards are placed, such as a betting area or channels of a chip tray. The scale may take measurements during the time periods when no movement of the chips or cards is done. For example, players may place the cards or chips on the table or a dealer may place chips in the chip tray, upon seeing a particular gesture, a scale may read the weight and the system may determine, based on the weight, as well as the monitoring mechanism, the number of cards or chips on the table or tray or the position of the cards or chips. The weight reading may be done at a later point, to confirm that no cards or chips were taken off of the table, to consider if cards or chips have been taken off the table, or to consider if cards or chips have been moved. The scale may take measurements of the weight responsive to a command by the system. As such, the system may determine when the chips or cards are not touched by the dealer or the player, thereby ensuring that a correct measurement is taken and, in response to such a determination, sending a command to measure the weight of the chips or cards. As an example, based on the weight and the coloring of the chips, the system may determine the present amount of the chips the user may have and the position of the chips. This may be an example of table monitoring activity.

Using these techniques, the system may monitor and track the chips of the dealers and the chips of the players, may track the progress of each player, may be able to see when and how each player is performing, and may also monitor new hands to determine hand count. The system may therefore know the amount of chips gained or lost in real time at any given time, and may also know the number of cards in each player's hand, and so on. The system may also use these techniques for determining that a bet has been made for playing a progressive game, such that the progressive game monitoring server 104 may generate aggregated betting data for the gaming tables, and compute a progressive jackpot metric for increasing or decreasing one or more progressive jackpots of the progressive game, and may send a control command to the jackpot interface device 122 for displaying one or more progressive jackpots from the progressive game.

As described herein, embodiments described herein may provide systems, methods and devices with table monitoring capabilities for monitoring progressive game activities at a plurality of gaming tables. Table monitoring data may be generated and collected as bet data and chip transfer data, bet position data, player identification data, and table identification data. For example, a game may involve betting chips and system may detect chips placed on a betting area, placed in a chip tray, or removed from a chip tray, using table monitoring subsystem 102.

The table monitoring subsystem 102 may capture image data for bet data and bet position data in response to chip detection in a betting region, and/or may capture image data for chip transfer data in response to chips being placed in or removed from a chip tray, and may capture data corresponding to the player identification data and the table identification data.

In some embodiments, one or more table monitoring subsystems 102 may be used together for capturing data to monitor bets being made and the transfer of chips at a plurality of gaming table, to capture data corresponding to the position of the bet, the player identification data, and table identification data, for monitoring progressive game activities at the plurality of gaming tables.

Details on the table monitoring subsystem 102 and the imaging processing techniques used by the progressive game monitoring server 104, including the types of imaging components and sensors on the table monitoring subsystem 102 and the data captured and transmitted by the table monitoring subsystem 102, the calibration of the table monitoring subsystem 102, and image processing techniques for capturing the data to monitor bets being made and the transfer of chips at a plurality of gaming table, to capture data corresponding to the position of the bet, the player identification data, and table identification data, and further details on the image processing based on the data captured by the table monitoring subsystem 102 is described in U.S. patent application Ser. No. 15/309,102, PCT Application No. PCT/CA2016/050442, and U.S. Patent Application No. 62/519,637, the entire contents of which are hereby incorporated by reference.

The table monitoring subsystem 102 may capture data corresponding to a bet being made on a gaming surface of a gaming table, the amount of the bet, and the position of the bet. The data may correspond to a player placing a bet for one or more progressive jackpots of a progressive game. Each table monitoring subsystem 102 may comprise one or more sensors responsive to activation events and deactivation events to trigger capture of the image data by the imaging component of the table monitoring subsystem 102. Example activation events and deactivations to trigger capture of the image data may be placement of the bet on the gaming surface, or commencement of game play of the game at the gaming table. Accordingly, the system monitoring progressive game activities at a plurality of gaming tables, such as system 100A, may associate one or more bets to one or more outcomes of a game played at the gaming tables, and the bet by the one or more players may be "locked in".

When the game played at the gaming table commences, data may be captured corresponding to bets made for playing a progressive game. In some embodiments, the system 100A or the table monitoring subsystem 102 may comprise a card reader unit. The card reader unit may comprise a channel with an opening for receiving a card, such as a poker card used for play of a game at a gaming table. The card reader unit may comprise a contact image sensor and an optical flow sensor for capturing image data corresponding to the card, such as the numbers, letters, and suit of the card. The card reader unit may comprise a switch, which may be mounted at the end of the channel opposite the opening. Cards used for the game may be inserted into the card reader unit before they are dealt to players and the dealer at the gaming table. The contact image sensor, optical flow sensor, or switch may generate capture data indicative of the card being placed in the card reader unit. This data may be used by the table monitoring subsystem 102 to trigger capture of the image data may be placement of the bet on the gaming surface. Further details on the card reader unit are described in U.S. patent application Ser. No. 15/309,102, PCT Application No. PCT/CA2016/050442, and U.S. Patent Application No. 62/519,637, the entire contents of which are hereby incorporated by reference.

In some embodiments, the system 100A or the table monitoring subsystem 102 may comprise a card shoe, a card shuffler, or overhead camera, or receive data from a card shoe, a card shuffler, or overhead camera to trigger capture of the image data by the imaging component of the table monitoring subsystem 102.

In some embodiments, the system 100A comprises a hand count device as described herein for determining when bets have been made for playing a progressive game.

In some embodiments, the dealer may perform a gesture to the players at the gaming table to indicate that betting may be complete and that the bets are locked in.

In some embodiments, the dealer may press a button or virtual button rendered on a display of a table monitoring subsystem 102 and may send a control command to the progressive game monitoring server 104 indicating that the betting is complete and that the betting is complete and that the bets are locked in.

The captured data from the table monitoring subsystem 102 may be associated with a time stamp, which the progressive game monitoring server 104 may use to determine which bet, and the player who made the bet, won one or more progressive jackpots of the progressive game.

In some embodiments, after the table monitoring subsystems 102 of the plurality of gaming tables captures data corresponding to the bet made, the amount of the bet, the position of the bet, the player identification data, and the table identification data, the progressive game monitoring server 104 may dynamically update the one or more progressive jackpots of the progressive game. The progressive game monitoring server 104 may compute a progressive jackpot metric for increasing or decreasing one or more progressive jackpots of a progressive game based on the aggregated data from the table monitoring subsystems 102.

FIG. 6 and FIG. 7 depict an example set of data captured from the table monitoring subsystems 102 and configuration and parameter data of a system for monitoring progressive game activities at a plurality of gaming tables for processing by the progressive game monitoring server 104. The data may be stored in a database, such as data store 112, MongoDB 174, data storage 250, or external databases 252. In some embodiments, portions of the data may be stored in different databases. The data may be organized in a tabular format, such as table 600, as depicted in FIG. 6, and table 700, as depicted in FIG. 7. References to columns or rows of a table may relate to columns or rows of tables within the table. Operations, such as ordering, sorting, and distributing, may be performed on the table, such as by progressive game monitoring server 104, based on values of a field stored in a column or row or the table. In some embodiments, the data stored in the table may be binary streams of data, or may be document-oriented data, or may be object-oriented data. The data may correspond to documents or objects. Columns may correspond to data fields in the objects or records. Rows may correspond to documents or objects.

Table 600, as depicted in FIG. 6, includes a plurality of processed data based on data captured by the table monitoring subsystems 102 for a system for monitoring progressive game activities at a plurality of gaming tables. Table 600 includes a plurality of rows of data 602 corresponding to bets made at a plurality of gaming tables. A new row of data 602 may be generated as more bets are made when playing a game at the gaming tables. As depicted, the values recorded in table 600 may be associated with the bets made for playing a progressive game at a particular gaming table, and may include values in a Bet Identification column 604, a Time Stamp column 606, a Player Identification Data column 608, a Table Identification Data column 610, a Bet Quantity column 612, a Bet Position column 614, and a Game Element column 616.

The Bet Identification column 604 may contain data identifying a particular bet, such as a reference number for a bet.

The Time Stamp column 606 may contain data corresponding to a time stamp of the bet.

The Player Identification Data column 608 may contain data values corresponding to the player identification data of the player who made the bet of the particular bet identified in Bet Identification column 604. The data in the Player Identification Data column 608 may correspond to or may be associated to the identity of the player, and how much money, credits, or currency are available in their account. This data may have been previously saved on a database, such as such as data store 112, MongoDB 174, data storage 250, or external databases 252 when the player first created the account or when the account has been updating during and after game play at the gaming establishment.

The Table Identification Data column 610 may contain data corresponding to the table at which the player identified in Player Identification Data column 608 made the bet identified in Bet Identification column 604. The data in the Table Identification data column 610 may be one or more serial numbers associated with the gaming tables.

The Bet Quantity column 612 may comprise data corresponding to the amount of the bet identified under Bet Identification column 604. This may be determined by the progressive game monitoring server 104 processing the captured data from the table monitoring subsystems 102 of the plurality of gaming tables.

The Bet Position column 614 may comprise data corresponding to a position of the gaming surface of the gaming table upon which the bet identified under Bet Identification column 604 was made. This may be determined by the progressive game monitoring server 104 processing the captured data from the table monitoring subsystems 102 of the plurality of gaming tables.

The Game Element column 616 may comprise data corresponding to a game element of a player. The game element of a game may be a game event or a game outcome of the game played. For example, when a player is playing a card game at the gaming table, the game element of the player may be one or more cards received during game play, or may be a combination of cards received during game play, such as a straight, flush, pair, three of a kind, full house, four of a kind, straight flush, royal flush, and so on. As another example, when a player is playing a dice game at the gaming table, the game element of the player may be the result of rolling one or more dice.

Table 700, as depicted in FIG. 7, includes a plurality of configuration and parameter data for a progressive game, which may be input or changed by a user through the front end interface 110. Table 700 includes a plurality of rows of data 702 corresponding to a number of pots that increase or decrease during play of a progressive game. As depicted in FIG. 7, table 700 comprises five rows for five progressive jackpots. The number of such pots, and the number of rows of data 702, may be increased or decreased by a user of the system for monitoring progressive game activities at a plurality of gaming tables. For example, there may be progressive jackpots for getting a straight or getting a three of a kind. The number of progressive jackpots for the progressive game may be based on the rules and game play features of the base game being played on the gaming table.

In some embodiments, some rows of table 700 may correspond to pots that are not progressive jackpots. For example, as depicted in table 700, one row may be for a "Non-jackpot" pot, which may be to award a player for having a particular outcome of a game that does not correspond to an outcome of a game for winning a progressive jackpot. The "Non-jackpot" pot may increase each time a bet is made. As another example, one row may be for a "House Advantage" pot, which may correspond to profits of the gaming establishment. The "House Advantage" pot may increase each time a bet is made. As another example, a row may be a "Reset" pot, which may correspond to a pot for refilling a pot that has decreased, such as a progressive jackpot that was recently won by a player. The "Reset" pot may increase each time a bet is made. As another example, a row may correspond to a "Deficit" pot, which may be drawn from if the size of the progressive jackpot won by a player is not sufficiently large compared to the progressive jackpot metric corresponding to the progressive prize. As another example, a row may correspond to a "Total" amount for computing the total size of the progressive jackpots, the total amount of money associated with the progressive jackpot game, and the like. Other pots may be configured into the progressive game, and may be represented as a row in table 700.

As depicted, the values recorded in table 700 may be associated with the configurations and parameters of a progressive game, and may include values in a Jackpot Identification column 704, a Winning Game Element column 706, a Reference Position column 707, a Bet Multiplier column 708, a Jackpot Amount column 710, a Minimum Amount column 712, a Maximum Amount column 714, and a Percentage Allocation column 716.

The Jackpot Identification column 704 may comprise data identifying a particular progressive jackpot or pot, such as a reference number or name for a progressive jackpot or pot The Winning Game Element column 706 may comprise data corresponding to a reference data set for winning the progressive jackpot identified under the Jackpot Identification column 704. For example, as depicted in FIG. 7, to win a progressive jackpot, the player may need to have a royal flush, straight flush, 4 Kings, a full house, a flush, and so on. Accordingly, there may be different odds for winning the different progressive jackpots.

The Reference Position column 707 may comprise data associating a position on the gaming surface with the progressive jackpot.

The Bet Multiplier column 708 may comprise data corresponding to a factor used with the bet quantity data of Column 610 for the progressive game monitoring server 104 to calculate a progressive jackpot metric for increasing the associated progressive jackpot. As depicted in FIG. 7, the bet multiplier corresponding to progressive jackpots associated with a rarer game outcome (e.g. a royal flush), may be higher than the bet multiplier corresponding to progressive jackpots associated with a less rare game outcome (e.g. a flush).

The Jackpot Amount column 710 may comprise data corresponding to the amount of the pot.

The Minimum Amount column 712 may comprise data corresponding to an amount of the progressive jackpot to be reset after the progressive jackpot has been won. As depicted in FIG. 7, the minimum amount of a corresponding to progressive jackpots associated with a rarer game outcome (e.g. a royal flush), may be higher than the minimum amount of progressive jackpots associated with a less rare game outcome (e.g. a flush).

The Maximum Amount column 714 may comprise data corresponding the maximum amount that the progressive jackpot may increase to. In some embodiments, if the progressive jackpot reaches the maximum amount, then the progressive game monitoring server 104 may not increase the size of the progressive jackpot. Instead, the progressive game monitoring server 104 may increase the size of the House Advantage pot by an amount that corresponds to the portion of the bet that would increase the size of the progressive jackpot to be greater than the maximum amount of the progressive jackpot. In some embodiments, the size of the progressive jackpot may be increased to be greater than the maximum amount. When the progressive jackpot is greater than the maximum amount, the progressive game monitoring server 104 may generate a display enhancement indicative of the progressive jackpot being greater than the maximum amount, and may send a control command to the jackpot interface device 122 to display the display enhancement. As depicted in FIG. 7, the maximum amount of a corresponding to progressive jackpots associated with a rarer game outcome (e.g. a royal flush), may be higher than the maximum amount of progressive jackpots associated with a less rare game outcome (e.g. a flush).

Figure 8:
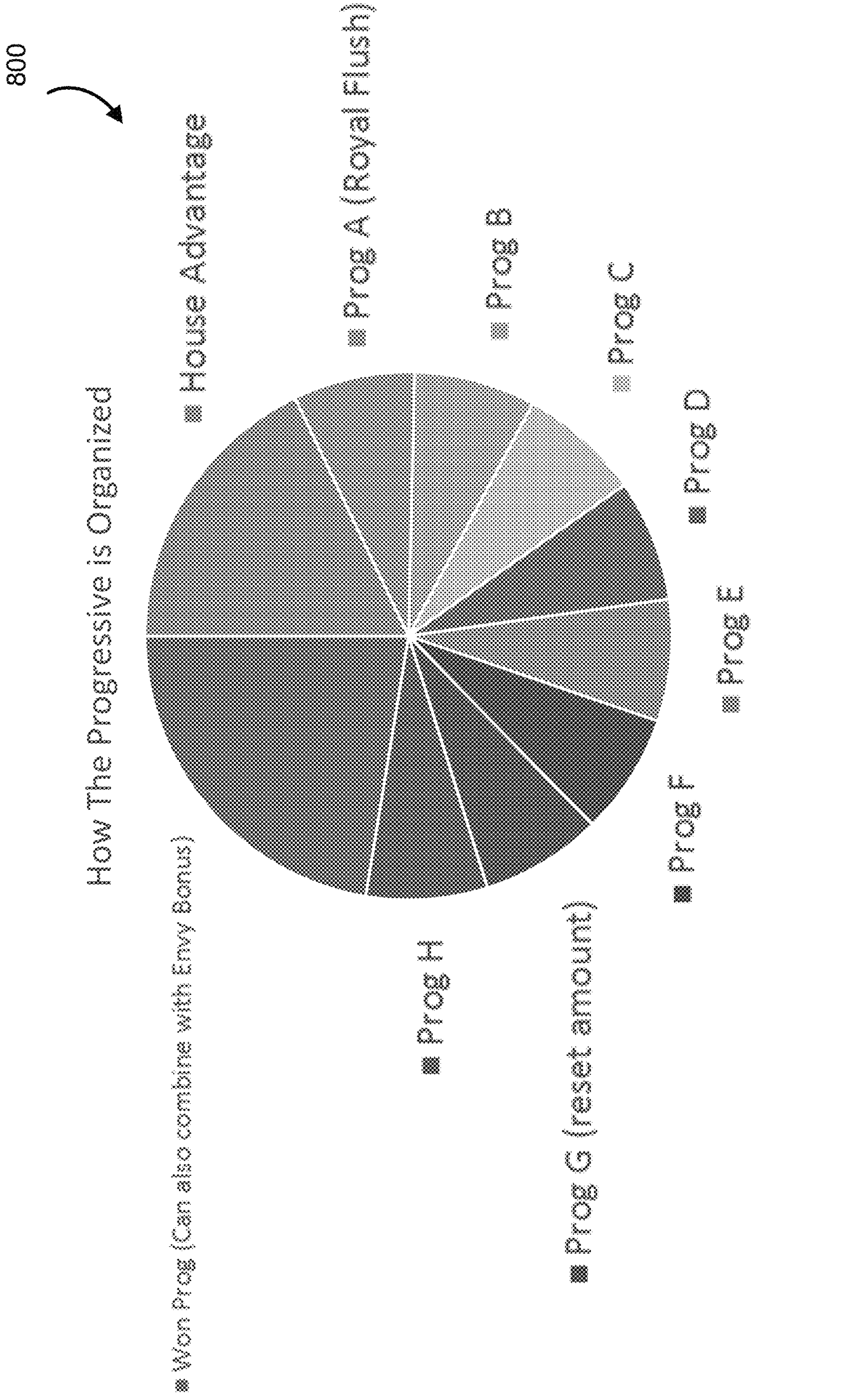
FIG. 8 illustrates is a schematic of pots of a progressive game.

The Percentage Allocation column 716 may comprise data corresponding to a percentage of a bet to be allocated to the pot. The percentage allocation of a pot may be based on the probability of arriving at the outcomes of the base game or progressive game played at the gaming table, and may be customized by a user. For example, the percentage allocation of the House Advantage pot may be customized by the gaming establishment (e.g. 7%, as depicted in FIG. 7), the percentage allocation for the Non-Jackpot pot and the Reset pot may be customized by the gaming establishment using the probabilities of the outcomes of the base game or progressive game (e.g. 43% and 1%, respectively, as depicted in FIG. 7), and the percentage allocation of the progressive jackpots 1 to 5 may be customized by the gaming establishment, and may be based on the probability of arriving at the outcomes of the base game or progressive game played at the gaming table. The percent allocation to the Non-jackpot pot may be higher than the percent allocation to the other pots In some embodiments, the sum of the percentages of the Percentage Allocation column 716 may add up to 100%. Accordingly, all of the bets made for playing a progressive game may be processed by the progressive game monitoring server 104 for managing each pot of the progressive game. FIG. 8 depicts a pie graph of how a progressive game 800 may be organized. As depicted, progressive game 800 may comprise a House Advantage pot, progressive jackpots A, B, C, D, E, F, G, and H. Progressive jackpot A may be won if a player gets a royal flush. Progressive jackpot G may be a Reset pot. The progressive game 800 may comprise a Won Progressive pot, which may be a pot such that a player who won a progressive jackpot may receive their full progressive prize. As depicted in FIG. 8, the pots define a full pie of the pie graph. In some embodiments, a bet for playing a progressive game may increase one or more pots of a progressive game. In some embodiments, a bet for playing a progressive game may increase the House Advantage pot and the progressive jackpot for which the bet was made. In some embodiments, a bet for playing a progressive game may increase all pots of a progressive game.

In operation, the progressive game monitoring server 104 may receive data from the table monitoring subsystems 102. The progressive game monitoring server 104 may process the data to determine one or more bets made by one or more players, the time stamp of the bet, player identification data for the bet, table identification data for the bet, the bet quantity of the bet, the bet position of the bet, and the player's game element. The processed data may be organized using table 600 as depicted in FIG. 6.

Based on the bet position data processed by the progressive game monitoring server 104, which may be stored under the Bet Position column 614 of table 600, the progressive game monitoring server 104 may determine if the bet is for playing a progressive game, and if so, whether the bet is associated with a particular progressive jackpot of the progressive game.

If the progressive game monitoring server 104 determines that the bet is for playing a progressive game, the progressive game monitoring server 104 may compute one or more progressive game metrics for increasing one or more progressive jackpots. The progressive game metric may be computed by multiplying the amount of the bet, which may be stored under the Bet Quantity column 612 of table 600, with one or more percentage allocations, which may be stored under the Percentage Allocation column 716 of table 700, and the progressive game monitoring server 104 may increase the one or more pots by the computed progressive game metrics. In some embodiments, each bet may increase all pots of the progressive game. For example, each bet may increase progressive jackpots 1 to 5, the Non-jackpot pot, the House Advantage pot, and the Reset pot, as depicted in FIG. 7. In some embodiments, the progressive game monitoring server 104 may compare the data under the Bet Position column 614 with the data under the Reference Position column 707, and may increase only some of the pots of the progressive game based on the placement of the bet on the gaming surface. For example, based on the comparison between the data under the Bet Position column 614 with the data under the Reference Position column 707, which may indicate that the player is betting on progressive jackpot 1, only progressive jackpot 1, the Non-jackpot pot, the House Advantage pot, and the Reset pot may be increased. As another example, only one progressive jackpot, such as progressive jackpot 1, and the House Advantage pot may be increased.

In some embodiments, the amount of the bet or the denominations of betting markers used for the bet, as identified by the progressive game monitoring server 104, may be used to determine which pots of the progressive game may be increased.

As more bets are made for playing a progressive game, the progressive game monitoring server 104 may increase one or more pots of the progressive game. The progressive game monitoring server 104 may compare the data under the Jackpot Amount column 710 and the Maximum Amount column 714. If the size of the progressive jackpot reaches the maximum amount, then the progressive game monitoring server 104 may not increase the size of the progressive jackpot. Instead, the progressive game monitoring server 104 may increase the size of the House Advantage pot by an amount that corresponds to the portion of the bet that would increase the size of the progressive jackpot to be greater than the maximum amount of the progressive jackpot.

To determine a winner of a progressive game, the progressive game monitoring server 104 may compare the data under the Game Element column 616 for a particular bet with the data under the Winning Game element column 706.

If the data under the Game Element column 616 does not correspond to the data under the Winning Game element column 706, then the progressive game monitoring server 104 may determine that the player did not win a progressive jackpot. Then, the table monitoring subsystems 102 continues to capture data correspond to the bet made, the amount of the bet, the position of the bet, the player identification data, and the table identification data, and the progressive game monitoring server 104 continues to process the data from the table monitoring subsystems 102 to monitor progressive game activities at a plurality of gaming tables and, in particular, process data corresponding to bets that have been made for playing a progressive game, and increasing one or more pots as bets are made If the data under the Game Element column 616 corresponds to the data under the Winning Game element column 706, then the progressive game monitoring server 102 may determine that the player who made the bet won the progressive jackpot. For example, a player who got a royal flush while playing a game at the gaming table may win the progressive jackpot 1 corresponding to getting a royal flush. In some embodiments, the progressive game monitoring server 104 may compare the data under the Bet Position column 614 of the particular bet with the data under the Reference Position 707 to confirm that the player was making a bet to play a particular progressive jackpot, and that the player won that progressive jackpot. For example, the player may have placed a bet on the gaming surface indicative of making a bet to play the progressive jackpot corresponding to getting a full house. The player may have a royal flush. However, the player did not make a bet for playing the progressive jackpot corresponding to getting a royal flush, so the progressive game monitoring server 104 may determine that the player did not win the progressive jackpot corresponding to the royal flush or corresponding to the full house.

In some embodiments, the progressive game monitoring server 104 may determine that one or more players have won the progressive jackpot.

Where more than one bet has been made, and each of those bets wins the progressive prize, the progressive game monitoring server 104 may determine the winner of the progressive jackpot using the data under the Time Stamp column 606. The progressive game monitoring server 104 may determine that the bet having the earlier time stamp may win the progressive jackpot.

If the progressive game monitoring server 104 determines that a player won a progressive jackpot, the progressive game monitoring server 104 may compute a progressive jackpot metric for decreasing one or more progressive jackpots, which may correspond to the prize for winning the progressive jackpot. The size of the progressive jackpot metric may be based on the data under the Bet Quantity column 612 and the Bet Multiplier column 708. The progressive game monitoring server 104 may compute a progressive jackpot metric to be the product of the bet amount and the bet multiplier. Accordingly, a player may make different amounts of bets for playing a progressive game, and the prize for winning the progressive jackpot may vary based on the size of the bet. This may encourage a player to make larger bets for playing a progressive game.

The progressive game monitoring server 104 may associate the amount of the progressive jackpot metric (the progressive prize) with the player identification data associated with the bet. The progressive game monitoring server 104 may update a portion of the player identification data, which may corresponding to the amount of money, credits, or currency, with the progressive jackpot metric corresponding to the progressive prize. The player having the player identification data may be paid the progressive prize. The progressive game monitoring server 104 may reduce the one or more progressive jackpots that were won by the progressive jackpot metric. Where the progressive jackpot that was won reduces in amount to below the minimum amount in accordance with the data under the Minimum Amount column 712, the progressive game monitoring server 104 may further reduce the amount of the Reset pot, as depicted in table 700, by an amount to increase the won progressive jackpot to its minimum amount. In some embodiments, where the progressive game may be configured to have a "Deficit" pot, which may be drawn from if the size of the progressive jackpot won by a player is not sufficiently large compared to the progressive jackpot metric corresponding to the progressive prize, the progressive game monitoring server 104 may reduce the size of the "Deficit" pot and the progressive jackpot that was won in order to associate the progressive jackpot metric (the progressive prize) with the player identification data of the winner of the progressive game.

In some embodiments, the table monitoring subsystem 102 may have a button or have a virtual button rendered on a display screen. The dealer may press the button or virtual button and may send a control command to the progressive game monitoring server 104 indicating that a player at the gaming table has won a progressive prize. This may notify an employee of the gaming establishment, such as a pit boss or a manager, that a progressive prize has been won. Manual notification of a winner of a progressive jackpot may be used when the player who won the progressive jackpot has not logged into the system, for example, by not swiping an identification card or inputting a password into the log-in system, so a dealer at the gaming table may indicate that the player has won the progressive jackpot.

In some embodiments, the progressive game monitoring server 104 may associate a percentage of the progressive jackpot metric corresponding to the prize for winning the progressive jackpot to the player identification data.

In some embodiments, the progressive game monitoring server 104 may be configured to allocate a percentage of the progressive jackpot metric corresponding to the prize for winning the progressive jackpot to the House Advantage pot.

In some embodiments, where more than one player has won a progressive jackpot, the progressive game monitoring server 104 may divide the progressive jackpot metric corresponding to the progressive prize for associating with the winning players. For example, the progressive jackpot metric may be divided evenly and associated with the player identification data of the winning players.

When a player wins a progressive prize, as determined by the progressive game monitoring server 104, the player may be paid from the chips in the chip tray at the gaming table. In some embodiments, the progressive prize for winning a progressive jackpot may be relatively small. For example, a progressive jackpot may be configured to be won by being dealt a straight or getting three of the same cards. Where the progressive prize for winning a progressive jackpot may be relatively small, the dealer may take betting markers, such as chips, from the tray at the gaming table and pay out the progressive prize to the player.

In some embodiments, based on the size of the progressive prize, the progressive game monitoring server 104 may compute a prorated progressive jackpot metric and associating the prorated progressive metric with the player identification data of the player over a period of time.

After the progressive game monitoring server 104 has managed the sizes of the various pots after one or more jackpots has been won, the table monitoring subsystems 102 continues to capture data correspond to the bet made, the amount of the bet, the position of the bet, the player identification data, and the table identification data, and the progressive game monitoring server 104 continues to process the data from the table monitoring subsystems 102 to monitor progressive game activities at a plurality of gaming tables and, in particular, process data corresponding to bets that have been made for playing a progressive game, and increasing one or more pots as bets are made, or decreasing one or more pots as progressive jackpots are won.

It may be rare for a player to win a progressive jackpot. In some embodiments, when the progressive game monitoring server 104 determines that a player has won a progressive prize, the progressive game monitoring server 104 may award an envy bonus to one or more players associated with the winner of the progressive prize. For example, the progressive game monitoring server 104 may award an envy bonus to one or more players at the gaming table of the winner of the progressive prize. The progressive game monitoring server 104 may determine payout of the envy bonus based on the size of the progressive prize, the gaming table, the location of the gaming establishment, the type of base game or progressive game played, the frequency that a player at the gaming table has won a progressive prize, and the like.

In some embodiments, based on the configuration and parameters of the progressive game, the size of the bet for playing a progressive game may improve the odds of winning one or more jackpots.

For example, a progressive jackpot for a progressive game may be configured such that a player may win the progressive jackpot if the player is dealt a particular card, such as an ace of spades. The progressive jackpot may be configured such that the bet to play the progressive jackpot may be a certain amount, such as $5. The player may make a bet of $10 to play the progressive jackpot, as determined by the progressive game monitoring server 104 processing the data captured by the table monitoring subsystem 102. As the bet made was two times the required bet amount, the progressive game monitoring server 104 may update the data under the Winning Game element column 706 during the game play of this game to include two times number of outcomes for winning the progressive jackpot. For example, if the player makes a $10 bet, the player may win the progressive jackpot when dealt an ace of spades or ace of hearts. Accordingly, the player, making two times the required bet, may improve their odds to win the progressive jackpot by two.

The system for monitoring progressive game activities at a plurality of gaming tables may comprise the jackpot interface device 122 for displaying the one or more progressive jackpots from the progressive game monitoring server 104 for provision to or display on end user systems. The jackpot interface device 122 may receive control commands from the progressive game monitoring server 104 to control displaying the one or more progressive jackpots.

In some embodiments, as the one or more progressive jackpots increase or decrease in size, the progressive game monitoring server 104 may send a control command to the jackpot interface device 122 such that the progressive jackpots may be displayed as an increasing or decreasing meter. In some embodiments, the progressive jackpots may be displayed as an increasing or decreasing rolling meter.

In some embodiments, the progressive game monitoring server 104 may send a control command to the jackpot interface device 122 in real time or near real time to update the display of the one or more progressive jackpots on the jackpot interface device 122.

Figure 9A:
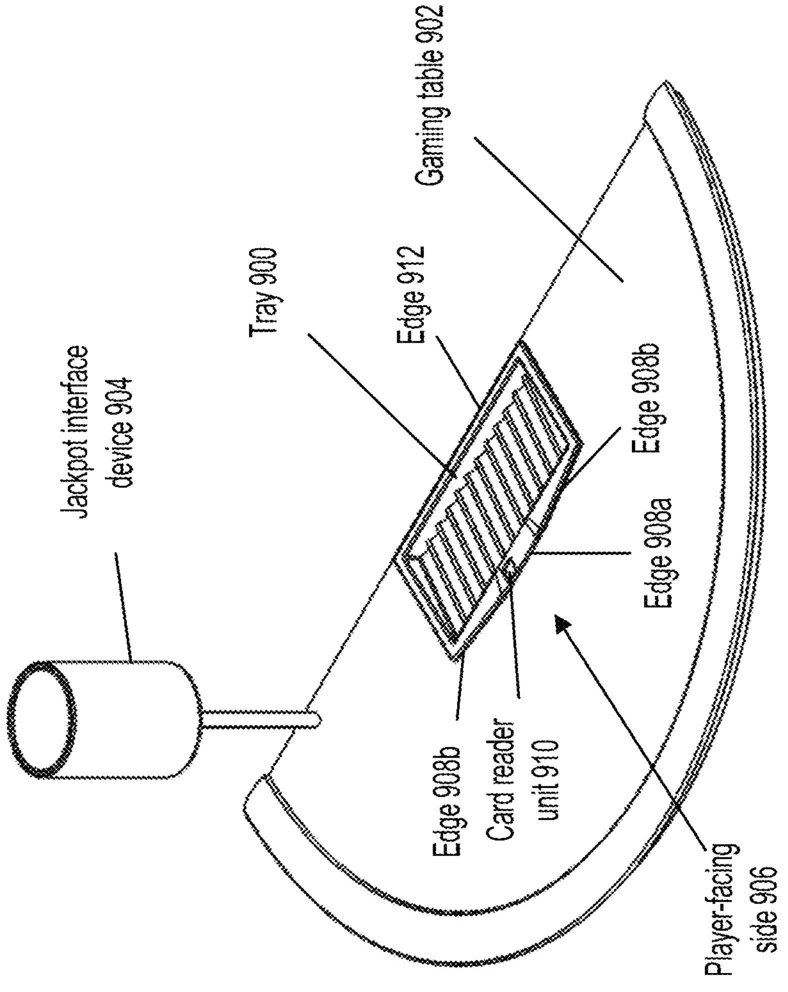
FIG. 9A illustrates a perspective view of an example gaming table with a jackpot interface device according to some embodiments.
Figure 9B:
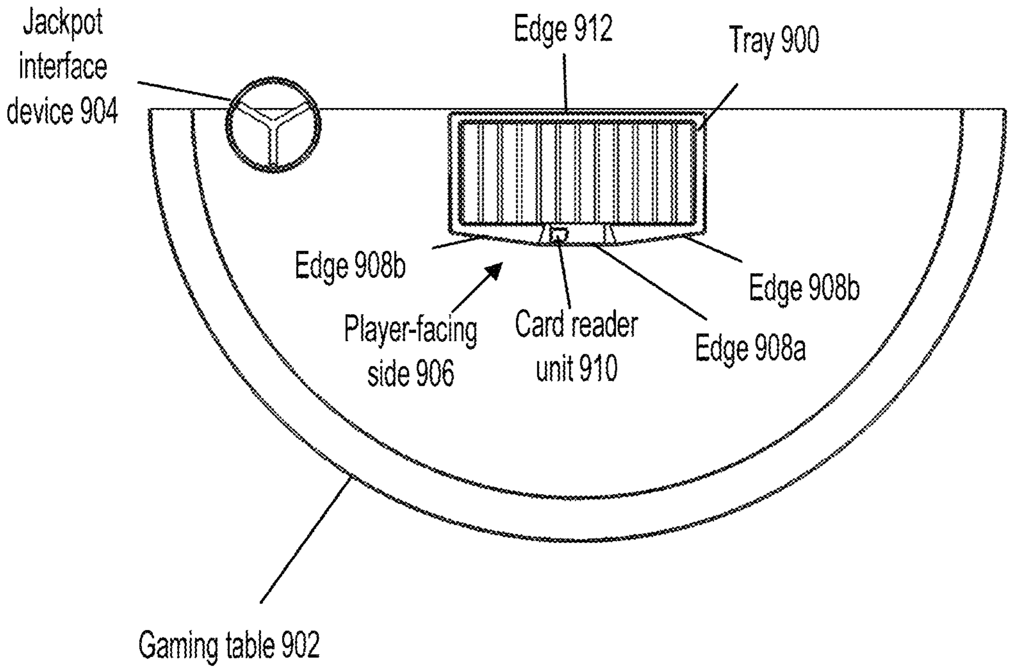
FIG. 9B illustrates a top view of the gaming table of FIG. 9A according to some embodiments.
Figure 9C:
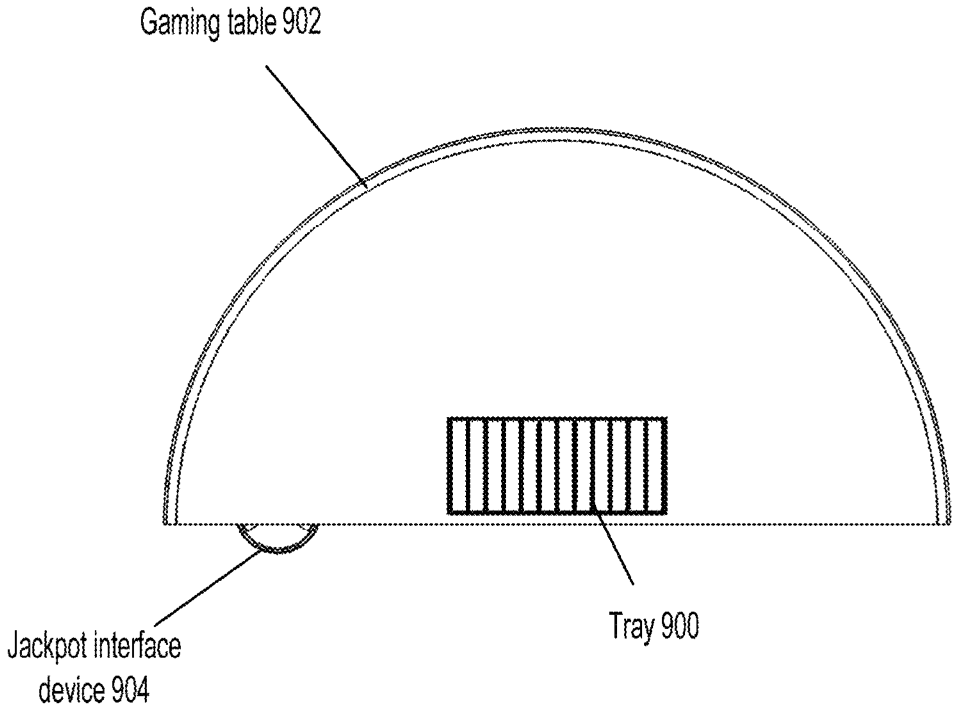
FIG. 9C illustrates a bottom view of the gaming table of FIG. 9A according to some embodiments.
Figure 9D:
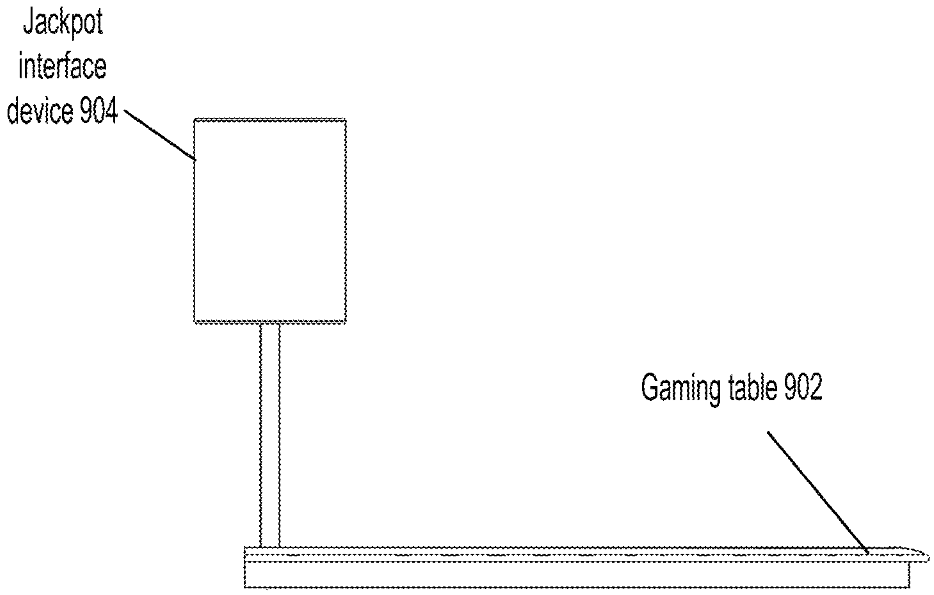
FIG. 9D illustrates a left view of the gaming table of FIG. 9A according to some embodiments.
Figure 9E:
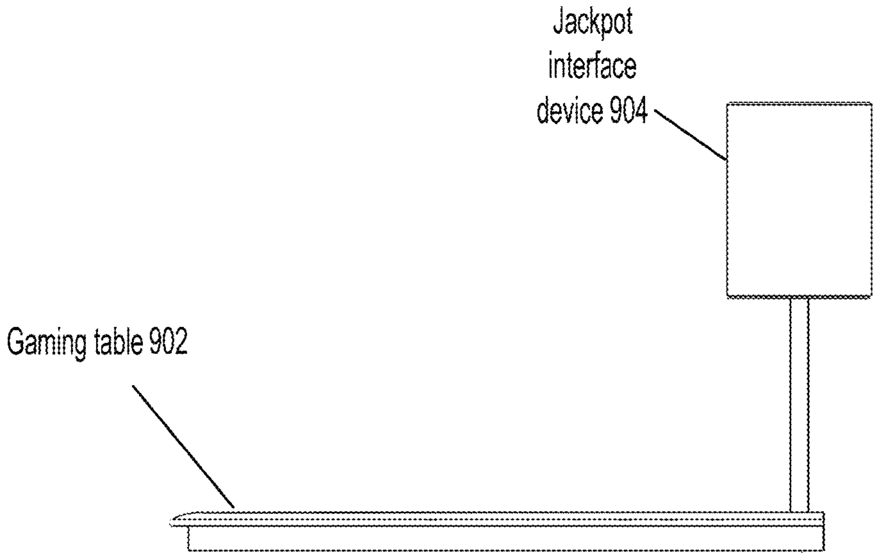
FIG. 9E illustrates a right view of the gaming table of FIG. 9A according to some embodiments.
Figure 9F:
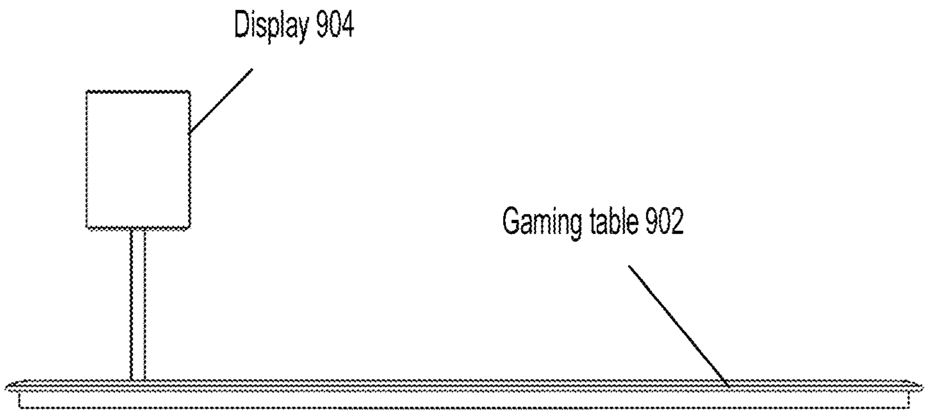
FIG. 9F illustrates a front view of the gaming table of FIG. 9A according to some embodiments.
Figure 9G:
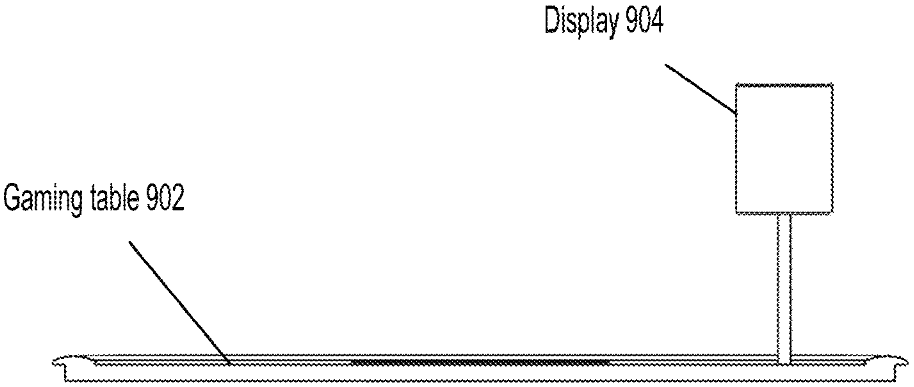
FIG. 9G illustrates a back view of the gaming table of FIG. 9A according to some embodiments.
Figure 9H:
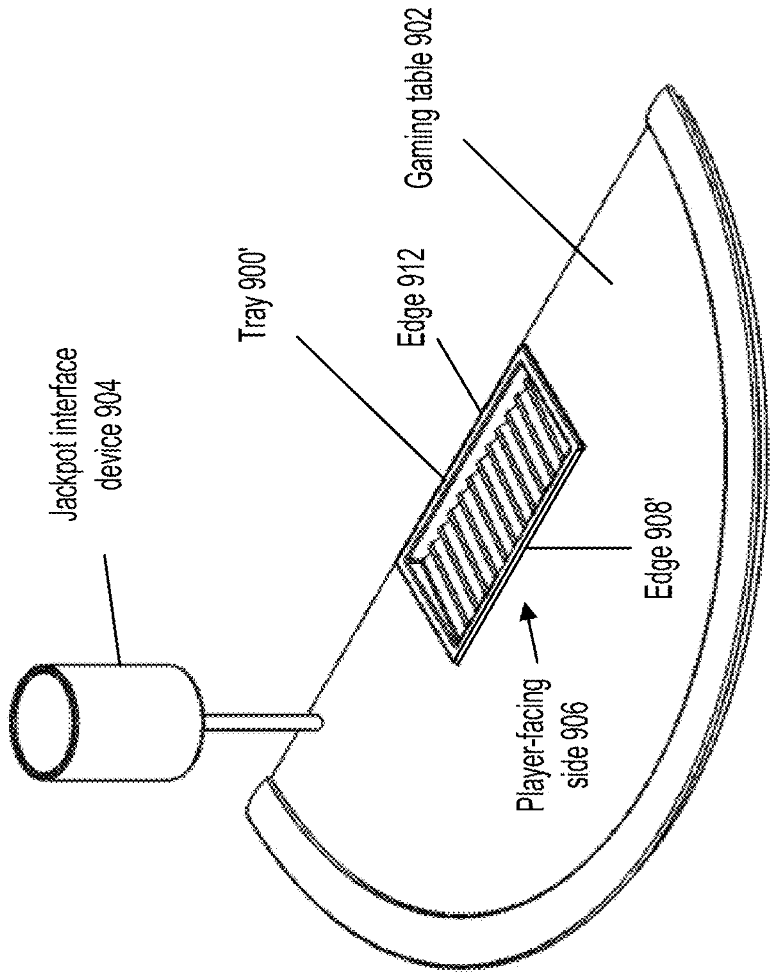
FIG. 9H illustrates a perspective view of another example gaming table with a jackpot interface device according to some embodiments.

FIG. 9A to FIG. 9I illustrates an example gaming table 902 with a jackpot interface device 904 on the side of the gaming table 902 according to some embodiments. As depicted in FIG. 9A, a chip tray 900 may be mounted to the gaming table 902. Similarly, as depicted in FIG. 9H, a chip tray 900' may be mounted to the gaming table 902. In some embodiments, the gaming table 902 has a generally semi-circular shape.

Figure 9I:
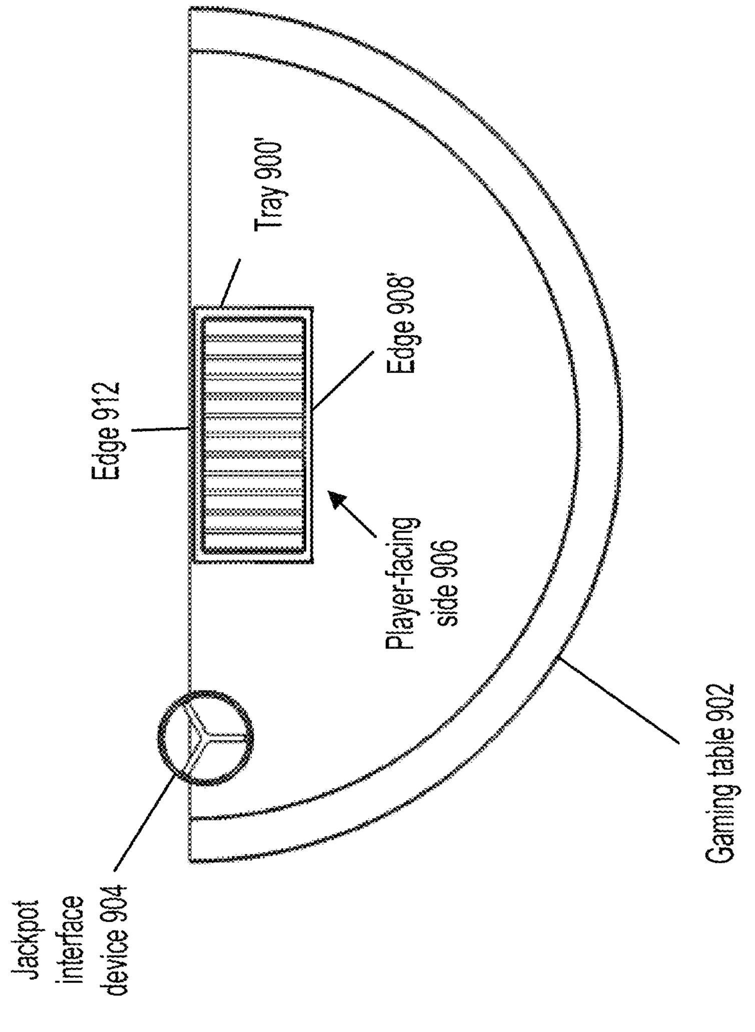
FIG. 9I illustrates a top view of the gaming table of FIG. 9H according to some embodiments.

As depicted in FIG. 9A and FIG. 9B, a player-facing side 906 of the chip tray 900 may have one or more edges 908 angled with respect to one or more other edges 908. The chip tray 900 has two outer edges 908*b* that are angled with respect to a middle edge 908*a*. The edge 908*a* may be generally parallel to an opposite edge 912 of the chip tray 900. The chip tray 900 may comprise a card reader unit 910 as described herein and in U.S. patent application Ser. No. 15/309,102, PCT Application No. PCT/CA2016/050442, and U.S. Patent Application No. 62/519,637, the entire contents of which are hereby incorporated by reference. In some embodiments, the player-facing side 906 of the chip tray, such as the chip tray 900' as depicted in FIG. 9H and FIG. 9I, may have a single edge 908' that may be generally parallel to an opposite edge 912 and may not have any card reader units 910.

The jackpot interface device 904 may be mounted on the gaming table 902 such that the jackpot interface device 904 is positioned above the gaming table 902. The jackpot interface device 904 may be configured to display bets, limits, and the size of one or more jackpots of a progressive game. As depicted in FIG. 9A, the jackpot interface device 904 is generally cylindrical in shape.

In some embodiments, the jackpot interface device 904 may be an LCD panel, comprising fibre optic strands. When light enters the fibre optic strands, the light exits in the same manner, such that an object behind the fibre optic strands appears to be pushed to the front of the fibre optic strands.

In some embodiments, the LCD panel of the jackpot interface device 904 may be curved to create a reverse curve screen. The LCD panel may be convex or concave, depending on the curvature of the gaming table 902. For example, the LCD panel of the jackpot interface device 904 may be convex if the gaming table 902 has a generally semi-circular shape as depicted in FIG. 9A and FIG. 9H.

The content displayed on the jackpot interface device 904 may allow players sitting at the gaming table 902 to read the content displayed on the jackpot interface device 904 from the player's position.

In some embodiments, a camera may be mounted on top of the jackpot interface device 904 for capturing image data corresponding to the gaming table and the chips on the gaming table, and the data may be transmitted to the progressive game monitoring server 104 for processing.

Figure 10A:
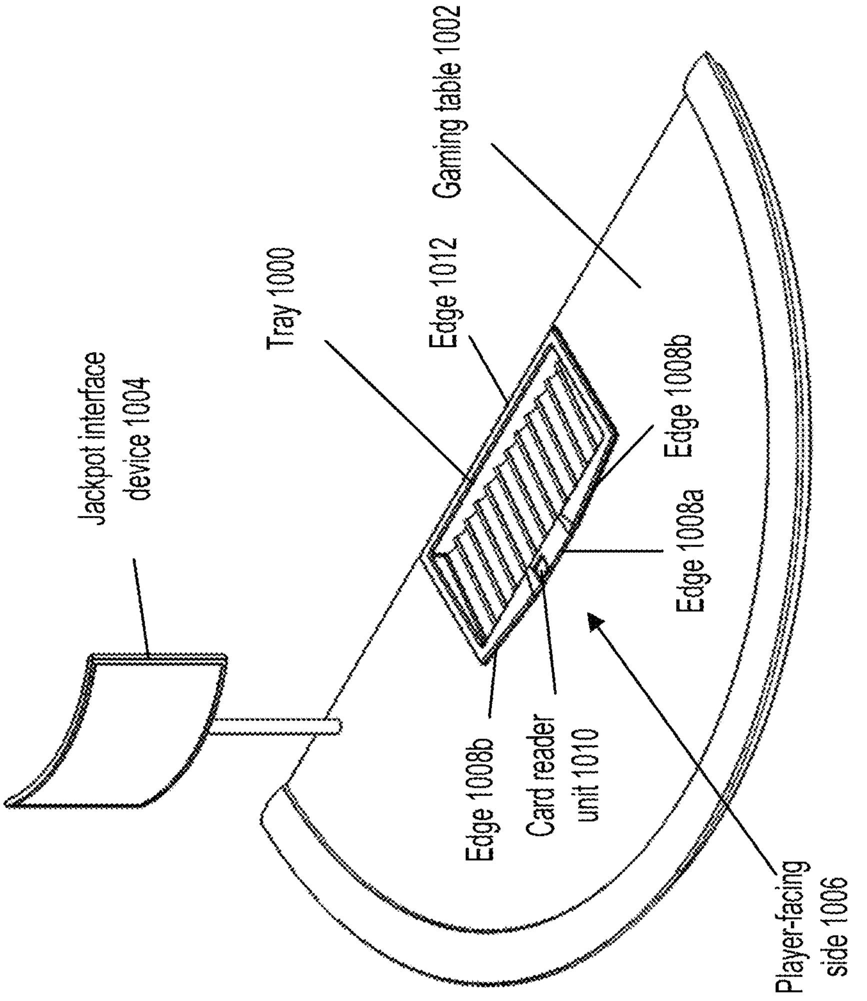
FIG. 10A illustrates a perspective view of another example gaming table with a jackpot interface device according to some embodiments.
Figure 10B:
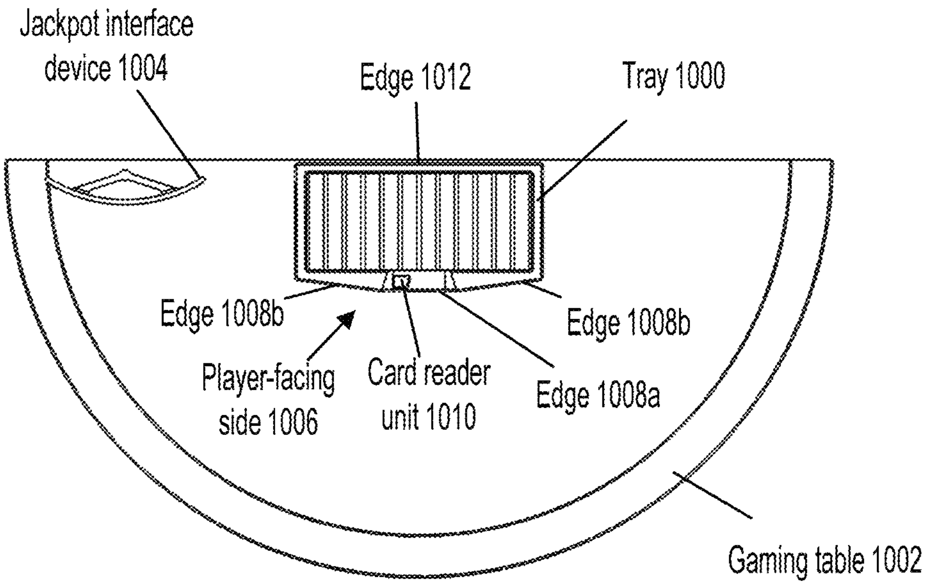
FIG. 10B illustrates a top view of the gaming table of FIG. 10A according to some embodiments.
Figure 10C:
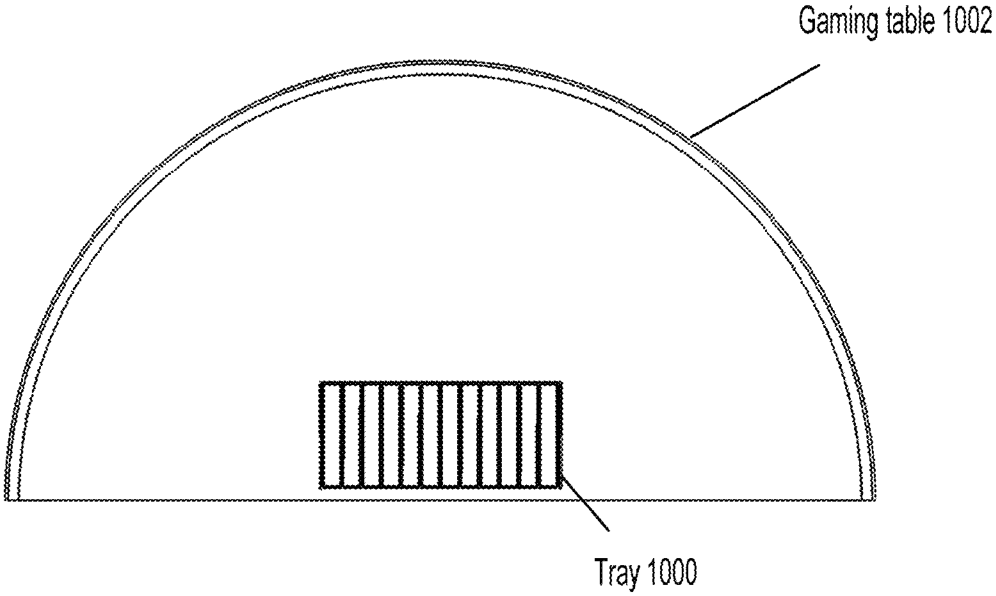
FIG. 10C illustrates a bottom view of the gaming table of FIG. 10A according to some embodiments.
Figure 10D:
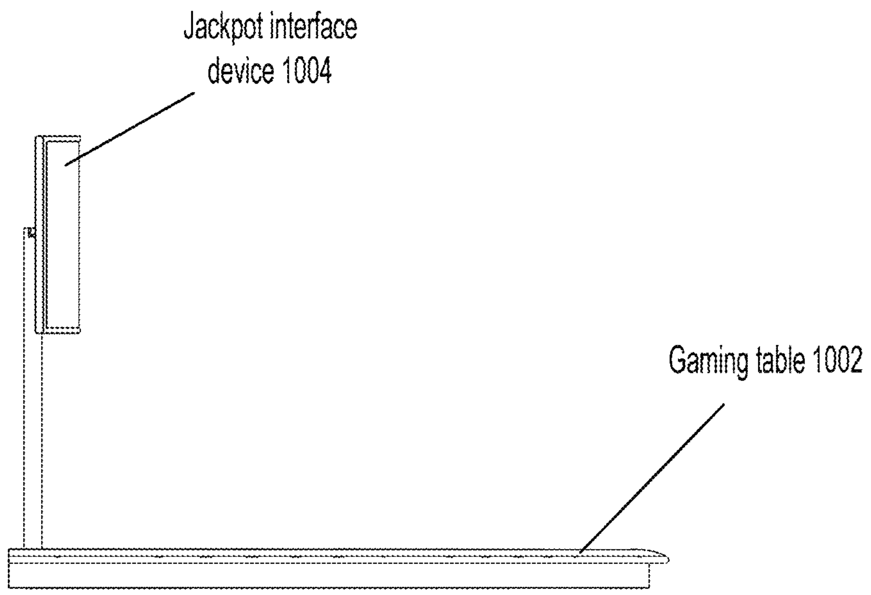
FIG. 10D illustrates a left view of the gaming table of FIG. 10A according to some embodiments.
Figure 10E:
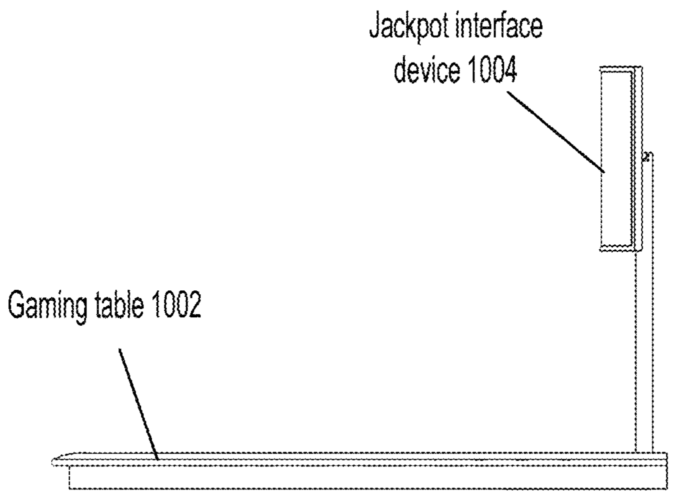
FIG. 10E illustrates a right view of the gaming table of FIG. 10A according to some embodiments.
Figure 10F:
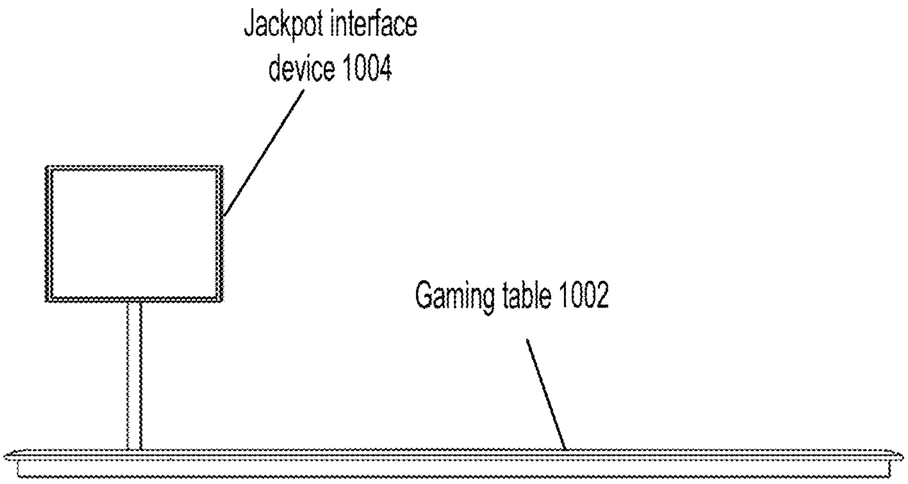
FIG. 10F illustrates a front view of the gaming table of FIG. 10A according to some embodiments.
Figure 10G:
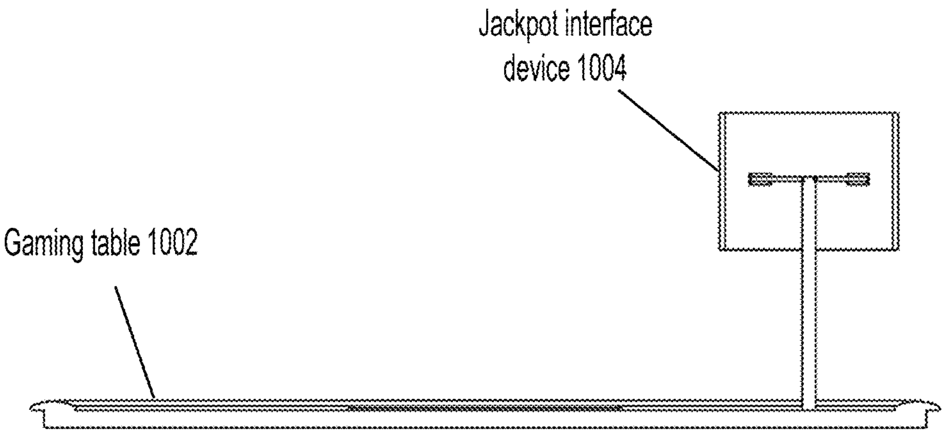
FIG. 10G illustrates a back view of the gaming table of FIG. 10A according to some embodiments.
Figure 10H:
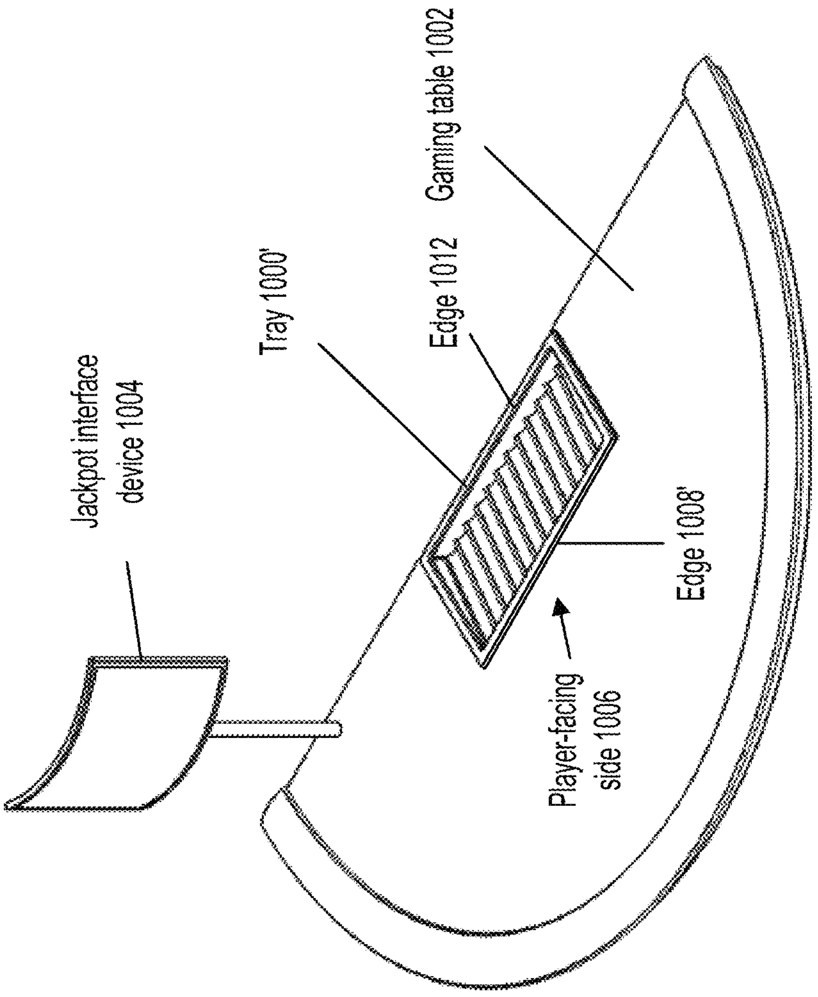
FIG. 10H illustrates a perspective view of another example gaming table with a jackpot interface device according to some embodiments.

FIG. 10A to FIG. 10I illustrates an example gaming table 1002 with a jackpot interface device 1004 according to some embodiments. As depicted in FIG. 10A, a chip tray 1000 may be mounted to the gaming table 1002. Similarly, as depicted in FIG. 10H, a chip tray 1000' may be mounted to the gaming table 1002. In some embodiments, the gaming table 1002 has a generally semi-circular shape.

Figure 10I:
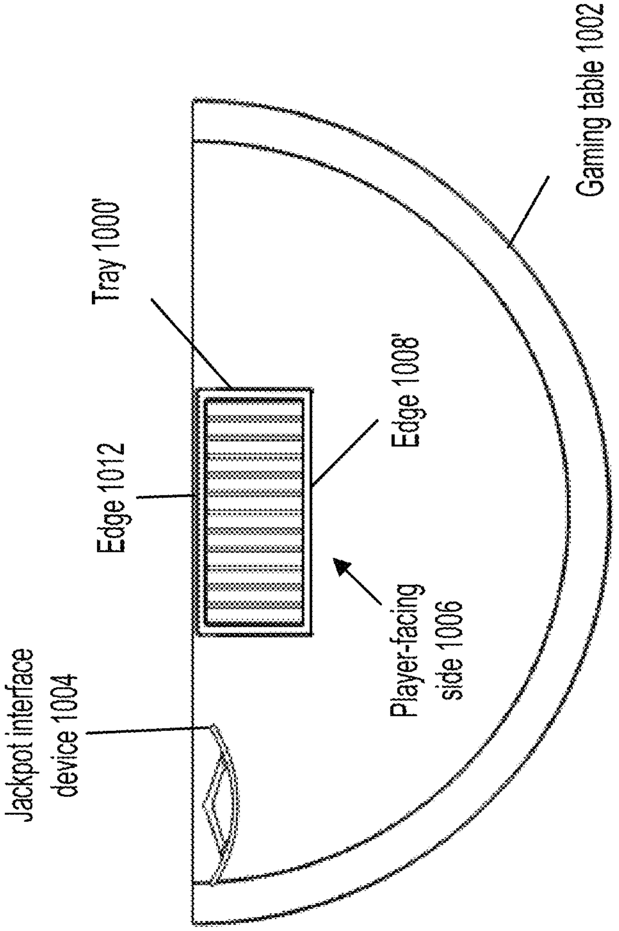
FIG. 10I illustrates a top view of the gaming table of FIG. 10H according to some embodiments.

As depicted in FIG. 10A and FIG. 10B, a player-facing side 1006 of the chip tray 1000 may have one or more edges 1008 angled with respect to one or more other edges 1008. The chip tray 1000 has two outer edges 1008*b* that are angled with respect to a middle edge 1008*a*. The edge 1008*a* may be generally parallel to an opposite edge 1012 of the chip tray 1000. The chip tray 1000 may comprise a card reader unit 1010 as described herein and in U.S. patent application Ser. No. 15/309,102, PCT Application No. PCT/CA2016/050442, and U.S. Patent Application No. 62/519,637, the entire contents of which are hereby incorporated by reference. In some embodiments, the player-facing side 1006 of the chip tray, such as the chip tray 1000' as depicted in FIG. 10H and FIG. 10I, may have a single edge 1008' that may be generally parallel to an opposite edge 1012 and may not have any card reader units 1010.

The display 1004 may be mounted on the gaming table 1002 such that the jackpot interface device 1004 is positioned above the gaming table 1002. The jackpot interface device 1004 may be configured to display bets, limits, and the size of one or more jackpots of a progressive game. The jackpot interface device 1004 is generally similar to the jackpot interface device 904 as depicted in FIG. 9A, except the jackpot interface device 1004 has a convex shape, as depicted in FIG. 10A and FIG. 10H.

In some embodiments, the progressive game monitoring server 104 may be configured to generate a display enhancement indicative of a size of the one or more progressive jackpots, and to send a control command to the jackpot interface device 122 to display the display enhancement on the jackpot interface device. When the size of the progressive jackpot is at or above a certain threshold, for example, the maximum size of the progressive jackpot or is above an average payout size of the progressive jackpot, the progressive game monitoring server 104 may generate a display enhancement, such as a colour, or a flame, or a flashing light, indicating that the progressive jackpot is at or above the certain threshold, and send a control command to the jackpot interface device 122 to display the display enhancement on the jackpot interface device 122. For example, as depicted in FIG. 7, the size of progressive jackpot 3 is at $9,123,514. The maximum size of the progressive jackpot 3 is $10,000,000 as indicated under the Maximum Amount column 714. Accordingly, the progressive game monitoring server 104 may generate a display enhancement, such as a red colour, indicating that the progressive jackpot 3 is near its maximum amount.

Figure 11A:
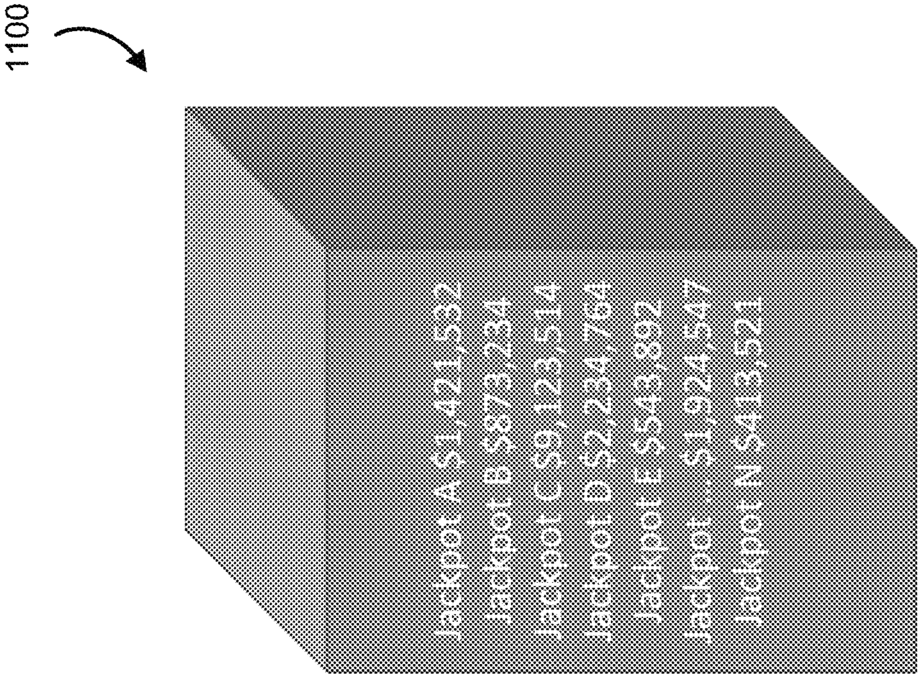
FIG. 11A illustrates a schematic of an example jackpot interface device.
Figure 11B:
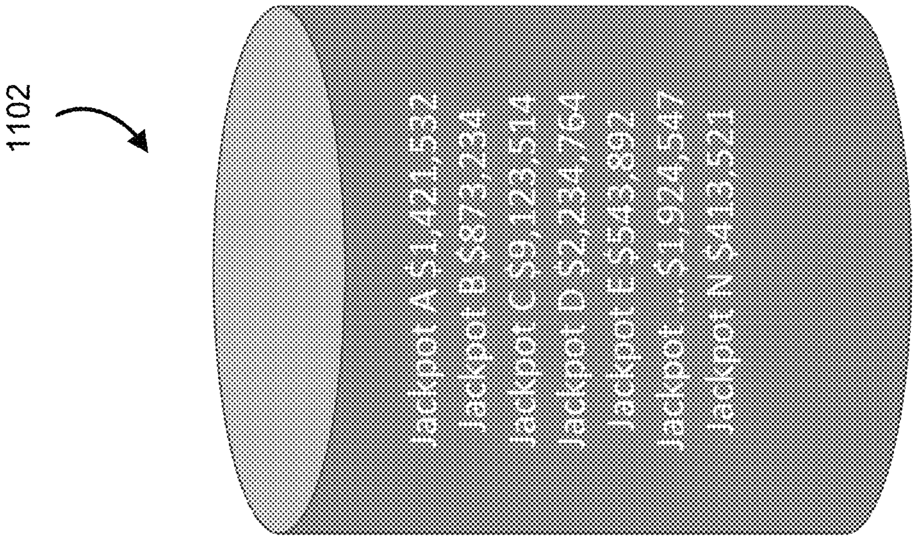
FIG. 11B illustrates a schematic of another example jackpot interface device.

FIG. 11A and FIG. 11B are schematic diagrams of example jackpot interface devices 1100 and 1102 displaying one or more progressive jackpots 1 to N of a progressive game. Jackpot interface device 1100 may be a flat screen. Jackpot interface device 1102 may be a curved screen. Jackpot interface devices 1100 and 1102 may have a portrait or landscape orientation. As depicted in FIG. 7, the progressive game may have one or more pots, some of which may be the progressive jackpots. As depicted in FIG. 11A and FIG. 11B, the progressive game monitoring server 104 may send a control command to jackpot interface devices 1100 and 1102 to display only some of the pots of the progressive game, such as one or more of the progressive jackpots. Non-jackpot pots, the House Advantage pots, and the Reset pot may not be displayed on the jackpot interface devices 1100 and 1102.

In some embodiments, the progressive game monitoring server 104 may send a control command to notify a gaming establishment employee that one or more particular progressive jackpots have been won. For example, the size of the progressive jackpots for progressive jackpot 1 and 2 as depicted in FIG. 7 corresponding to the royal flush and straight flush may be relatively large, as it may be quite rare to win those jackpots. This may warrant confirmation that the progressive jackpot was won. Accordingly, if a player wins progressive jackpot 1 or 2, the progressive game monitoring server 104 may send a control command, such as to the table monitoring subsystem 102 or to a central server, to notify a relatively high-ranking employee or a number of employees, like a manager, pit boss, or dealer, of the gaming establishment that a progressive jackpot has been won. As another example, the size of the progressive jackpots for progressive jackpot 3, 4, 5 as depicted in FIG. 7 corresponding to the 4 kings, full house, and flush may also be relatively large but may be more common to win. This may warrant confirmation that the progressive jackpot was won. Accordingly, if a player wins progressive jackpot 3, 4, or 5 the progressive game monitoring server 104 may send a control command, such as to the table monitoring subsystem 102 or to a central server, to notify an employee or a number of employees, like a pit boss or dealer, of the gaming establishment that a progressive jackpot has been won. As another example, the Non-jackpot pot as depicted in FIG. 7 may be won frequently, as it corresponds to getting a pair of the same cards. Accordingly, if a player wins the Non-jackpot pot, the progressive game monitoring server 104 may send a control command, such as to the table monitoring subsystem 102 or to a central server, to notify a dealer of the gaming establishment that a Non-jackpot jackpot has been won. As another example, if a player wins another pot, the progressive game monitoring server 104 may send a control command, such as to the table monitoring subsystem 102 or to a central server, to notify another employee of the gaming establishment that pot has been won.

In some embodiments, the system for monitoring progressive game activities at a plurality of gaming tables may be configured to monitor a progressive game for baccarat trend betting. For example, the Winning Game Element column 706 of FIG. 7 may be populated with data corresponding to a sequence of dealer wins and player wins, such that when playing a game of baccarat, if there is a corresponding sequence of player wins or banker wins, then there could be a payout for a progressive jackpot.

In some embodiments, there may be a key pad, such as with keys corresponding to the progressive jackpots, for logging wins of the progressive jackpots.

Figure 12:
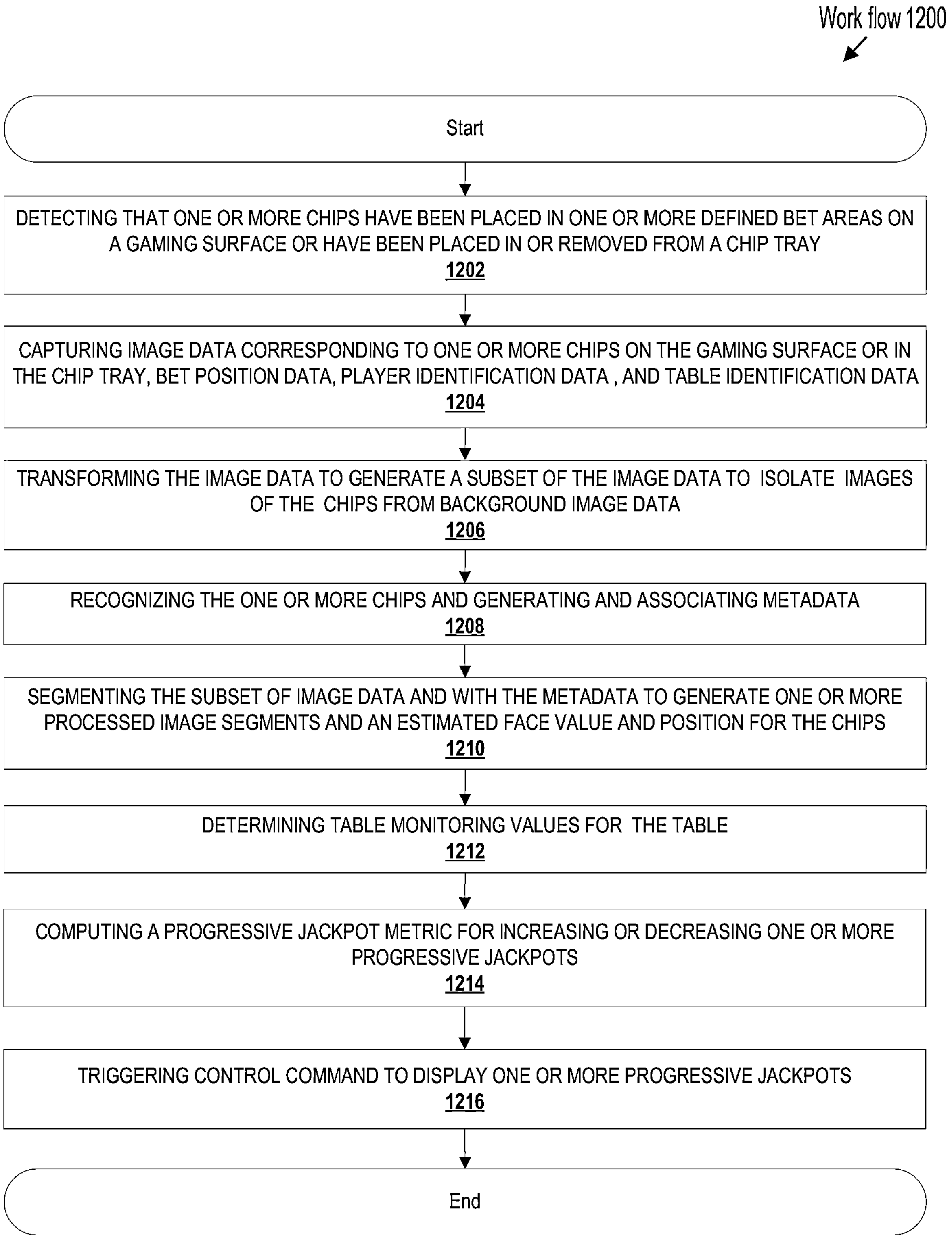
FIG. 12 is an example workflow, according to some embodiments.

FIG. 12 is an example workflow 1200 illustrative of some embodiments. Workflow 1200 includes various steps, and the steps provided are examples, and different, alternate, less, more steps may be included. While steps may be performed in the order depicted, other orders may be possible.

At 1202, detecting, by a table monitoring subsystem, that one or more chips have been placed in one or more defined bet areas on a gaming surface or detecting that one or more chips have been placed in or removed from a chip tray, each chip of the one or more chips having one or more visual identifiers representative of a face value associated with the chip. The chips on the gaming table may be arranged in one or more stacks of chips. The chips in the chip tray may be arranged in a channel of the chip tray.

At 1204, capturing, by the table monitoring subsystem, image data corresponding to the one or more chips positioned on the gaming surface or in the chip tray, the capturing triggered by the detection that the one or more chips have been placed in the one or more defined bet areas or in the chip tray, and capturing bet position data, player identification data, and table identification data.

At 1206, transforming, by an image processing engine, the image data to generate a subset of the image data relating to the one or more chips, the subset of image data isolating images of the chips from the image data.

At 1208, recognizing, by an image recognizer engine, the one or more chips in the betting area or in the chip tray, the recognizer engine generating and associating metadata representative of (i) a timestamp corresponding to when the image data was obtained, (ii) one or more estimated position values associated with the one or more chips, and (iii) one or more face values associated with the one or more chips based on the presence of the one or more visual identifiers.

At 1210 segmenting, by the image recognizer engine, the subset of image data and with the metadata representative of the one or more estimated position values with the one or more chips to generate one or more processed image segments, each processed image segment corresponding to a chip of the one or more chips and including metadata indicative of an estimated face value and position.

At 1212, determining, by a game monitoring engine, one or more table monitoring data values, each table monitoring data value corresponding to a bet area of the one or more defined bet areas or the chip tray, and determined using at least the number of chips visible in each of the one or more bet areas or chip tray extracted from the processed image segments and the metadata indicative of the face value of the one or more chips.

At 1214, determining, by a progressive game subsystem, based on the data corresponding to the bet made, the amount of the bet, bet position data, player identification data, and table identification data, computing a progressive jackpot metric for increasing or decreasing one or more progressive jackpots.

At 1216, triggering, by a progressive game monitoring server, a control command to a jackpot interface device to display the size of one or more progressive jackpots.

The systems and methods for monitoring progressive game activities at a plurality of gaming tables may allow a progressive game to be played at a plurality of gaming tables, playing the same or different base games, at the same or different geographical locations, or associated with the same or different gaming establishments.

With table monitoring subsystems to accurately track the quantity of bets and position of the bets placed on the gaming surface of the gaming tables, players may make bets of different sizes having different betting marker denominations, which may increase the size of the progressive prize or increase the odds of winning a progressive jackpot. This may encourage a player to make larger or more frequent bets for playing a progressive game, which may improve the profitability of a gaming establishment.

In addition, with table monitoring subsystems to accurately track the quantity of bets and position of the bets placed on the gaming surface of the gaming tables, a progressive game having one or more progressive pots and other pots may be offered, and the size, increase, and decrease, of each pot may be accurately tracked with image capture and image processing.

Moreover, with accurate bet tracking and management of the size of the progressive jackpots, the progressive jackpots may be increased or decreased accurately, and the right amount of progressive prize may be awarded to a player who wins a particular progressive jackpot.

The systems and methods for monitoring progressive game activities at a plurality of gaming tables may allow a progressive game to be played at a plurality of gaming tables, wherein playing the progressive game is mandatory. The bet amount and the placement of the bets on the gaming surface of the gaming tables may be identified with table monitoring subsystems.

The progressive game monitoring server may associate the progressive jackpot metric corresponding to the progressive prize or a fraction of the progressive jackpot metric to the player identification data of the player. Accordingly, the system may identify a player as a winner of a progressive jackpot, rather than identifying that a particular seat of a particular gaming table has won a progressive jackpot.

In some embodiments, a bet for playing a progressive game may be made without also making a bet for playing a base game at a gaming table.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The table monitoring subsystems described herein can allow for the calculation of wagers, table analytics, and data relating to the player and dealer as real-time streams of data, while checking that all the software and hardware components are functioning correctly, and being repaired or restarted as needed.

Various example embodiments are described herein. Although each embodiment represents a single combination of inventive elements, all possible combinations of the disclosed elements include the inventive subject matter. Thus if one embodiment comprises elements A, B, and C, and a second embodiment comprises elements B and D, then the inventive subject matter is also considered to include other remaining combinations of A, B, C, or D, even if not explicitly disclosed.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

All of the above are example embodiments.

What is claimed is:

1. A device monitoring progressive game activities at a gaming table of a plurality of gaming tables adapted for a progressive jackpot metric computed based on data captured at the gaming table, the device comprising:

an imaging component positioned to capture image data of one or more chips positioned in at least one betting area on a gaming surface of a respective gaming table;

one or more sensors responsive to activation events and deactivation events to trigger capture of the image data by the imaging component; and a computer processor processing the image data from the imaging component and configured to:

transmit local betting data for the respective gaming table to update aggregated betting data for the plurality of gaming tables using the captured image data of the one or more chips positioned in the at least one betting area;

compute the progressive jackpot metric for increasing or decreasing one or more progressive jackpots of a progressive game based on the aggregated betting data.

2. The device of claim 1, wherein the local aggregated betting data identifies a first betting amount at a first betting area, and a second betting amount at a second betting area, the first betting amount different from the second betting amount.

3. The device of claim 1, wherein the image data comprises a time stamp, and the computer processor is configured to determine a winner of the progressive game based on the time stamp of the image data; dynamically compute a prize amount for the winner based on the one or more progressive jackpot amounts; and reset or decrease the one or more progressive jackpot amounts based on the prize amount.

4. The device of claim 1, wherein the computer processor is configured to generate a display enhancement indicative of a size of the one or more progressive jackpots, and to send a control command to a jackpot interface device to display the display enhancement on the jackpot interface device.

5. The device of claim 1, wherein the computer processor is configured to detect a lock-in event to trigger the computation of the progressive jackpot metric.

6. The device of claim 1, wherein the device comprises:

a first imaging component configured to be positioned or supported on a first surface of a chip tray, and a second imaging component configured to be positioned or supported on a second surface of a chip tray, the first imaging component and the second imaging component configured to capture image data corresponding to one or more chips positioned in the at least one betting area on the gaming surface of the respective gaming table when the chip tray is affixed to the gaming table;

the one or more sensors responsive to activation events and deactivation events to trigger capture of the image data by the first imaging component and the second imaging component; and a communication link and a processor configured for transmitting the captured image data or a set of the captured image data to generate bet data for the gaming table, the bet data including betting amounts and position of the bet for the at least one betting area.

7. The device of claim 6, wherein each of the first imaging component and the second imaging component comprises an infrared radiation emitter, an infrared radiation sensitive camera, and a visible light-sensitive camera, and the device further comprises a port to transmit captured at least visible information and captured at least infrared radiation from the at least two cameras to the processor.

8. The device of claim 7, wherein the device comprises multiple imaging components that are secured to a single support, the support having a visible radiation emitter positioned to emit radiation at an angle approximately perpendicular to a forward surface of the support.

9. The device of claim 8, wherein, with respect to a nominal line centered on the support, at least two of the multiple imaging components are angled outwardly from the nominal line with capture ranges of the cameras in each of the at least two multiple components overlapping on the nominal line.

10. The device of claim 8, wherein the device comprises four imaging components, wherein fields of focus for all cameras in adjacent imaging components overlap at areas on the gaming surface of the gaming table corresponding to the betting areas.

11. A method for monitoring progressive game activities at a gaming table of a plurality of gaming tables adapted for a progressive jackpot metric computed based on data captured at the gaming table, the method comprising:

detecting an activation or deactivation event;

capturing, in response to the detecting activation events and deactivation events, image data of one or more chips positioned in at least one betting area on a gaming surface of the gaming table;

collecting, processing and aggregating the image data to:

transmit local betting data for the gaming table to update aggregated betting data for the plurality of gaming tables, the aggregated betting data identifying betting amounts for the at least one betting area; and compute a progressive jackpot metric for increasing or decreasing one or more progressive jackpots of a progressive game based on the aggregated betting data.

12. The method of claim 11, wherein the aggregated betting data identifies a first betting amount at a first betting area, and a second betting amount at a second betting area, the first betting amount different from the second betting amount.

13. The method of claim 11, wherein the image data comprises a time stamp, and the method further comprises determining a winner of the progressive game based on the time stamp of the image data; dynamically computing a prize amount for the winner based on the one or more progressive jackpot amounts; and resetting or decreasing the one or more progressive based on the prize amount.

14. The method of claim 11, further comprising: generating a display enhancement indicative of a size of the one or more progressive jackpots, and sending a control command to a jackpot interface device to display the display enhancement on the jackpot interface device.

15. The method of claim 11, further comprising: detecting a lock-in event to trigger the computation of the progressive jackpot metric.

16. The method of claim 11, wherein the steps of detecting an activation or deactivation event and capturing the image data is performed by a device comprising:

a first imaging component configured to be positioned or supported on a first surface of a chip tray, and a second imaging component configured to be positioned or supported on a second surface of a chip tray, the first imaging component and the second imaging component configured to capture image data corresponding to one or more chips positioned in the at least one betting area on the gaming surface of the respective gaming table when the chip tray is affixed to the gaming table;

the one or more sensors responsive to activation events and deactivation events to trigger capture of the image data by the first imaging component and the second imaging component; and a communication link and a processor configured for transmitting the captured image data or a set of the captured image data to generate bet data for the gaming table, the bet data including betting amounts and position of the bet for the at least one betting area.

17. The method of claim 16, wherein each of the first imaging component and the second imaging component comprises an infrared radiation emitter, an infrared radiation sensitive camera, and a visible light-sensitive camera, and the table monitoring subsystem further comprises a port to transmit captured at least visible information and captured at least infrared radiation from the at least two cameras to the processor.

18. The method of claim 17, wherein the imaging components are secured to a single support, the support having a visible radiation emitter positioned to emit radiation at an angle approximately perpendicular to a forward surface of the support.

19. The method of claim 18, wherein, with respect to a nominal line centered on the support, at least two of the imaging components are angled outwardly from the nominal line with capture ranges of the cameras in each of the at least two components overlapping on the nominal line.

20. A non-transitory computer readable medium storing machine interpretable instructions, which when executed by a processor, cause the processor to perform a method for monitoring progressive game activities at a gaming table of a plurality of gaming tables adapted for a progressive jackpot metric computed based on data captured at the gaming table, the method comprising:

detecting an activation or deactivation event;

capturing, in response to the detecting activation events and deactivation events, image data of one or more chips positioned in at least one betting area on a gaming surface of the gaming table; and collecting, processing and aggregating the image data to:

transmit local betting data for the gaming table to update aggregated betting data for the plurality of gaming tables, the aggregated betting data identifying betting amounts for the at least one betting area; and compute a progressive jackpot metric for increasing or decreasing one or more progressive jackpots of a progressive game based on the aggregated betting data.

* * * * *